US012750756B2

(12) United States Patent
Zhou et al.

(10) Patent No.: US 12,750,756 B2
(45) Date of Patent: Sep. 29, 2026

(54) PRIMARY CELL CHANGING TRIGGERED BY LAYER 1 AND 2 SIGNALING

(71) Applicant: Comcast Cable Communications, LLC, Philadelphia, PA (US)

(72) Inventors: Hua Zhou, Vienna, VA (US); Kyungmin Park, Vienna, VA (US); Esmael Hejazi Dinan, McLean, VA (US); Ali Cagatay Cirik, Chantilly, VA (US); Hyoungsuk Jeon, Centreville, VA (US); Taehun Kim, Fairfax, VA (US); SungDuck Chun, Fairfax, VA (US); Gautham Prasad, Herndon, VA (US); Jian Xu, McLean, VA (US); Kai Xu, Herndon, VA (US); Mohammad Ghadir Khoshkholgh Dashtaki, Burnaby (CA)

(73) Assignee: Comcast Cable Communications, LLC, Philadelphia, PA (US)

( * ) Notice: Subject to any disclaimer, the term of this patent is extended or adjusted under 35 U.S.C. 154(b) by 203 days.

(21) Appl. No.: 18/470,489

(22) Filed: Sep. 20, 2023

(65) Prior Publication Data

US 2024/0098613 A1 Mar. 21, 2024

Related U.S. Application Data

(60) Provisional application No. 63/408,203, filed on Sep. 20, 2022.

(51) Int. Cl.
*H04W 36/36* (2009.01)
*H04W 36/00* (2009.01)
*H04W 36/30* (2009.01)

(52) U.S. Cl.
CPC ..... *H04W 36/362* (2023.05); *H04W 36/0055* (2013.01); *H04W 36/30* (2013.01); *H04W 36/00692* (2023.05)

(58) Field of Classification Search
CPC ............... H04W 36/362; H04W 36/30; H04W 36/00692; H04W 36/0055
See application file for complete search history.

(56) References Cited

U.S. PATENT DOCUMENTS

2019/0387438 A1* 12/2019 Chang .................. H04W 36/08
2020/0275340 A1 8/2020 Kim et al.
(Continued)

FOREIGN PATENT DOCUMENTS

EP 2663139 B1 1/2019
WO WO-2023216182 A1 * 11/2023 ........ H04W 56/0015

OTHER PUBLICATIONS

R2-2207406 3GPP RAN WG2 Meeting #119-e, Electronic meeting, Aug. 17-26, 2022, Source: Fujitsu, Title: Consideration on network energy saving.
(Continued)

*Primary Examiner* — Angela Widhalm De Rodriguez
(74) *Attorney, Agent, or Firm* — Banner & Witcoff, Ltd.

(57) ABSTRACT

A wireless device may communicate with a base station via a primary cell (PCell) and one or more secondary cells. A plurality of types of handovers, such as a layer 1/layer 2 triggered handover or a conditional handover, may be indicated to the wireless device for switching its PCell. One or more conditions, such as a priority associated with a handover type, may be used to determine which type of handover to perform.

21 Claims, 49 Drawing Sheets

(56) References Cited

U.S. PATENT DOCUMENTS

| | | | | |
|---|---|---|---|---|
| 2021/0058838 | A1* | 2/2021 | Lee | H04W 36/0058 |
| 2022/0070752 | A1* | 3/2022 | Kim | H04W 24/08 |
| 2022/0377638 | A1 | 11/2022 | Jung et al. | |
| 2025/0142439 | A1* | 5/2025 | Min | H04W 76/15 |

OTHER PUBLICATIONS

R2-2207414 3GPP RAN WG2 Meeting #119 electronic, Online, Aug. 17-29, 2022, Source: Fujitsu, Title: Efficient PCell and SCell handling for network energy saving.
R2-2207423 3GPP RAN WG2 Meeting #119-e, E-Conference, Aug. 17-26, 2022, Source: Apple, Title: Initial discussion on RAN2 work of Network energy saving.
R2-2207424 3GPP RAN WG2 Meeting #119-e, E-Conference, Aug. 17-26, 2022, Source: Apple, Title: On-demand measurement for network energy saving.
R2-2207511 3GPP RAN WG2 Meeting #119-e, E-Conference, Aug. 17-26, 2022, Source: CATT, Title: Network energy savings: issues for investigation in RAN2.
R2-2207512 3GPP RAN WG2 Meeting #119-e, E-Conference, Aug. 17-26, 2022, Source: CATT, Title: Consideration on UE Assistance Information.
R2-2207545 3GPP TSG-RAN WG2 Meeting #119 Electronic, Elbonia, Aug. 17-26, 2022, Source: Nokia, Nokia Shanghai Bell, Title: NW Energy Saving.
R2-2207546 3GPP TSG-RAN WG2 Meeting #119 Electronic, Elbonia, Aug. 17-26, 2022, Source: Nokia, Nokia Shanghai Bell, Title: NW Energy Saving IDLE.
R2-2207786 3GPP TSG-RAN WG2 Meeting #119-e, E-Meeting, Aug. 17-29, 2022, Source: vivo, Title: Discussions on time domain techniques for network energy saving.
R2-2207787 3GPP TSG-RAN WG2 Meeting #119-e, E-Meeting, Aug. 17-29, 2022, Source: vivo, Title: Discussion on frequency domain and UE-assisted Network Energy saving techniques.
R2-2207799 3GPP TSG-RAN WG2 Meeting #119-e, E-meeting, Aug. 2022, Source: Oppo, Title: Discussion on network energy savings.
R2-2207800 3GPP TSG-RAN WG2 Meeting #119-e, E-meeting, Aug. 2022, Source: Oppo, Title: Discussion on the UE assistance information.
R2-2207919 3GPP TSG-RAN WG2 Meeting #119 electronic, Online, Aug. 17-Aug. 26, 2022, Source: Lenovo, Title: Discussion on supporting of network energy savings for NR.
R2-2207920 3GPP TSG-RAN WG2 Meeting #119 electronic, Online, Aug. 17-Aug. 26, 2022, Source: Lenovo, Title: Discussion on the state transition in NES.
R2-2207960 3GPP TSG RAN WG2 #119-e, Online, Aug. 17-Aug. 29, 2022, Source: Fraunhofer IIS, Fraunhofer HHI, Title: Alignment of UE and Network Energy Saving.
R2-2208026 3GPP TSG RAN WG2 #119e, Electronic meeting, Aug. 15-Aug. 26, 2022, Source: Ericsson, Title: Assistance information from the UE for NW energy savings.
R2-2208031 3GPP TSG RAN WG2 #119e, Electronic meeting, Aug. 15-Aug. 26, 2022, Source: Ericsson, Title: Miscellaneous mechanisms for network energy savings.
R2-2208120 3GPP TSG-RAN WG3 Meeting #119 electronic, Online, Aug. 17-29, 2022, Source: Qualcomm Incorporated, Title: Network energy saving techniques.
R2-2208133 3GPP TSG-RAN WG3 Meeting #119 electronic, Online, Aug. 17-29, 2022, Source: Ericsson, Title: Correction to MINT—applicableDisasterInfoList.
R2-2208297 3GPP TSG-RAN WG2 Meeting #119-e, Electronic, Aug. 17-26, 2022, Source: Rakuten Mobile Inc, Title: Network Energy savings—UE grouping for efficient signaling.
R2-2208330 3GPP TSG-RAN WG2 Meeting #119-e, Electronic, Aug. 17-26, 2022, Source: ZTE corporation, Sanechips, Title: Supporting access via assistant cell for network energy saving.
R2-2208331 3GPP TSG-RAN WG2 Meeting #119-e, Electronic, Aug. 17-29, 2022, Source: ZTE corporation, Sanechips, Title: Techniques in various domains and UE assistance information for network energy saving.
R2-2208342 3GPP TSG-RAN WG2 Meeting #119-e, Online, Aug. 17-29, 2022, Source: Huawei, HiSilicon, Deutsche Telekom, Title: Discussion on network energy saving techniques for single carrier.
R2-2208343 3GPP TSG-RAN WG2 Meeting #119-e, Online, Aug. 17-29, 2022, Source: Huawei, HiSilicon, China Unicom, Deutsche Telekom, Title: Discussion on network energy saving techniques for multi-carrier case.
R2-2208431 3GPP TSG-RAN WG2 Meeting #119-e, Online, Aug. 17-26, 2022, Source: CMCC, Title: Discussion on the technical directions for network energy saving.
R2-2208432 3GPP TSG-RAN WG2 Meeting #119-e, Online, Aug. 17-26, 2022, Source: CMCC, Title: Analysis on power consumption in base station.
R2-2208573 3GPP TSG-RAN WG2 Meeting #119 electronic, E-Meeting, Aug. 17-29, 2022, Source: Xiaomi, Title: Energy saving on system information transmission.
R2-2208592 3GPP TSG-RAN WG2 Meeting #119-e, Online, Aug. 17-29, 2022, Source: Samsung, Title: Feedback and Assistance Information for NES.
R2-2208593 3GPP TSG-RAN WG2 Meeting #119-e, Online, Aug. 17-29, 2022, Source: Samsung, Title: Network Energy Saving (NES) Techniques.
R2-2208606 3GPP TSG-RAN WG2 Meeting #119-e, e-Meeting: Aug. 17-Aug. 26, 2022, Source: MediaTek Inc., Title: Coexistence considerations in network energy saving.
R2-2105294 3GPP TSG-RAN WG2 Meeting #114, e-Meeting, May 19-27, 2021, Source: MediaTek Inc., Title: Procedures of L1/L2-Centric Inter-Cell Mobility.
R2-2105103 3GPP TSG-RAN WG2 Meeting #114, e-Meeting, May 19-27, 2021, Source: Apple, Title: L1/L2-centric inter-cell mobility.
R2-2103866 3GPP TSG-RAN WG2 Meeting #113, e-Meeting, Apr. 12-20, 2021, Source: Apple, Title: L1/L2-centric inter-cell mobility.
Feb. 15, 2024—European Search Report—EP App. No. 23198547.4.
3GPP TR 36.887 V12.0.0 (Jun. 2014), 3rd Generation Partnership Project; Technical Specification Group Radio Access Network; Evolved Universal Terrestrial Radio Access Network (E-UTRAN); Study on energy saving enhancement for E-UTRAN (Release 12).
3GPP TR 36.927 V16.0.0 (Jul. 2020), 3rd Generation Partnership Project; Technical Specification Group Radio Access Network; Evolved Universal Terrestrial Radio Access (E-UTRA); Potential solutions for energy saving for E-UTRAN (Release 16).
3GPP TS 38.133 V17.4.0 (Dec. 2021), 3rd Generation Partnership Project; Technical Specification Group Radio Access Network; NR; Requirements for support of radio resource management (Release 17).
3GPP TS 38.211 V17.1.0 (Mar. 2022), 3rd Generation Partnership Project; Technical Specification Group Radio Access Network; NR; Physical channels and modulation (Release 17).
3GPP TS 38.212 V17.1.0 (Mar. 2022), 3rd Generation Partnership Project; Technical Specification Group Radio Access Network; NR; Multiplexing and channel coding (Release 17).
3GPP TS 38.213 V17.1.0 (Mar. 2022), 3rd Generation Partnership Project;Technical Specification Group Radio Access Network; NR; Physical layer procedures for control (Release 17).
3GPP TS 38.214 V17.1.0 (Mar. 2022) 3rd Generation Partnership Project; Technical Specification Group Radio Access Network; NR; Physical layer procedures for data (Release 17).
3GPP TS 38.215 V17.1.0 (Mar. 2022), 3rd Generation Partnership Project; Technical Specification Group Radio Access Network; NR; Physical layer measurements (Release 17).
3GPP TS 38.300 V16.7.0 (Sep. 2021), Technical Specification, 3rd Generation Partnership Project; Technical Specification Group Radio Access Network; NR; NR and NG-RAN Overall Description; Stage 2 (Release 16).
3GPP TS 38.321 V17.0.0 (Mar. 2022), 3rd Generation Partnership Project; Technical Specification Group Radio Access Network;NR;Medium Access Control (MAC) protocol specification (Release 17).

(56) References Cited

OTHER PUBLICATIONS

3GPP TS 38.331 V16.7.0 (Dec. 2021) 3rd Generation Partnership Project; Technical Specification Group Radio Access Network; NR; Radio Resource Control (RRC) protocol specification (Release 16).
R1-22xxxxx 3GPP TSG RAN WG1 Meeting #110bis-e, Online, Oct. 10-19, 2022, Source: MCC Support, Title: Draft Report of 3GPP TSG RAN WG1 #110 v0.1.0.
R1-2205756 3GPP TSG RAN WG1 Meeting #110, Toulouse, France, Aug. 22-26, 2022, Source: Futurewei, Title: Enhancements for Network Energy Savings.
R1-2205861 3GPP TSG-RAN WG1 Meeting #110, Toulouse, France, Aug. 22-26, 2022, Source: Huawei, HiSilicon, Title: Discussion on network energy saving techniques.
R1-2206000 3GPP TSG RAN WG1 Meeting #110, Toulouse, France, Aug. 22-26, 2022, Source: Spreadtrum Communications, Title: Discussion on network energy saving techniques.
R1-2206054 3GPP TSG RAN WG1 #110-e, Toulouse, France, Aug. 22-26, 2022, Source: vivo, Title: Discussions on network energy saving techniques.
R1-2206075 3GPP TSG RAN WG1 #110, Toulouse, France, Aug. 22-26, 2022, Source: Nokia, Nokia Shanghai Bell, Title: Network Energy Saving Techniques.
R1-2206142 3GPP TSG-RAN WG1 #110, Toulouse, France, Aug. 22-26, 2022, Source: Panasonic, Title: Discussion on potential network energy saving techniques.
R1-2206173 3GPP TSG-RAN WG1 #110, Toulouse, France, Aug. 22-26, 2022, Source: Fujitsu, Title: Discussion on network energy saving techniques.
R1-2206242 3GPP TSG-RAN WG1 #110, Toulouse, France, Aug. 22-26, 2022, Source: NEC, Title: Discussion on network energy saving techniques.
R1-2206309 3GPP TSG-RAN WG1 #110, Toulouse, France, Aug. 22-26, 2022, Source: Oppo, Title: Discussion on NW energy savings techniques.
R1-2206412 3GPP TSG RAN WG1 #110, Toulouse, France, Aug. 22-26, 2022, Source: CATT, Title: Network Energy Saving techniques in time, frequency, and spatial domain.
R1-2206517 3GPP TSG RAN WG1 Meeting #110, Toulouse, France, Aug. 22-26, 2022, Source: Lenovo, Title: Network energy saving techniques.
R1-2206596 3GPP TSG RAN WG1 Meeting #110, Toulouse, France, Aug. 22-26, 2022, Source: Intel Corporation, Title: Discussion on Network Energy Saving Techniques.
R1-2206655 3GPP TSG RAN WG1 Meeting #110, Toulouse, France, Aug. 22-26, 2022, Source: Xiaomi, Title: Discussions on techniques for network energy Saving.
R1-2206666 3GPP TSG RAN WG1 Meeting #110, Toulouse, France, Aug. 22-26, 2022, Source: InterDigital Inc., Title: Potential techniques for network energy saving.
R1-2206697 3GPP TSG RAN WG1 #110, e-Meeting, Aug. 22-Aug. 26, 2022, Source: China Telecom, Title: Discussion on network energy saving techniques.
R1-2206839 3GPP TSG RAN WG1 Meeting #110, Toulouse, France, Aug. 22-26, 2022, Source: Samsung, Title: Network energy saving techniques.
R1-2206926 3GPP TSG RAN WG1 Meeting #110, Toulouse, France, Aug. 22-26, 2022, Source: CMCC, Title: Discussion on network energy saving techniques.
R1-2206947 3GPP TSG RAN WG1 Meeting #110, Toulouse, France, Aug. 22-26, 2022, Source: Fraunhofer IIS, Fraunhofer HHI, Title: On Network Energy Saving Techniques.
R1-2206980 3GPP TSG RAN WG1 Meeting #110, Toulouse, France, Aug. 22-26, 2022, Source: MediaTek Inc., Title: Network energy saving techniques.
R1-2207038 3GPP TSG RAN WG1 Meeting #110, Toulouse, France, Aug. 22-26, 2022, Source: LG Electronics, Title: Discussion on physical layer techniques for network energy savings.
R1-2207060 3GPP TSG RAN WG1 Meeting #110, Toulouse, France, Aug. 22-26, 2022, Source: ZTE, Sanechips, Title: Discussion on NW energy saving techniques.
R1-2207074 3GPP TSG RAN WG1 Meeting #110, Toulouse, France, Aug. 22-26, 2022, Source: CEWiT, Title: Discussion on Network energy saving techniques.
R1-2207119 3GPP TSG RAN WG1 Meeting #110, Toulouse, France, Aug. 22-26, 2022, Source: Rakuten Mobile Inc., Title: Discussion on network energy saving techniques.
R1-2207246 3GPP TSG RAN WG1 Meeting #110, Toulouse, France, Aug. 22-26, 2022, Source: Qualcomm Incorporated, Title: Network energy saving techniques.
R1-2207344 3GPP TSG RAN WG1 Meeting #110, Toulouse, France, Aug. 22-26, 2022, Source: Apple, Title: Discussion on network energy saving techniques.
R1-2207419 3GPP TSG RAN WG1 Meeting #110, Toulouse, France, Aug. 22-26, 2022, Source: NTT Docomo, Inc., Title: Discussion on NW energy saving techniques.
R1-2207438 3GPP TSG RAN WG1 Meeting #110, Toulouse, France, Aug. 22-26, 2022, Source: Ericsson, Title: Network energy saving techniques.
R1-2207446 3GPP TSG RAN WG1 Meeting #110, Toulouse, France, Aug. 22-26, 2022, Source: ITRI, Title: Discussion on potential L1 network energy saving techniques for NR.
R1-2207481 3GPP TSG RAN WG1 Meeting #110, Toulouse, France, Aug. 22-26, 2022, Source: KT Corp., Title: Discussion on network energy saving techniques.
R1-2208185 3GPP TSG RAN WG1 Meeting #110, Toulouse, France, Aug. 22-26, 2022, Source: Moderator (Intel Corporation), Title: Discussion Summary #2 for energy saving techniques of NW energy saving SI.
R2-2xxxxxx 3GPP TSG-RAN WG2 Meeting #119 electronic, Online, Aug. 2022, Source: RAN2 Chairman (MediaTek), Title: Agenda.
R2-2207037 3GPP TSG-RAN WG2 Meeting #119-e, Online, Aug. 17-Aug. 29, 2022, Source: KDDI Corporation, Title: Discussion on NW energy saving.
R2-2207115 3GPP TSG-RAN WG2 Meeting #119 Electronic, Elbonia, Aug. 17-26, 2022, Source: Intel Corporation, Title: Efficient operation of adaptation for network energy saving.
R2-2207116 3GPP TSG-RAN WG2 Meeting #119 Electronic, Elbonia, Aug. 17-26, 2022, Source: Intel Corporation, Title: Additional UE assistance information and UE feedback.
R2-2207246 3GPP RAN WG2 Meeting #119-e, Online, Aug. 17-26, 2022, Source: InterDigital, Title: Time domain NES techniques.
R2-2207247 3GPP RAN WG2 Meeting #119-e, Online, Aug. 17-26, 2022, Source: InterDigital, Title: Frequency domain and UE assistance NES techniques.
R2-2207292 3GPP RAN WG2 Meeting #119-e, Electronic meeting, Aug. 17-26, 2022, Source: NEC, Title: FFiner granularity configuration for NES.
R2-2207293 3GPP RAN WG2 Meeting #119-e, Electronic meeting, Aug. 17-26, 2022, Source: NEC, Title: Assistance information to support choice of NES configuration.

* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| | | | | | | | | |
|---|---|---|---|---|---|---|---|---|
| $C_7$ | $C_6$ | $C_5$ | $C_4$ | $C_3$ | $C_2$ | $C_1$ | R | Oct 1 |

FIG. 21A

| | | | | | | | | |
|---|---|---|---|---|---|---|---|---|
| $C_7$ | $C_6$ | $C_5$ | $C_4$ | $C_3$ | $C_2$ | $C_1$ | R | Oct 1 |
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

FIG. 21B

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 2_7 | Notifying Paging early indication and TRS availability indication for one or more UEs |
| 3_0 | Scheduling of NR sidelink in one cell |
| 3_1 | Scheduling of LTE sidelink in one cell |
| 4_0 | Scheduling of PDSCH with CRC scrambled by MCCH-RNTI/G-RNTI for broadcast |
| 4_1 | Scheduling of PDSCH with CRC scrambled by G-RNTI/G-CS-RNTI for multicast |
| 4_2 | Scheduling of PDSCH with CRC scrambled by G-RNTI/G-CS-RNTI for multicast |

FIG. 23

```
MIB ::=                        SEQUENCE {
   systemFrameNumber                  BIT STRING (SIZE (6)),
   subCarrierSpacingCommon               ENUMERATED {scs15or60, scs30or120},
   ssb-SubcarrierOffset              INTEGER (0..15),
   dmrs-TypeA-Position                ENUMERATED {pos2, pos3},
   pdcch-ConfigSIB1                  PDCCH-ConfigSIB1,
   cellBarred                     ENUMERATED {barred, notBarred},
   intraFreqReselection               ENUMERATED {allowed, notAllowed},
   spare                       BIT STRING (SIZE (1))}

PDCCH-ConfigSIB1 ::=             SEQUENCE {
   controlResourceSetZero            ControlResourceSetZero,
   searchSpaceZero                 SearchSpaceZero}
```

FIG. 24A

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | *O* | Number of search space sets per slot | *M* | First symbol index |
|---|---|---|---|---|
| 0 | 0 | 1 | 1 | 0 |
| 1 | 0 | 2 | 1/2 | {0, if *i* is even}, {*N*, if is odd} |
| 2 | 2 | 1 | 1 | 0 |
| 3 | 2 | 2 | 1/2 | {0, if *i* is even}, {*N*, if *i* is odd} |
| 4 | 5 | 1 | 1 | 0 |
| 5 | 5 | 2 | 1/2 | {0, if *i* is even}, *N*, if *i* is odd |
| 6 | 7 | 1 | 1 | 0 |
| 7 | 7 | 2 | 1/2 | {0, if *i* is even}, {*N*, if *i* is odd} |
| ... | ... | ... | ... | ... |

FIG. 24C

```
SIB1 ::=       SEQUENCE {
   cellSelectionInfo               SEQUENCE {
      q-RxLevMin                      Q-RxLevMin,
      q-RxLevMinOffset                   INTEGER (1..8) ...}
   cellAccessRelatedInfo            CellAccessRelatedInfo,
   connEstFailureControl            ConnEstFailureControl
   si-SchedulingInfo               SI-SchedulingInfo
   servingCellConfigCommon              ServingCellConfigCommonSIB
   ims-EmergencySupport               ENUMERATED {true}
   eCallOverIMS-Support              ENUMERATED {true}
   ue-TimersAndConstants              UE-TimersAndConstants
   uac-BarringInfo                SEQUENCE { ...}
   useFullResumeID                   ENUMERATED {true}
   lateNonCriticalExtension           OCTET STRING
   nonCriticalExtension             SIB1-v16xy-IEs  }

ServingCellConfigCommonSIB ::=      SEQUENCE {
   downlinkConfigCommon              DownlinkConfigCommonSIB,
   uplinkConfigCommon               UplinkConfigCommonSIB
   supplementaryUplink              UplinkConfigCommonSIB
   n-TimingAdvanceOffset             ENUMERATED { n0, n25600, n39936 }
   ssb-PositionsInBurst            SEQUENCE {
      inOneGroup                   BIT STRING (SIZE (8)),
      groupPresence                 BIT STRING (SIZE (8)) },
   ssb-PeriodicityServingCell        ENUMERATED {ms5, ms10, ms20, ms40, ms80, ms160},
   tdd-UL-DL-ConfigurationCommon      TDD-UL-DL-ConfigCommon
   ss-PBCH-BlockPower               INTEGER (-60..50),
   ...,}

DownlinkConfigCommonSIB ::=     SEQUENCE {
   frequencyInfoDL              FrequencyInfoDL-SIB,
   initialDownlinkBWP            BWP-DownlinkCommon,
   bcch-Config                  BCCH-Config,
   pcch-Config                  PCCH-Config,  ...}

PCCH-Config ::=          SEQUENCE {
   defaultPagingCycle              PagingCycle,
   nAndPagingFrameOffset              CHOICE {
      oneT                         NULL,
      halfT                       INTEGER (0..1), ...},
   ns                        ENUMERATED {four, two, one},
   firstPDCCH-MonitoringOccasionOfPO   CHOICE {
      sCS15KHZoneT       SEQUENCE (SIZE (1..maxPO-perPF)) OF INTEGER (0..139),...}
   ...,
   [[   nrofPDCCH-MonitoringOccasionPerSSB-InPO-r16  INTEGER (2..4)  ]]
}
```

FIG. 25

```
BWP-DownlinkCommon ::=          SEQUENCE {
   genericParameters            BWP,
   pdcch-ConfigCommon              SetupRelease { PDCCH-ConfigCommon }
   pdsch-ConfigCommon              SetupRelease { PDSCH-ConfigCommon }
   ...}

PDCCH-ConfigCommon ::=          SEQUENCE {
   controlResourceSetZero        ControlResourceSetZero
   commonControlResourceSet         ControlResourceSet
   searchSpaceZero              SearchSpaceZero
   commonSearchSpaceList            SEQUENCE (SIZE(1..4)) OF SearchSpace
   searchSpaceSIB1              SearchSpaceId
   searchSpaceOtherSystemInformation  SearchSpaceId
   pagingSearchSpace              SearchSpaceId
   ra-SearchSpace               SearchSpaceId
    [[
   firstPDCCH-MonitoringOccasionOfPO   CHOICE {
      sCS15KHZoneT    SEQUENCE (SIZE (1..maxPO-perPF)) OF INTEGER (0..139),
      ...
   }OPTIONAL   -- Cond OtherBWP
    ]]
   ...,}

PDCCH-ServingCellConfig ::=      SEQUENCE {
   slotFormatIndicator           SetupRelease { SlotFormatIndicator }...,
   [[
   availabilityIndicator-r16       SetupRelease {AvailabilityIndicator-r16}
   searchSpaceSwitchTimer-r16         INTEGER (1..80)
   ]]
}

SearchSpaceSwitchConfig-r16 ::=   SEQUENCE {
   cellGroupsForSwitchList-r16      SEQUENCE(SIZE (1..4)) OF CellGroupForSwitch-r16
   searchSpaceSwitchDelay-r16         INTEGER (10..52)
}
CellGroupForSwitch-r16 ::= SEQUENCE(SIZE (1..16)) OF ServCellIndex

ControlResourceSet ::=          SEQUENCE {
   controlResourceSetId           ControlResourceSetId,
   frequencyDomainResources          BIT STRING (SIZE (45)),
   duration                    INTEGER (1..maxCoReSetDuration),
   cce-REG-MappingType              CHOICE {
      interleaved                SEQUENCE {
         reg-BundleSize                ENUMERATED {n2, n3, n6},
         interleaverSize             ENUMERATED {n2, n3, n6},
         shiftIndex                INTEGER(0..maxNrofPhysicalResourceBlocks-1)},
      nonInterleaved              NULL},
   precoderGranularity           ENUMERATED {sameAsREG-bundle, allContiguousRBs},
   pdcch-DMRS-ScramblingID             INTEGER (0..65535)
   ...,  }
```

FIG. 26

```
SearchSpace ::=                    SEQUENCE {
  searchSpaceId                      SearchSpaceId,
  controlResourceSetId               ControlResourceSetId
  monitoringSlotPeriodicityAndOffset     CHOICE {
    sl1                            NULL,
    sl2                            INTEGER (0..1),...}
  duration                         INTEGER (2..2559)
  monitoringSymbolsWithinSlot          BIT STRING (SIZE (14))
  nrofCandidates                   SEQUENCE {
    aggregationLevel1                  ENUMERATED {n0, n1, n2, ... n8},
    aggregationLevel2                  ENUMERATED {n0, n1, n2, ... n8},
    ...}
  searchSpaceType                    CHOICE {
    common                           SEQUENCE {
      dci-Format0-0-AndFormat1-0           SEQUENCE {...}
      dci-Format2-0                    SEQUENCE {
        nrofCandidates-SFI                 SEQUENCE {
          aggregationLevel1                  ENUMERATED {n1, n2}
          aggregationLevel2                  ENUMERATED {n1, n2}...},
        ...}
      dci-Format2-1                    SEQUENCE {...}
...
    },
    ue-Specific                      SEQUENCE {
      dci-Formats       ENUMERATED {formats0-0-And-1-0, formats0-1-And-1-1},
      ...,}
  }
}

SearchSpaceExt-r16 ::=             SEQUENCE {
  controlResourceSetId-r16           ControlResourceSetId-r16
  searchSpaceType-r16                SEQUENCE {
    common-r16                       SEQUENCE {
      dci-Format2-4-r16                SEQUENCE {
        nrofCandidates-CI-r16              SEQUENCE {
          aggregationLevel1-r16              ENUMERATED {n1, n2}...},...}
      dci-Format2-5-r16                SEQUENCE {
        nrofCandidates-IAB-r16             SEQUENCE {
          aggregationLevel1-r16              ENUMERATED {n1, n2}...},...}
      dci-Format2-6-r16                SEQUENCE {...}
      ...}
  }
  searchSpaceGroupIdList-r16         SEQUENCE (SIZE (1.. 2)) OF INTEGER (0..1)
  freqMonitorLocations-r16               BIT STRING (SIZE (5))
}

SearchSpaceSwitchTrigger-r16 ::=   SEQUENCE {
  servingCellId-r16            ServCellIndex,
  positionInDCI-r16
INTEGER(0..maxSFI-DCI-PayloadSize-1)
}
```

FIG. 27

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | {2,8}+14n | n=0,1 | n=0,1,2,3 | Not Applicable (NA) |
| CaseB: 30 KHz | {4,8,16,20}+28n | n=0 | n=0,1 | NA |
| CaseC: 30 KHz | {2,8}+14n | n=0,1 | n=0,1,2,3 | NA |
| CaseD: 120 KHz | {4,8,16,20}+28n | NA | NA | n=0,1,2,3,5,6,7,8,10,11,12,13,15,16,17,18 |
| CaseE: 240 KHz | {8,12,16,20,32,36,40,44} + 56n | NA | NA | n=0,1,2,3,5,6,7,8 |

FIG. 34

```
RRCReconfiguration-IEs ::=      SEQUENCE {
  radioBearerConfig             RadioBearerConfig
  secondaryCellGroup            OCTET STRING (CONTAINING CellGroupConfig)
  measConfig                    MeasConfig
  nonCriticalExtension          RRCReconfiguration-v1530-IEs
}

RRCReconfiguration-v1530-IEs ::=      SEQUENCE {
  masterCellGroup                     OCTET STRING (CONTAINING CellGroupConfig)
fullConfig                            ENUMERATED {true} OPTIONAL, -- Cond FullConfig
...
}

CellGroupConfig ::=             SEQUENCE {
  cellGroupId                   CellGroupId,
  rlc-BearerToAddModList        SEQUENCE (SIZE(1..maxLC-ID)) OF RLC-BearerConfig
  rlc-BearerToReleaseList       SEQUENCE (SIZE(1..maxLC-ID)) OF LogicalChannelIdentity
  mac-CellGroupConfig           MAC-CellGroupConfig          OPTIONAL, -- Need M
  physicalCellGroupConfig       PhysicalCellGroupConfig      OPTIONAL, -- Need M
  spCellConfig                  SpCellConfig                 OPTIONAL, -- Need M
  sCellToAddModList             SEQUENCE (SIZE (1..maxNrofSCells)) OF SCellConfig
  sCellToReleaseList            SEQUENCE (SIZE (1..maxNrofSCells)) OF SCellIndex
...,
}

SpCellConfig ::=                SEQUENCE {
  servCellIndex                 ServCellIndex                OPTIONAL, -- Cond SCG
  reconfigurationWithSync       ReconfigurationWithSync      OPTIONAL, -- Cond
ReconfWithSync
  rlf-TimersAndConstants        SetupRelease { RLF-TimersAndConstants }
  rlmInSyncOutOfSyncThreshold ENUMERATED {n1}
  spCellConfigDedicated         ServingCellConfig
...,
}

ReconfigurationWithSync ::=     SEQUENCE {
  spCellConfigCommon            ServingCellConfigCommon
  newUE-Identity                RNTI-Value,
  t304                          ENUMERATED {ms50, ms100, ms150, ...},
  rach-ConfigDedicated          CHOICE {
    uplink                      RACH-ConfigDedicated,
    supplementaryUplink         RACH-ConfigDedicated
}
...,
[[ smtc SSB-MTC ]],
...}
```

FIG. 39

```
RRCReconfiguration-v1610-IEs ::=        SEQUENCE {
otherConfig-v1610                       OtherConfig-v1610
bap-Config-r16                          SetupRelease { BAP-Config-r16 }
iab-IP-AddressConfigurationList-r16     IAB-IP-AddressConfigurationList-r16
conditionalReconfiguration-r16          ConditionalReconfiguration-r16
daps-SourceRelease-r16                  ENUMERATED{true}
t316-r16                                SetupRelease {T316-r16}
...
targetCellSMTC-SCG-r16                  SSB-MTC
}

ConditionalReconfiguration-r16 ::= SEQUENCE {
attemptCondReconfig-r16 ENUMERATED {true}
condReconfigToRemoveList-r16 CondReconfigToRemoveList-r16
condReconfigToAddModList-r16 CondReconfigToAddModList-r16
...
}
CondReconfigToAddModList-r16 ::= SEQUENCE (SIZE (1.. maxNrofCondCells-r16)) OF
CondReconfigToAddMod-r16
CondReconfigToAddMod-r16 ::= SEQUENCE {
condReconfigId-r16 CondReconfigId-r16,
condExecutionCond-r16 SEQUENCE (SIZE (1..2)) OF MeasId
condRRCReconfig-r16 OCTET STRING (CONTAINING RRCReconfiguration)
...,
}
CondReconfigId-r16 ::= INTEGER (1.. maxNrofCondCells-r16)
```

*condExecutionCond*

The execution condition that needs to be fulfilled in order to trigger the execution of a conditional reconfiguration for CHO, CPA, intra-SN CPC without MN involvement or MN initiated inter-SN CPC. When configuring 2 triggering events (Meas Ids) for a candidate cell, network ensures that both refer to the same *measObject.* For CHO, if network configures *condEventD1* or *condEventT1* for a candidate cell network configures a second triggering event *condEventA3, condEventA4* or *condEventA5* for the same candidate cell. Network does not configure both *condEventD1* and *condEventT1* for the same candidate cell.

CondEvent A3: Conditional reconfiguration candidate becomes amount of offset better than PCell/PSCell;

CondEvent A4: Conditional reconfiguration candidate becomes better than absolute threshold;

CondEvent A5: PCell/PSCell becomes worse than absolute threshold1 AND Conditional reconfiguration candidate becomes better than another absolute threshold2;

FIG. 41

PRIMARY CELL CHANGING TRIGGERED BY LAYER 1 AND 2 SIGNALING

CROSS-REFERENCE TO RELATED APPLICATIONS

This application claims the benefit of U.S. Provisional Application No. 63/408,203 filed on Sep. 20, 2022. The above-referenced application is hereby incorporated by reference in its entirety.

BACKGROUND

In some wireless communications, a wireless device connects with a base station via a primary cell (PCell) and communicates with a base station via the primary cell and one or more secondary cells. The wireless device switches cells for mobility using handover (HO) procedures.

SUMMARY

The following summary presents a simplified summary of certain features. The summary is not an extensive overview and is not intended to identify key or critical elements.

A wireless device may communicate with abase station via a primary cell (PCell) and one or more secondary cells. The wireless device may perform a handover of its PCell to one of the candidate cells. A layer 1/layer 2 (layer 1 and/or layer 2) triggered handover may switch the PCell to a candidate cell for increased energy savings and/or mobility management. Prior to the layer 1/layer 2 triggered handover, the wireless device may be in the process of a conditional handover (CHO). For example, the layer 1/layer 2 triggered handover may be based on receiving group common (GC) downlink control information (DCI) indicating a change of the PCell to a GC PCell for a plurality of wireless devices in a group. The wireless device may determine whether to follow or ignore one or more handover requests (e.g., the layer 1/layer 2 triggered handover or the CHO), based on or more conditions, such as a priority value associated with a type of handover.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 19 shows example logical channel identifier (LCID) values.

FIG. 20 shows example LCID values.

FIG. 21A and FIG. 21B show example secondary cell (SCell) Activation/Deactivation MAC control elements (CEs).

FIG. 23 shows examples of various downlink control information (DCI) formats.

FIG. 24A shows an example master information block (MIB) message.

FIG. 24B shows an example configuration of a CORESET.

FIG. 24C shows an example of configuration of a search space.

FIG. 25 shows an example of a system information block (SIB).

FIG. 26 shows example RRC configuration parameters.

FIG. 27 shows an example configuration of a search space.

FIG. 34 shows an example of synchronization signal block (SSB) configurations.

FIG. 39 shows an example of RRC configuration of a normal HO procedure.

FIG. 41 shows an example of RRC configuration of a CHO procedure.

DETAILED DESCRIPTION

Figure 1A:
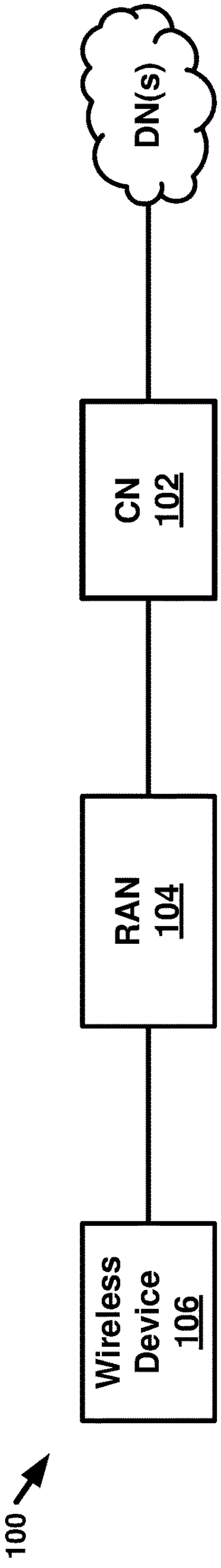
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems.

FIG. 1A shows an example communication network 100. The communication network 100 may comprise a mobile communication network. The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with the one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over/via an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a Generation Node B (gNB), an Next Generation Evolved Node B (ng-eNB), a relay node (e.g., an integrated access and backhaul (IAB) node), a donor node (e.g., a donor eNB, a donor gNB, etc.), an access point (AP) (e.g., a Wi-Fi access point), a transmission and reception point (TRP), a computing device, a device capable of wirelessly communicating, or any other device capable of sending and/or receiving signals. A base station may comprise one or more of the elements listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an eNB (e.g., associated with Evolved-Universal Terrestrial Radio Access (E-UTRA) and/or fourth-generation (4G) standards), a remote radio head (RRH), a baseband processing unit coupled to one or more RRHs, a repeater node or relay node used to extend the coverage area of a donor node, a ng-eNB, a gNB (e.g., associated with New Radio (NR) and/or fifth-generation (5G) standards), an AP (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface).

One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an AP, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
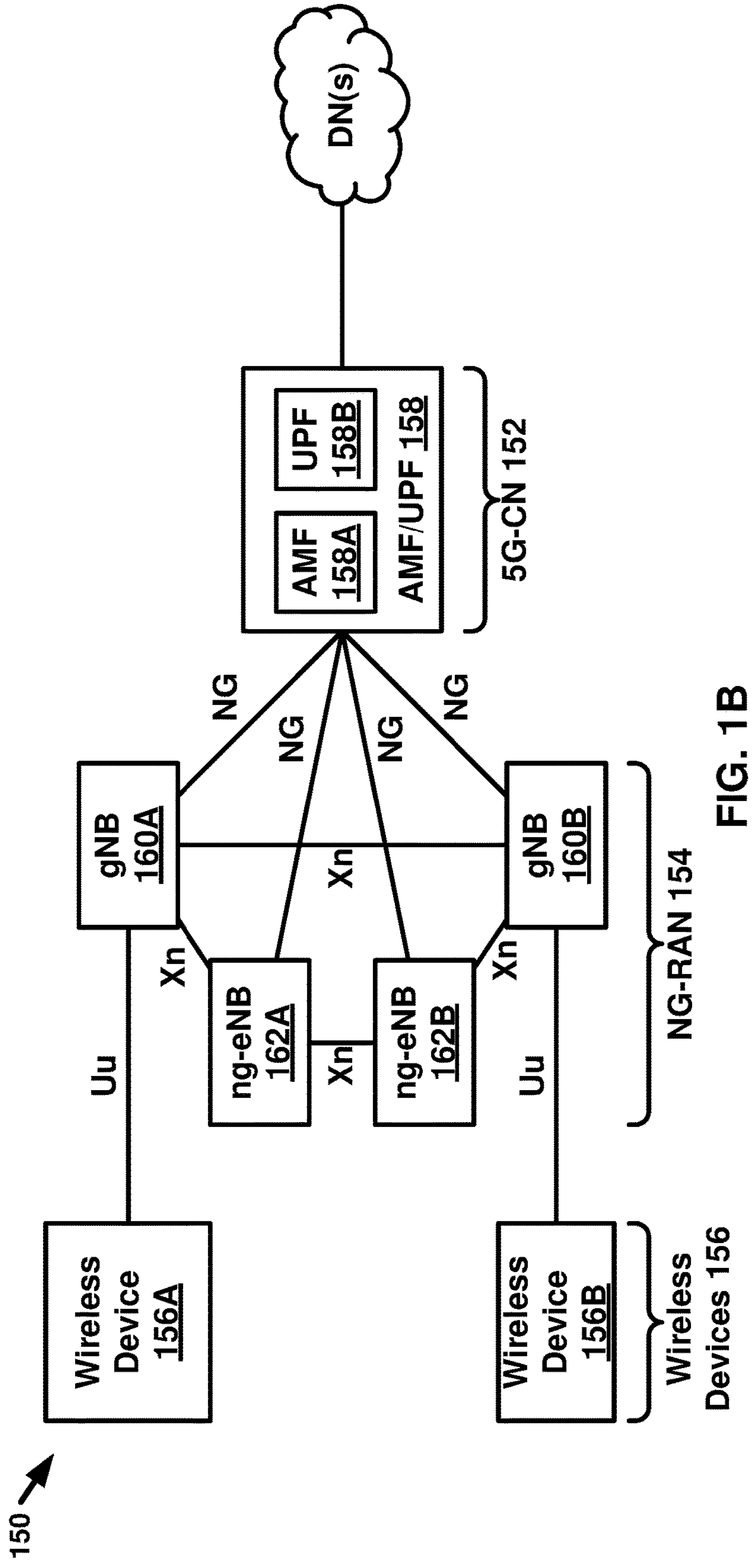

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to the one or more DNs 170. The wireless device(s) 156 may communicate with the one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs 170, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G-CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between the RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs 170, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng-eNBs comprising an ng-eNB 162A and an ng-eNB 162B (collectively ng-eNBs 162)). The RAN 154 may comprise one or more of any quantity of types of base station. The gNBs 160 and/or ng-eNBs 162 may be referred to as base stations. The base stations (e.g., the gNBs 160 and/or ng-eNBs 162) may comprise one or more sets of antennas for communicating with the wireless device(s) 156 wirelessly (e.g., an over an air interface). One or more base stations (e.g., the gNBs 160 and/or the ng-eNBs 162) may comprise multiple sets of antennas to respectively control multiple cells (or sectors). The cells of the base stations (e.g., the gNBs 160 and/or the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G-CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide E-UTRA user plane and control plane protocol terminations towards the wireless device(s) 156 via a Uu interface (e.g., where E-UTRA may refer to the 3GPP 4G radio-access technology). A base station (e.g., the ng-eNB 162B) may provide E-UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, IoT devices, hotspots, cellular repeaters, computing devices, and/or, more generally, UE. Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
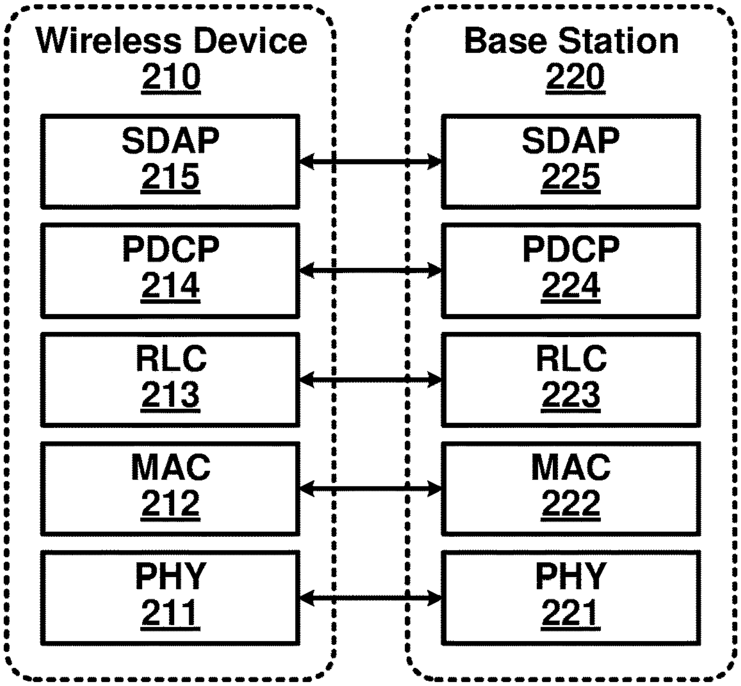
FIG. 2A shows an example user plane.
Figure 2B:
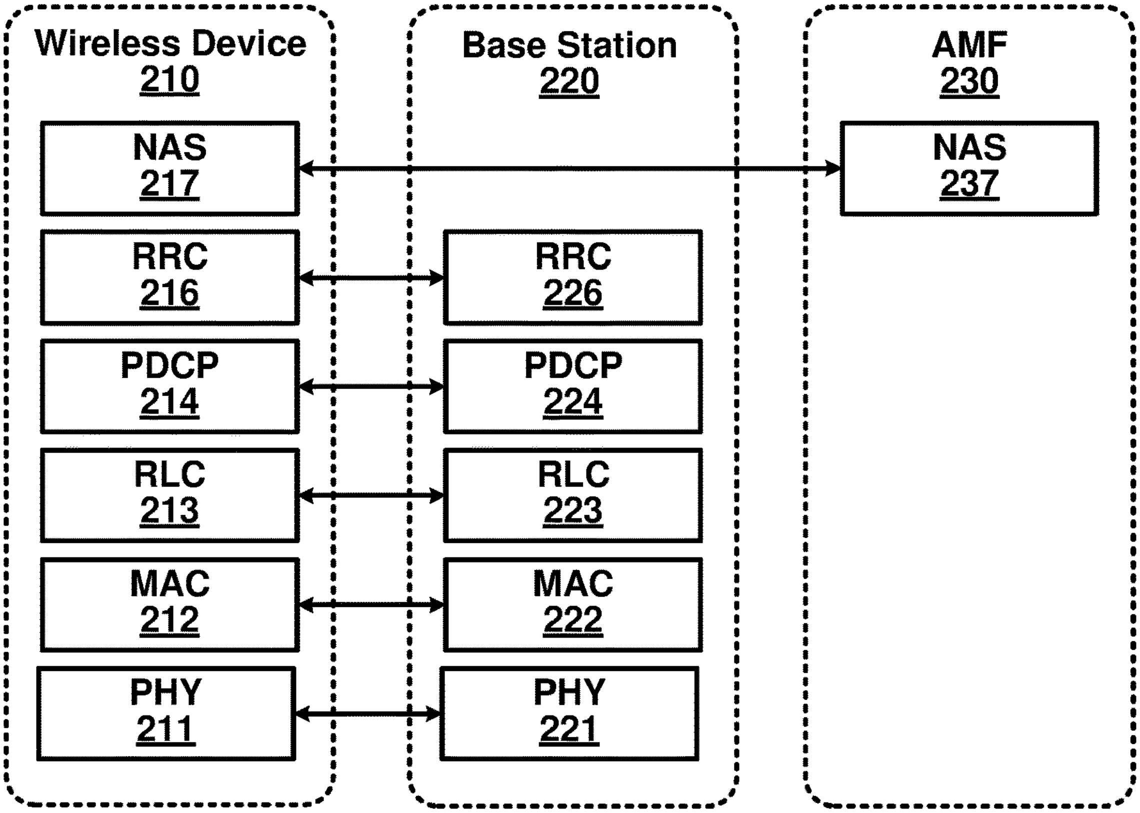
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configurations and/or the control plane configurations may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
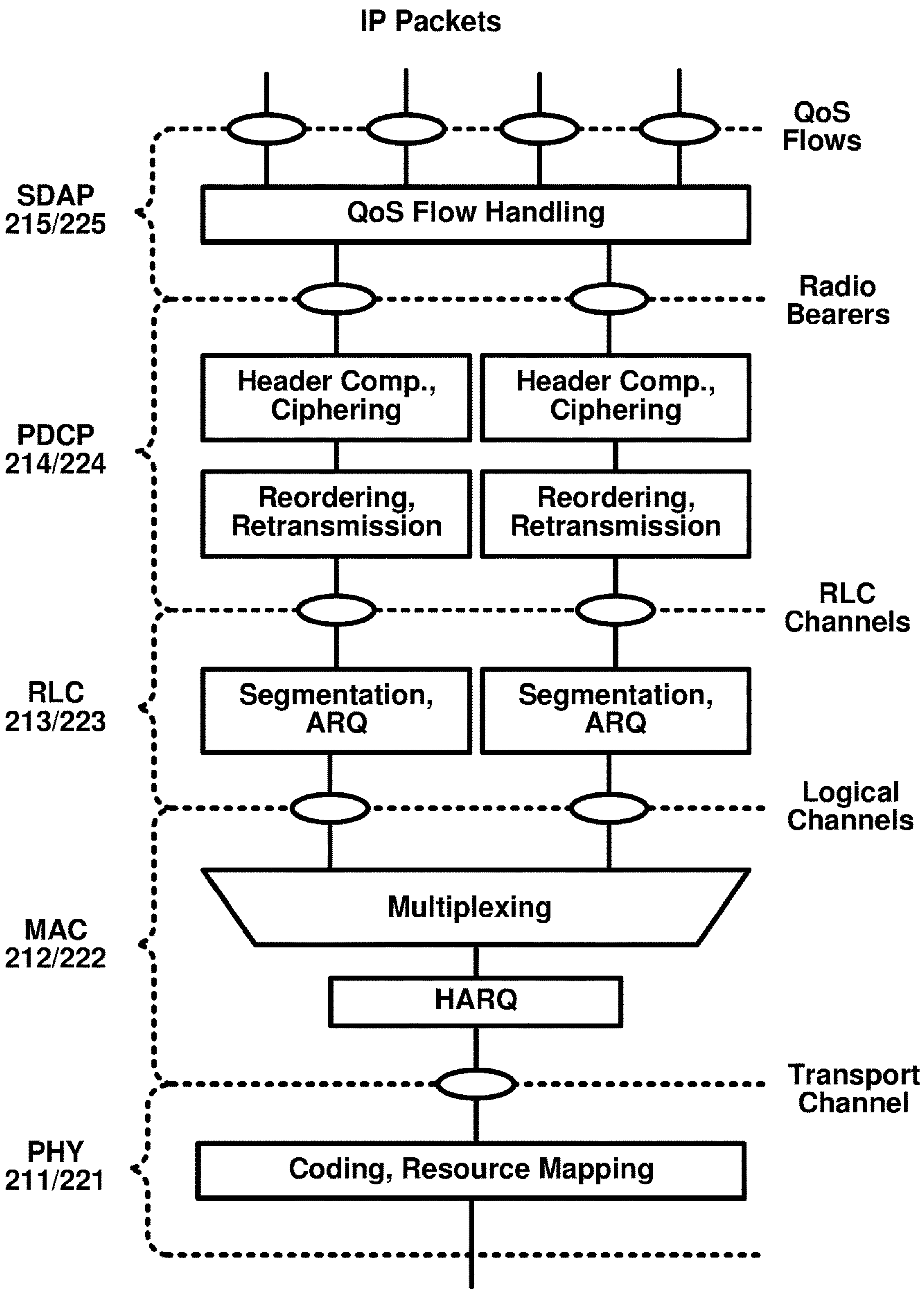
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform QoS flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows 310 of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers (e.g., RLCs 213 and 223) may perform one or more of the noted functions, for example, based on the transmission mode the RLC layer (e.g., RLCs 213 and 223) is operating. The RLC configuration may be per logical channel. The RLC configuration may not depend on numerologies and/or Transmission Time Interval (TTI) durations (or other durations). The RLC layers (e.g., RLCs 213 and 223) may provide/ configure RLC channels 330 as a service to the PDCP layers (e.g., PDCPs 214 and 224, respectively), such as shown in FIG. 3.

The MAC layers (e.g., MACs 212 and 222) may perform multiplexing/demultiplexing of logical channels 340 and/or mapping between logical channels 340 and transport channels 350. The multiplexing/demultiplexing may comprise multiplexing/demultiplexing of data units/data portions, belonging to the one or more logical channels 340, into/from Transport Blocks (TBs) delivered to/from PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels 340 of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels 350 to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
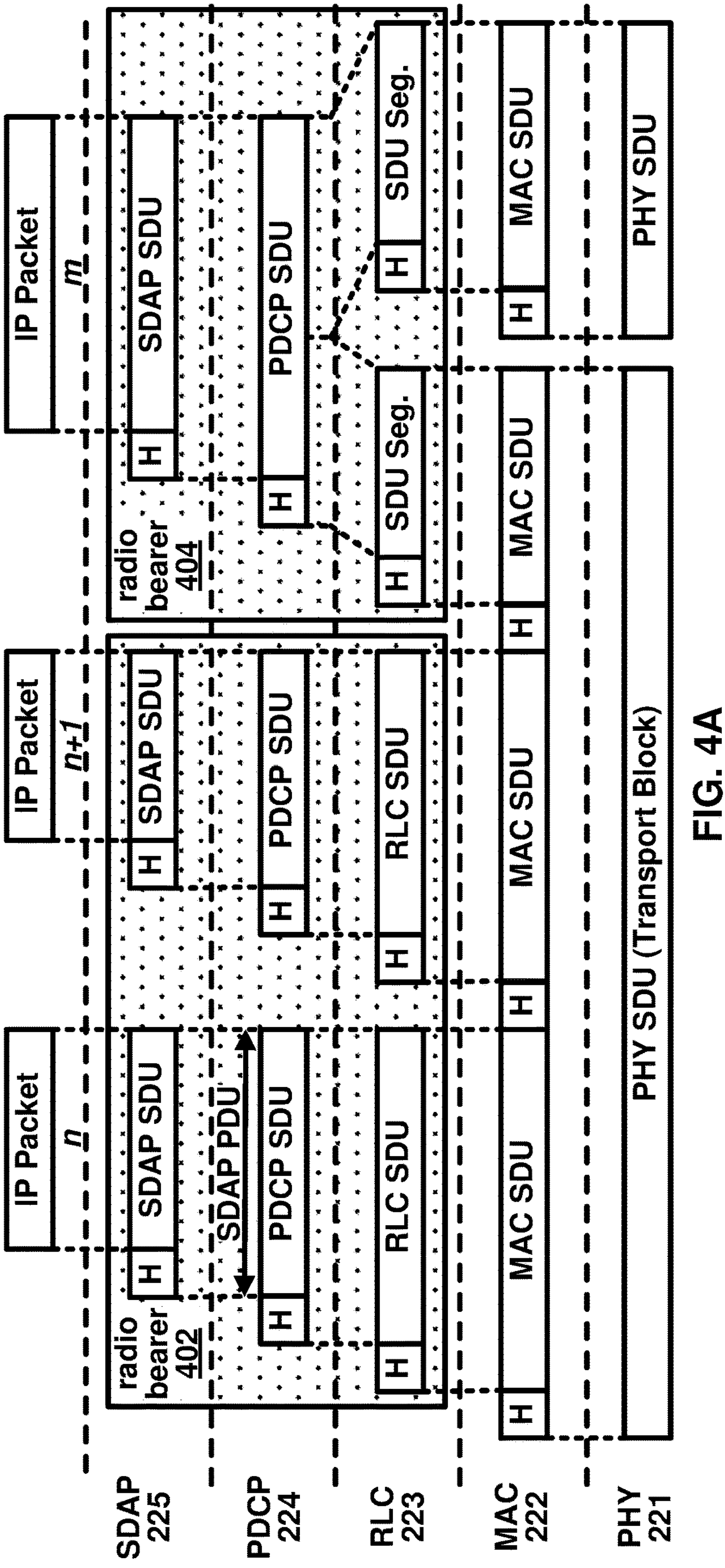
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with “H” preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
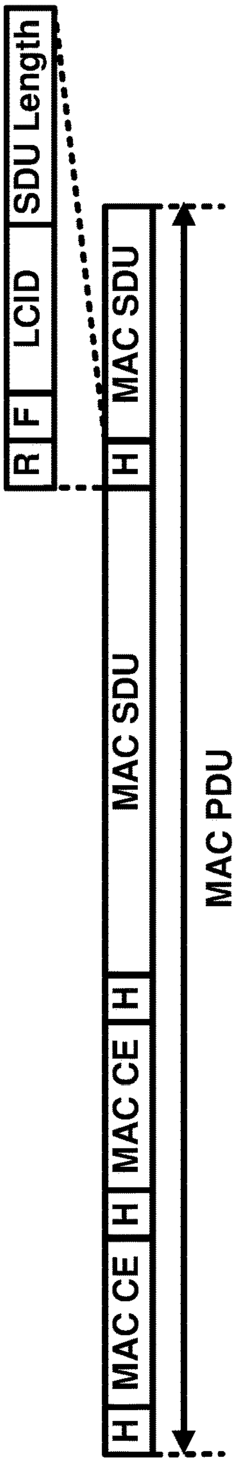
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 212 or MAC 222. As shown in FIG. 4B, two MAC CEs may be inserted into/added to the MAC PDU. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
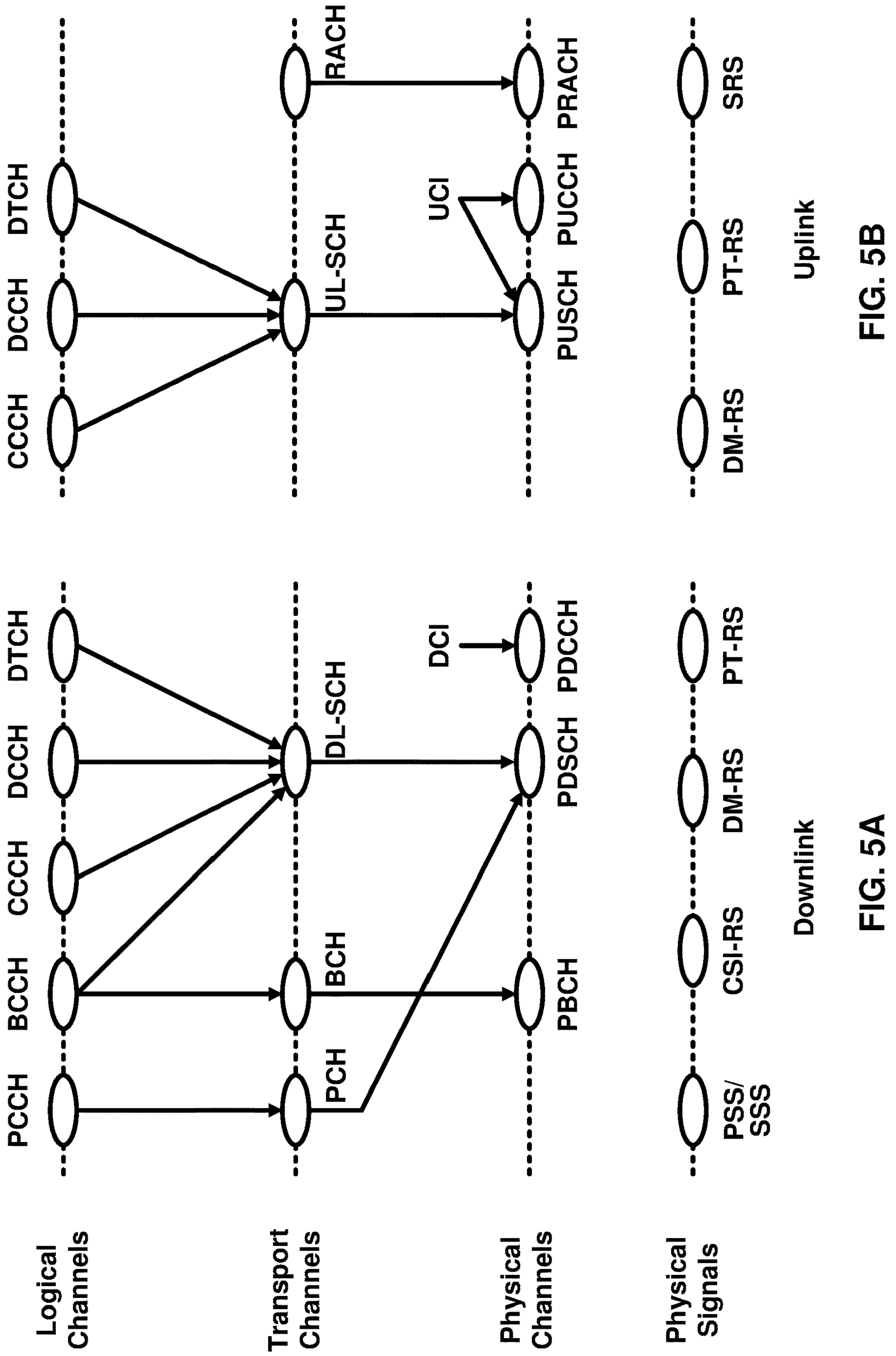
FIG. 5A shows an example mapping for downlink channels.
FIG. 5B shows an example mapping for uplink channels.

FIG. 5A shows an example mapping for downlink channels. The mapping for downlink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may comprise an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The PHY layer may generate physical signals to support the low-level operation of the PHY layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), SRS, phase-tracking reference signals (PT RS), and/or any other signals.

One or more of the channels (e.g., logical channels, transport channels, physical channels, etc.) may be used to carry out functions associated with the control plane protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHYs 211 and 221, MACs 212 and 222, RLCs 213 and 223, and PDCPs 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane protocol stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and substantially the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting and control of the reporting; detection of and recovery from radio link failure (RLF); and/or NAS message transfer. As part of establishing an RRC connection, the RRC layers 216 and 226 may establish an RRC context, which may involve configuring parameters for communication between the wireless device 210 and the RAN (e.g., the base station 220).

Figure 6:
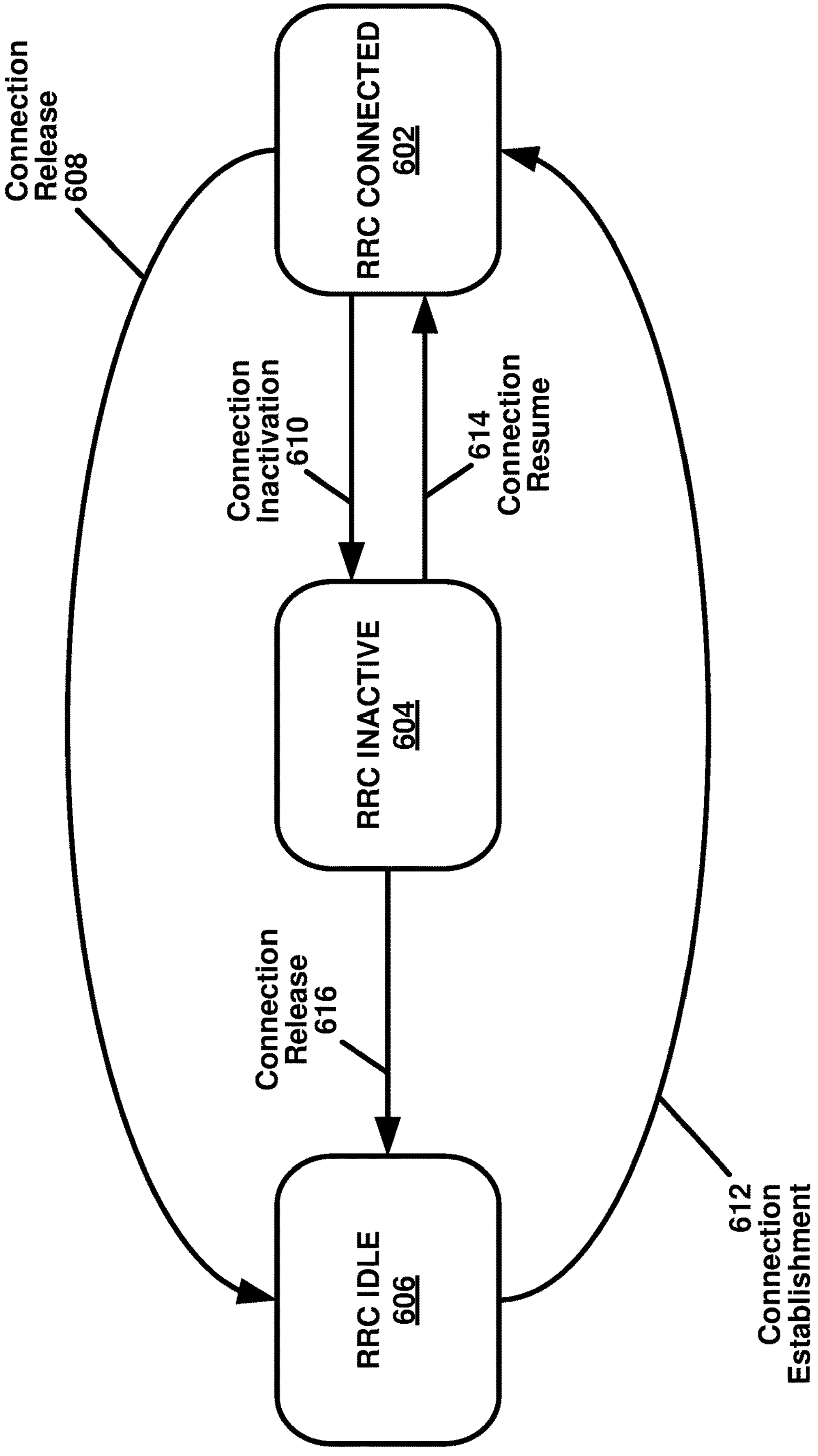
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104, the RAN 154, or any other RAN). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., the RRC connected 602) to an RRC idle state (e.g., the RRC idle 606) via a connection release procedure 608. The RRC state may transition from the RRC connected state (e.g., the RRC connected 602) to the RRC inactive state (e.g., the RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every DRX cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be substantially the same as or similar to connection release procedure 608.

An RRC state may be associated with a mobility management mechanism. During the RRC idle state (e.g., the RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC inactive state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., the RRC inactive 604).

A base station (e.g., the gNBs 160 in FIG. 1B or any other base station) may be split in two parts: a central unit (e.g., a base station central unit, such as a gNB-CU) and one or more distributed units (e.g., a base station distributed unit, such as a gNB-DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM may be a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbol streams may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
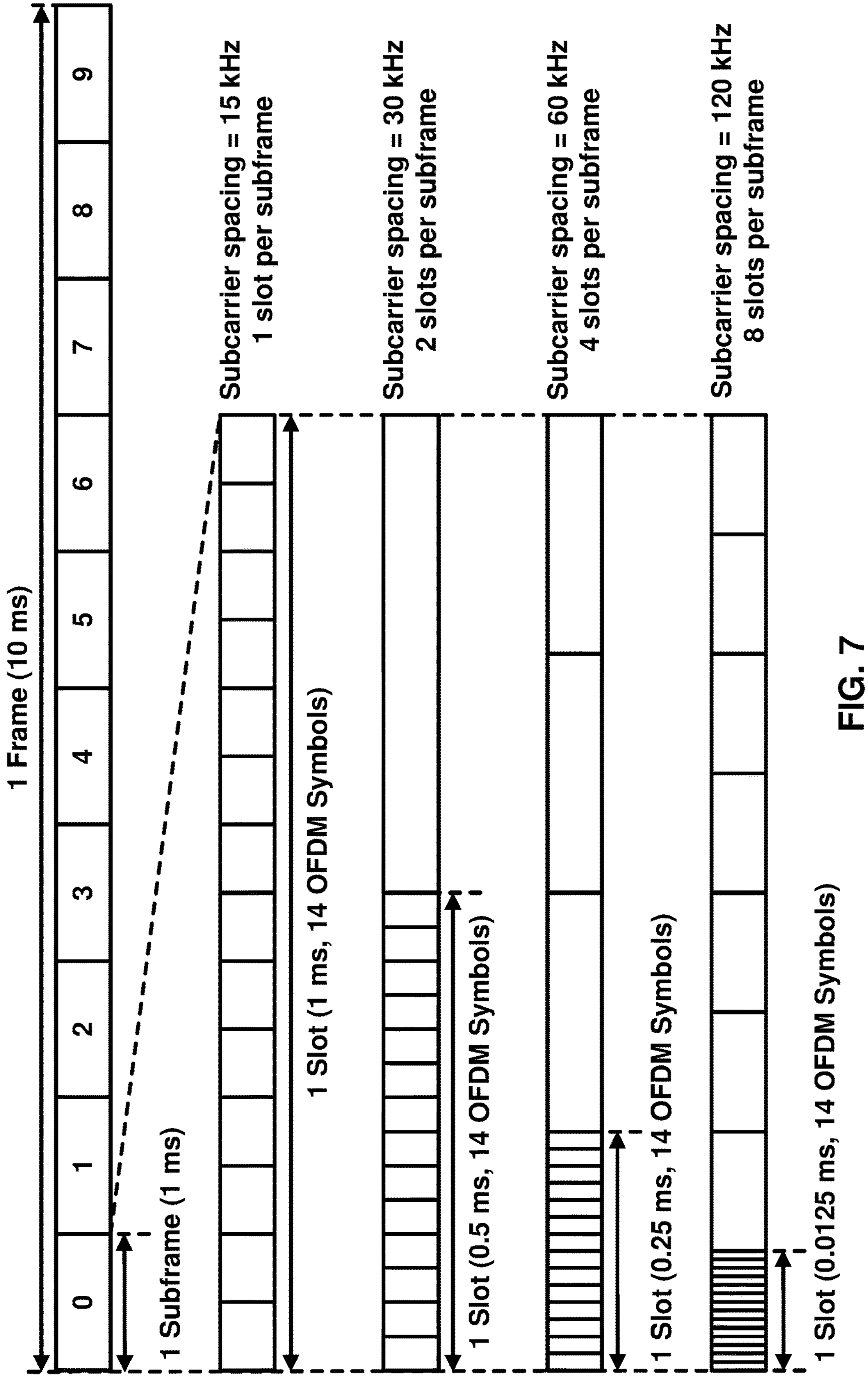
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR radio frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
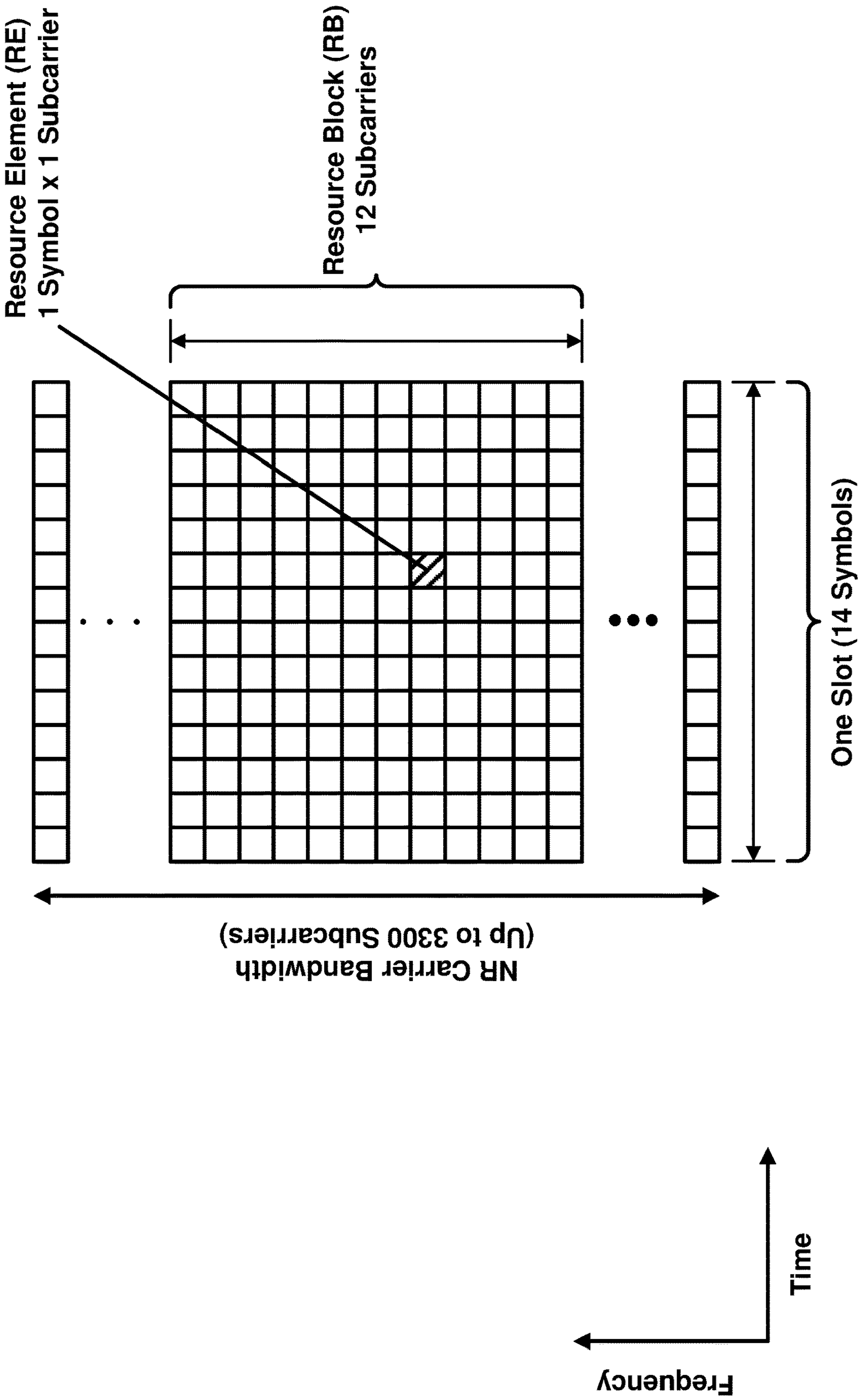
FIG. 8 shows an example resource configuration of one or more carriers.

FIG. 8 shows an example resource configuration of one or more carriers. The resource configuration may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR carrier such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in DCI. A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
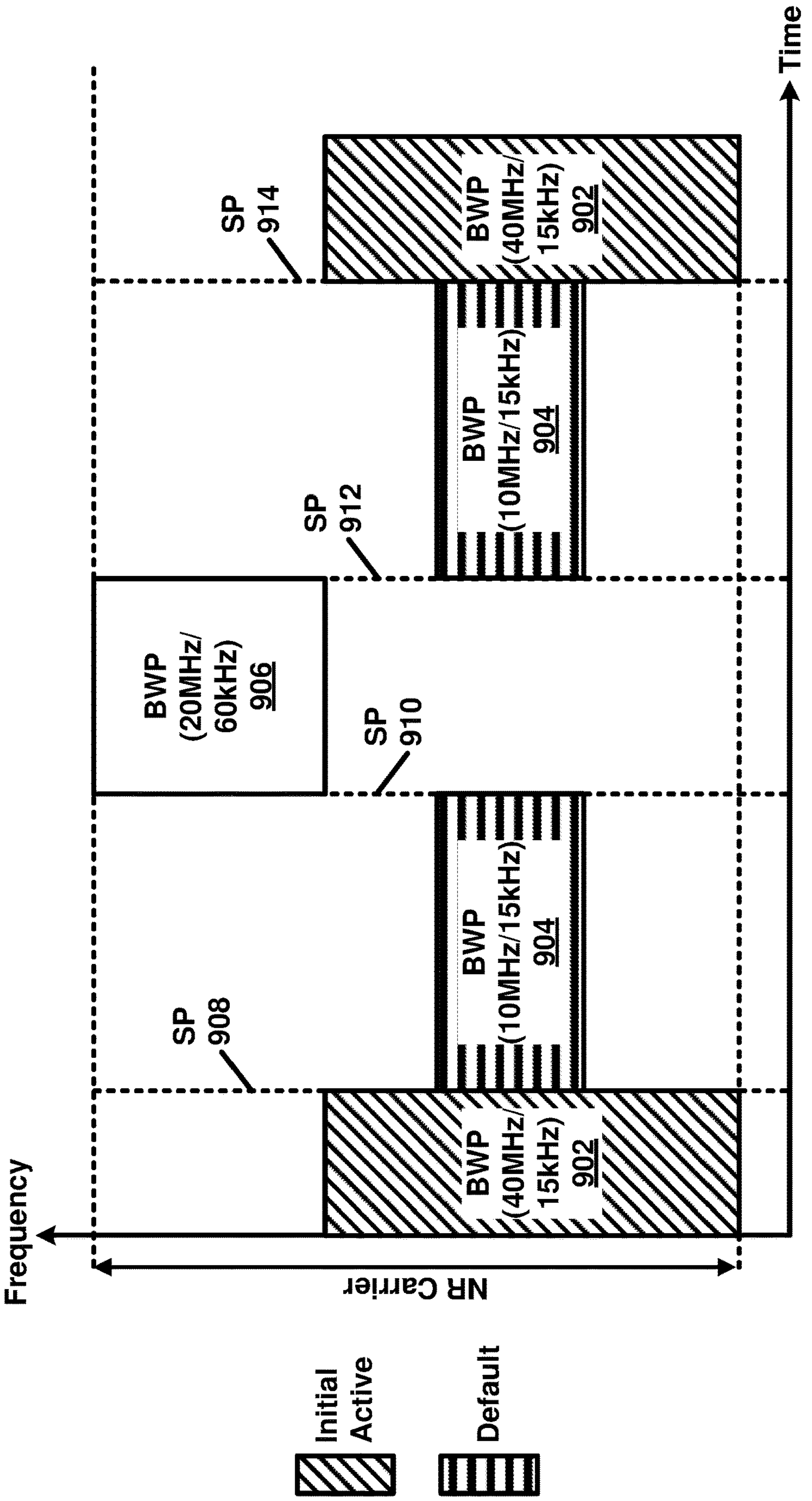
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at the switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating the BWP 904 as the active BWP. The wireless device may switch at a switching point 910 from the active BWP (e.g., the BWP 904) to the BWP 906, for example, after or in response receiving DCI indicating the BWP 906 as a new active BWP. The wireless device may switch at a switching point 912 from the active BWP (e.g., the BWP 906) to the BWP 904, for example, a based on (e.g., after or in response to) an expiry of a BWP inactivity timer. The wireless device may switch at the switching point 912 from the active BWP (e.g., the BWP 906) to the BWP 904, for example, after or in response to receiving DCI indicating the BWP 904 as a new active BWP. The wireless device may switch at a switching point 914 from the active BWP (e.g., the BWP 904) to the BWP 902, for example, after or in response receiving DCI indicating the BWP 902 as a new active BWP.

Wireless device procedures for switching BWPs on a secondary cell may be substantially the same/similar as those on a primary cell, for example, if the wireless device is configured for a secondary cell with a default downlink BWP in a set of configured downlink BWPs and a timer value. The wireless device may use the timer value and the default downlink BWP for the secondary cell in substantially the same/similar manner as the wireless device uses the timer value and/or default downlink BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
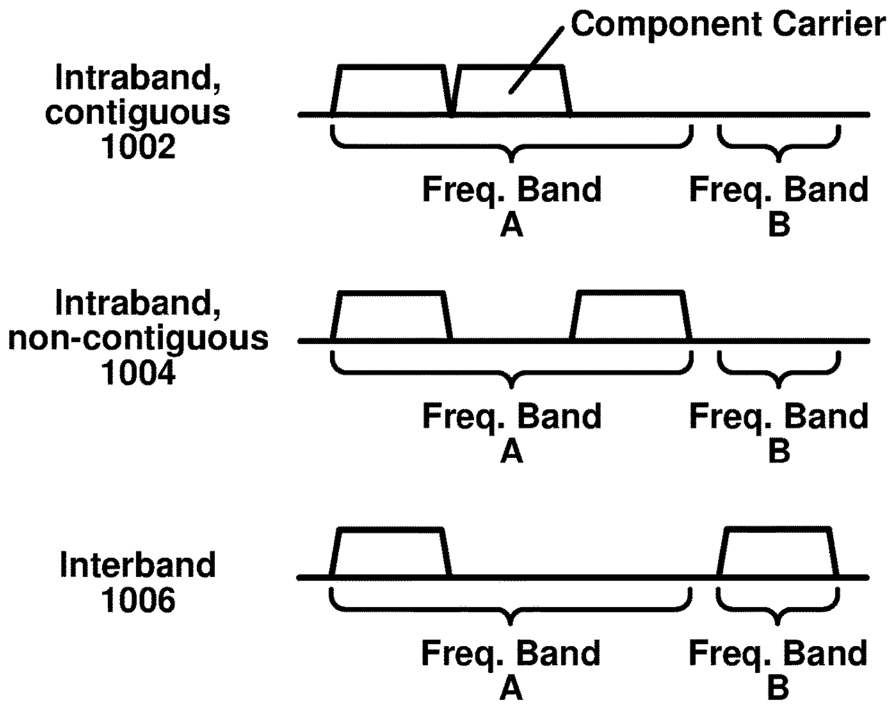
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless devices may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information for the downlink, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. UCI may comprise control information for the uplink, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
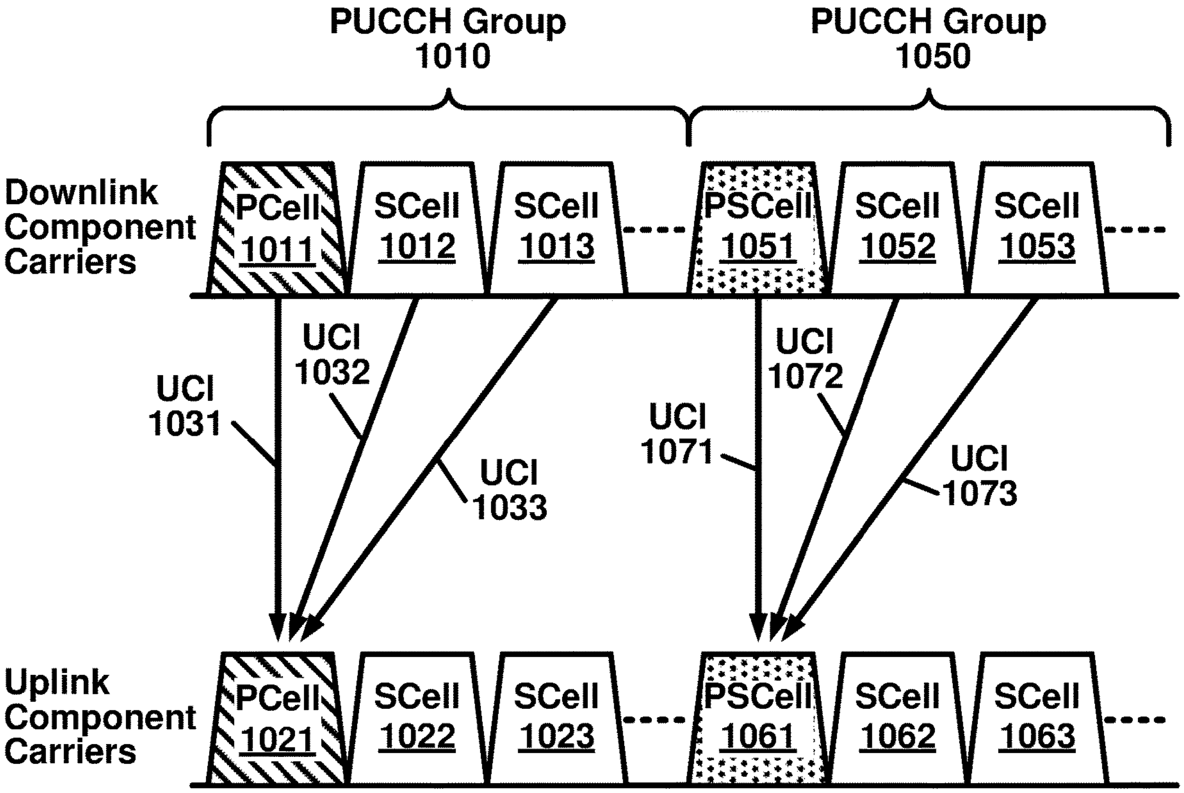
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may use/apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
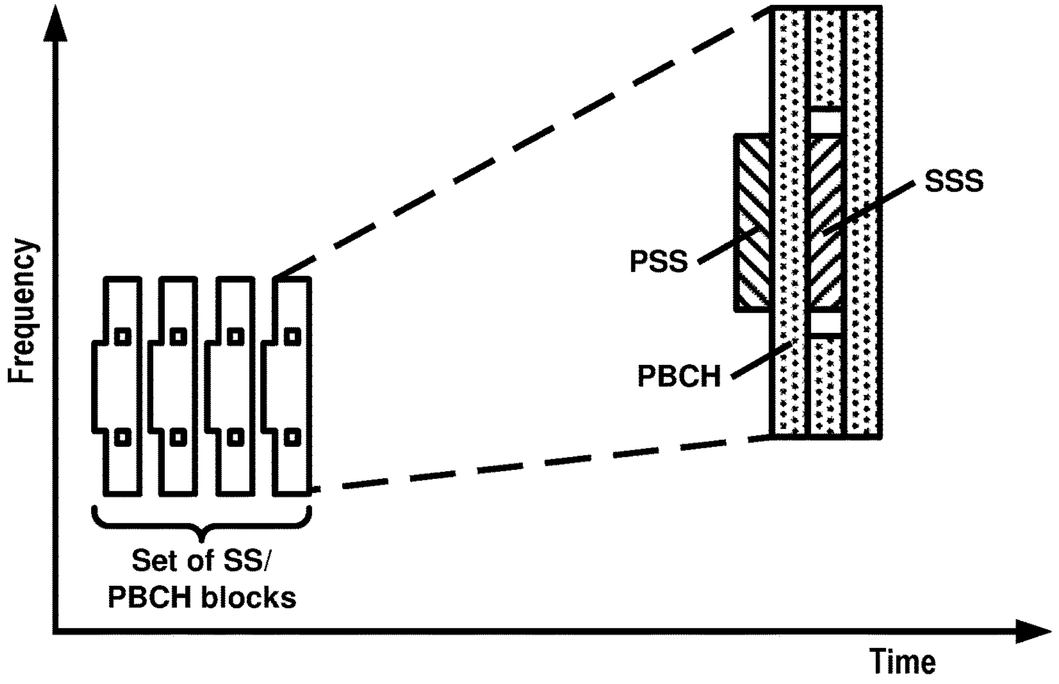
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial receiving (Rx) parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine CSI. The base station may configure the wireless device with one or more CSI-RSs for channel estimation or any other suitable purpose. The base station may configure a wireless device with one or more of substantially the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports (or any other quantity of orthogonal downlink DM-RS ports) per wireless device (e.g., for single user-MIMO). A DM-RS configuration may support up to 4 orthogonal downlink DM-RS ports (or any other quantity of orthogonal downlink DM-RS ports) per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be substantially the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with substantially the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as QCLed, for example, if one or more large-scale properties of the channel over which a first symbol on the first antenna port is conveyed may be inferred/determined from the channel over which a second symbol on a second antenna port is conveyed. The one or more large-scale properties may comprise at least one of: a delay spread; a Doppler spread; a Doppler shift; an average gain; an average delay; and/or spatial Rx parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
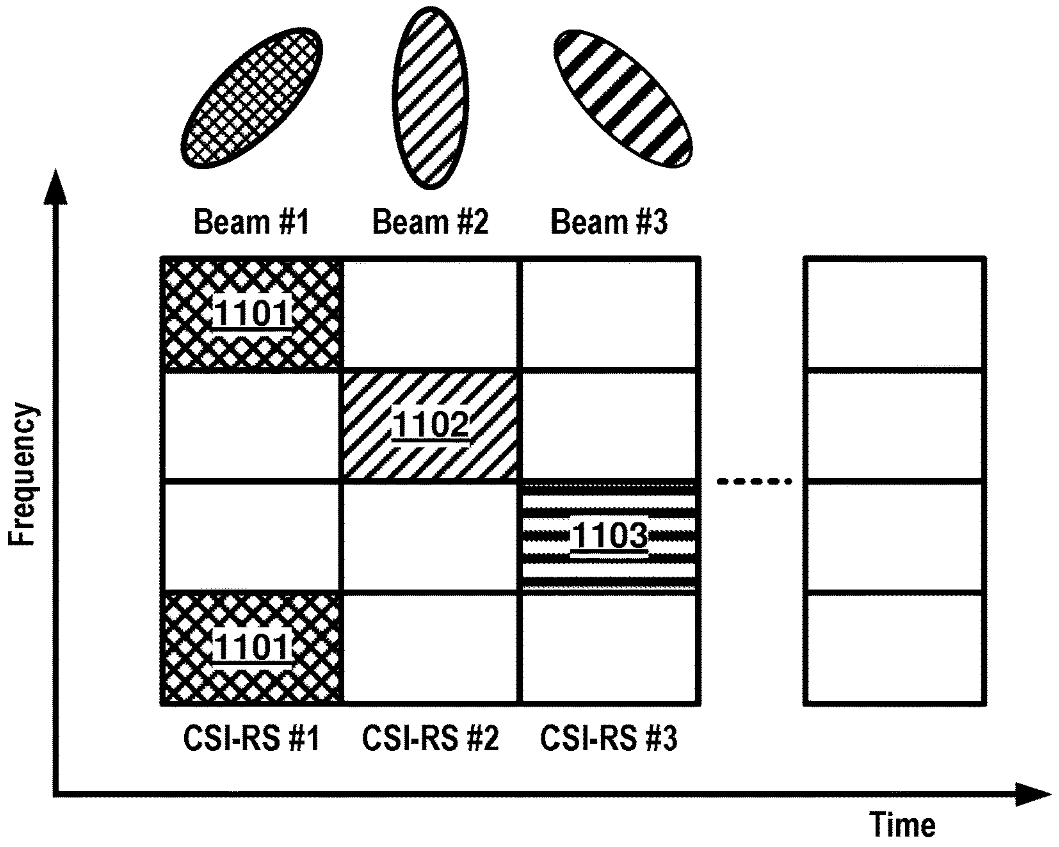
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a RB within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and RE locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, QCL parameters (e.g., QCL-scramblingidentity, crs-ports-count, mbsfn-subframeconfiglist, csi-rs-configZPid, qcl-csi-rs-configNZPid), and/or other radio resource parameters.

One or more beams may be configured for a wireless device in a wireless device-specific configuration. Three beams may be shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure a reference signal received power (RSRP) of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more SRS resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a PMI, a CQI, and/or a RI.

Figure 12A:
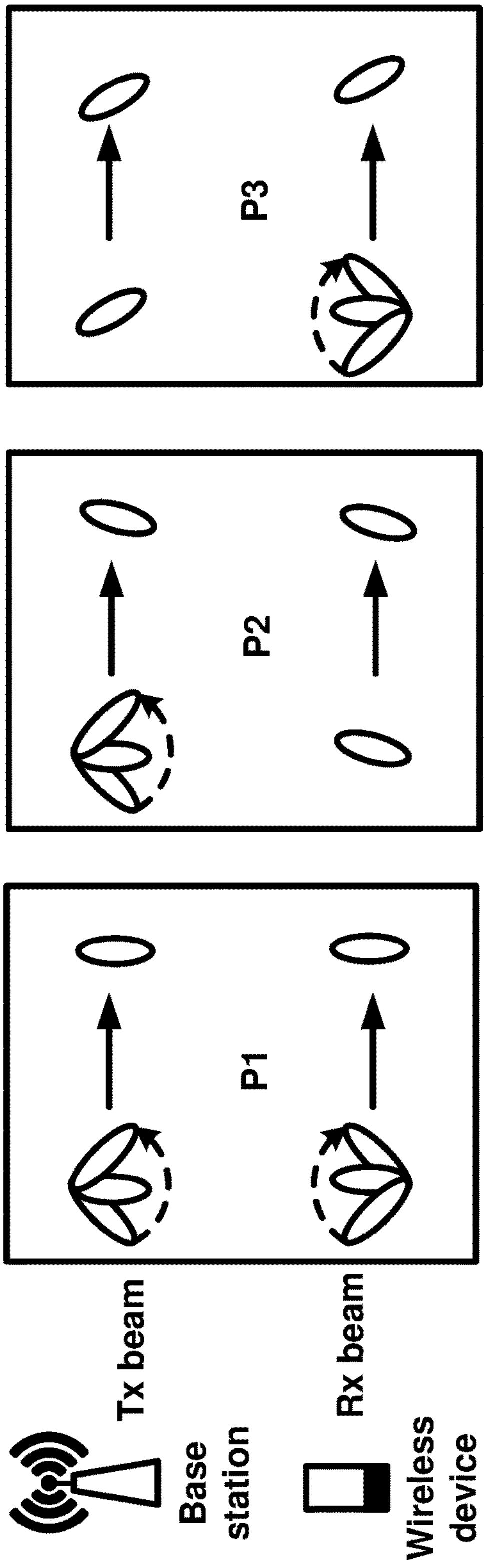
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
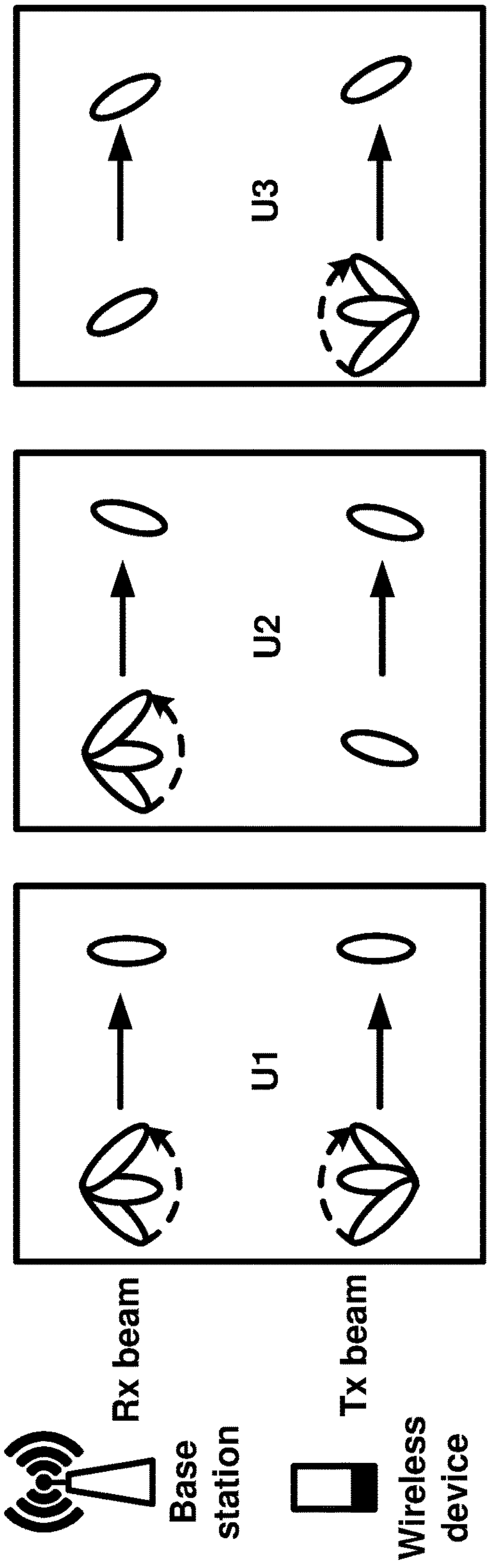
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the bottom row of U1 and top row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform abeam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more RSs comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are substantially the same or similar as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more SIBs (e.g., or any other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
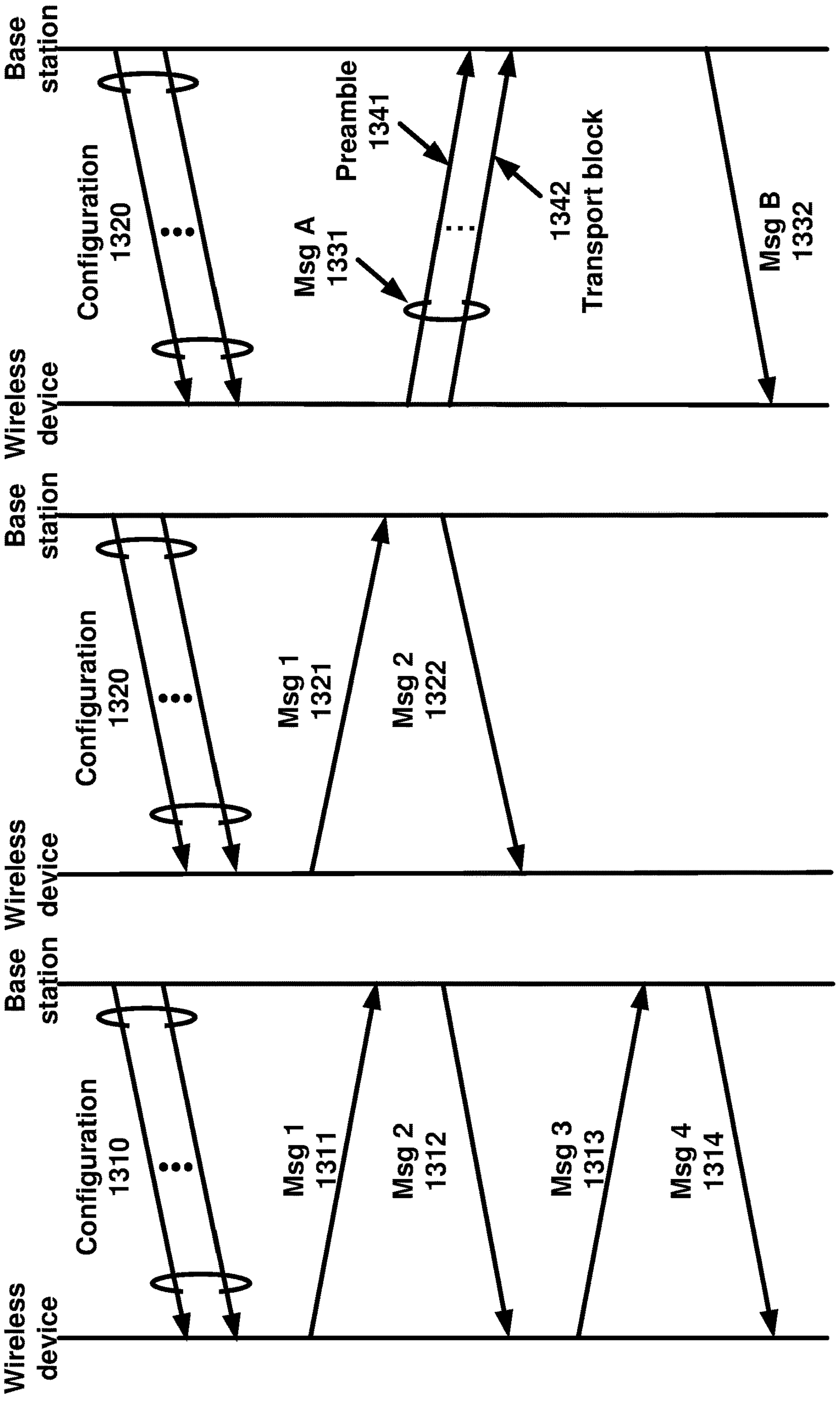
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more RACH parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more PRACH occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate at least one of: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network.

The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. RNTIs may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14\times t\_id+14\times 80\times f\_id+14\times 80\times 8\times ul\_\text{carrier}\_id,$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C-RNTI of the wireless device is detected on the PDCCH (e.g., the PDCCH is scrambled by the C-RNTI). The fourth message (e.g., Msg 4 1314) may be received using a DL-SCH associated with a TC-RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., for the first message (e.g., Msg 1 1311) and/or the third message (e.g., Msg 3 1313)). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

The first message (e.g., Msg A 1331) may be sent/transmitted in an uplink transmission by the wireless device. The first message (e.g., Msg A 1331) may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as DCI. The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as “FFFE” in hexadecimal. DCI having CRC parity bits scrambled with a system information RNTI (SI-RNTI) may indicate a broadcast transmission of the system information. The SI-RNTI may be predefined as “FFFF” in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
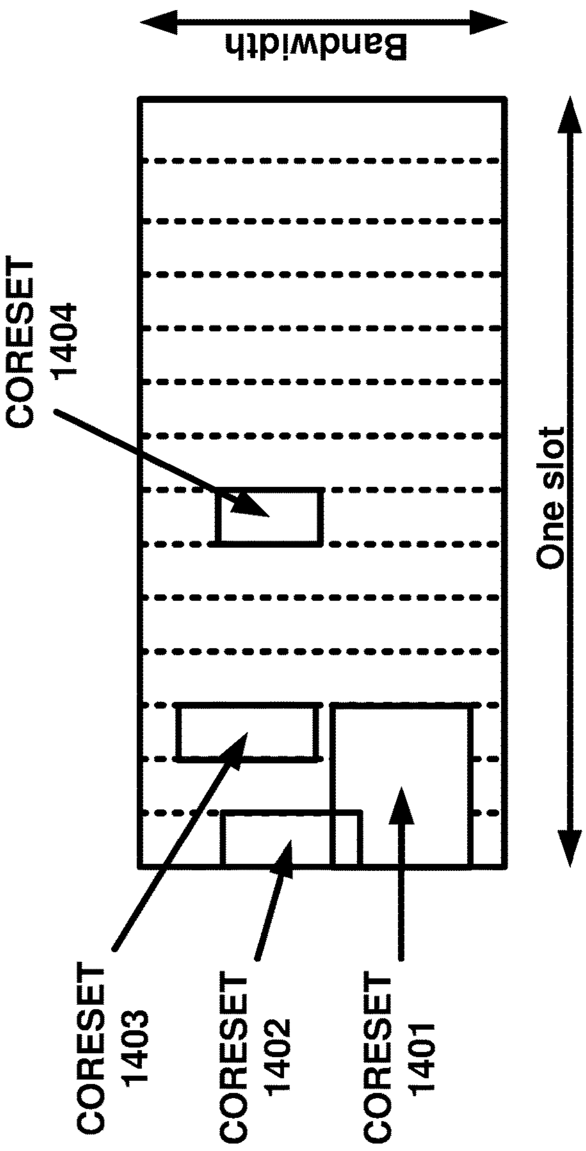
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more CORESETs. A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
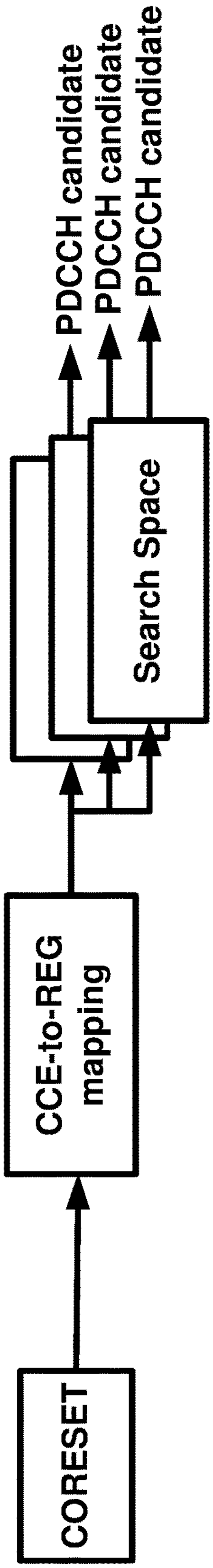
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a quantity/number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the quantity/number of CCEs, the quantity/number of PDCCH candidates in common search spaces, and/or the quantity/number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise SR. The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a quantity/number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a quantity/number of OFDM symbols (e.g., between four and fourteen OFDM symbols) and may comprise two or fewer bits. The wireless device may use PUCCH format 1, for example, if the transmission is over/via four or more symbols and the quantity/number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a quantity/number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a quantity/number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a quantity/number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from a PUCCH resource set for UCI (HARQ-ACK, CSI, and/or SR) transmission, for example, after determining the PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
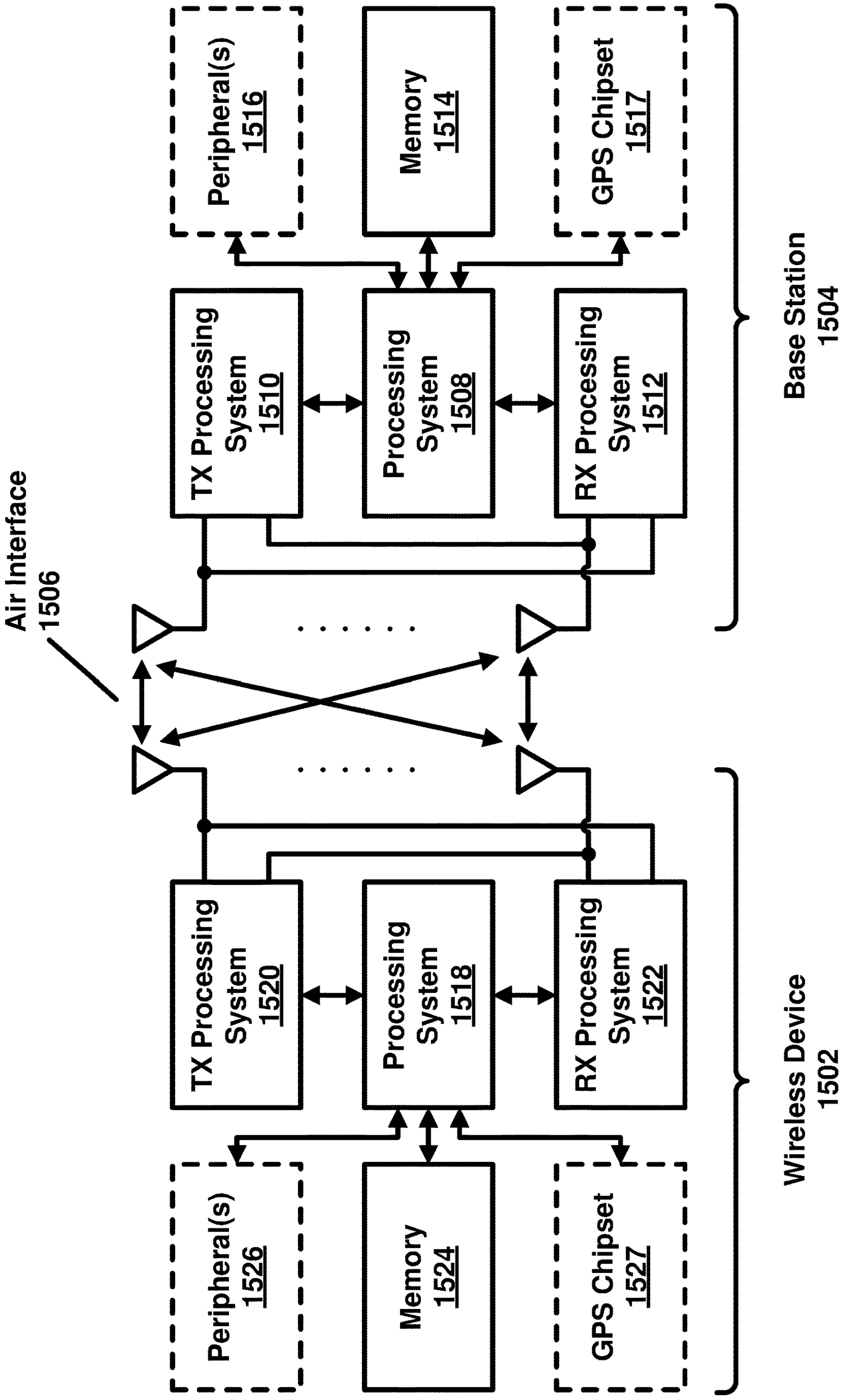
FIG. 15A shows an example of communications between a wireless device and a base station.

FIG. 15A shows an example of communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), afield programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
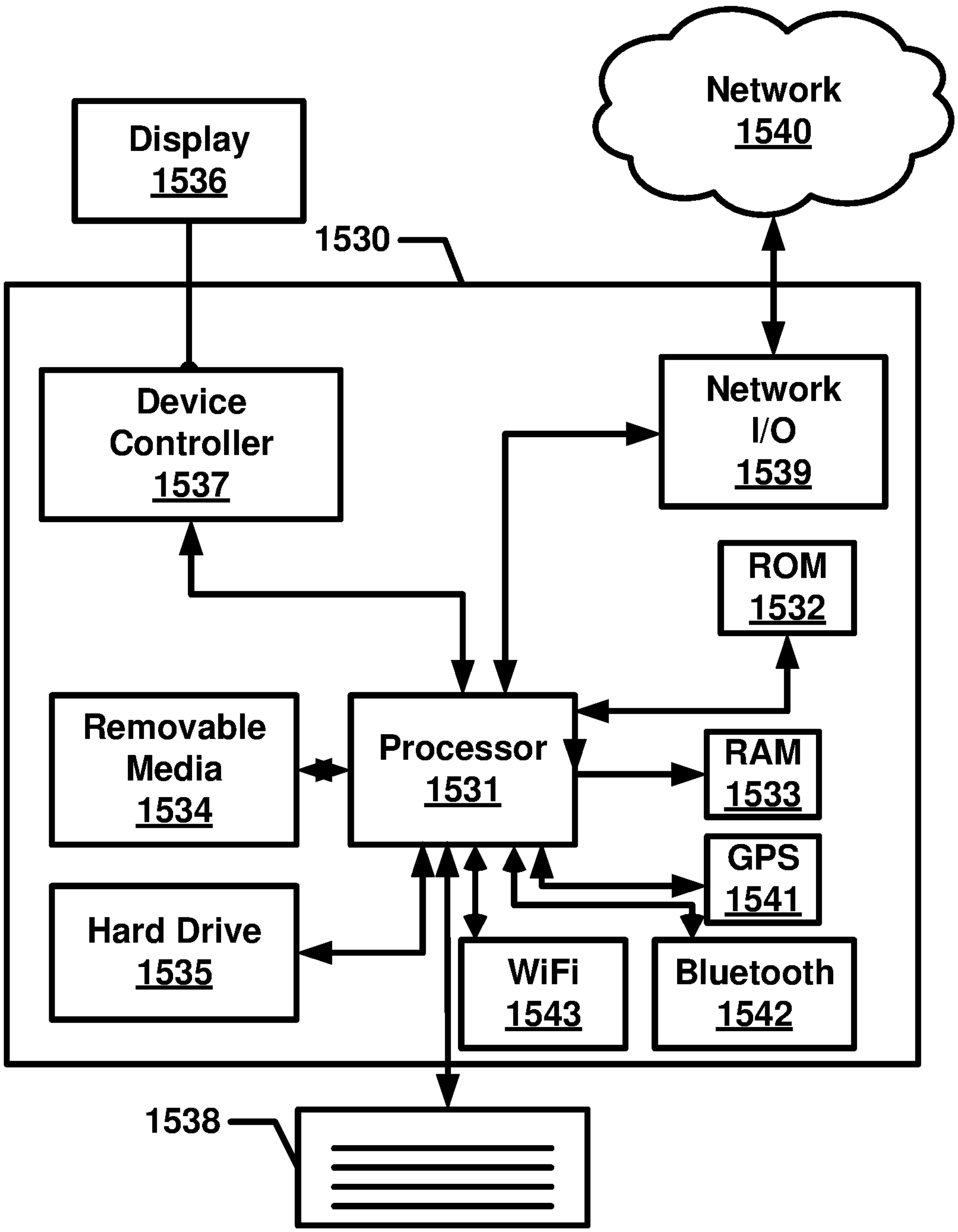
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a USB drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a GPS microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
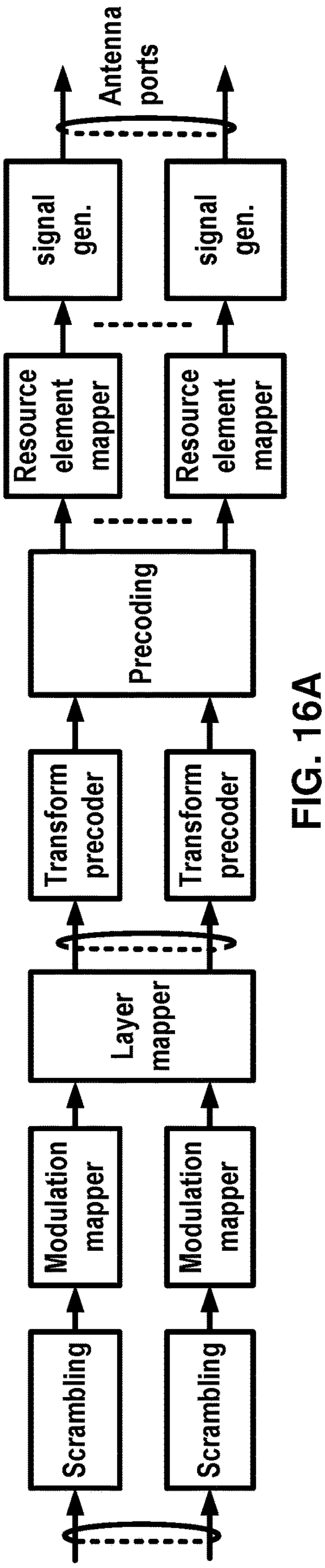
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
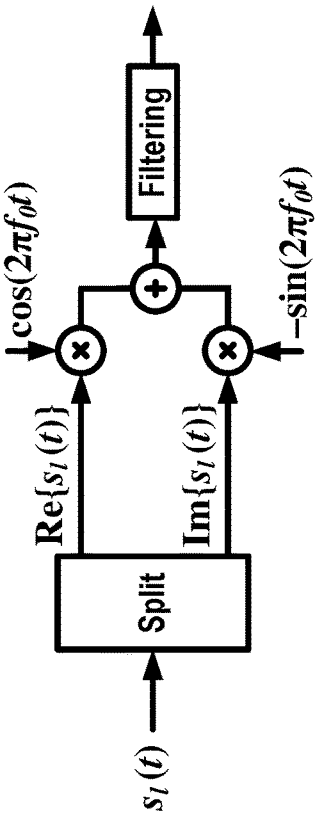

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
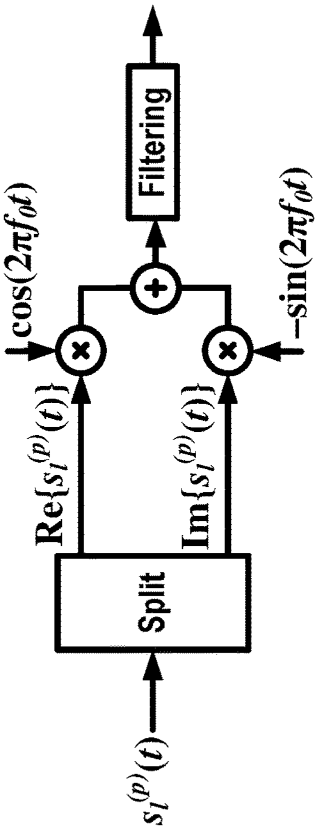
Figure 16C:
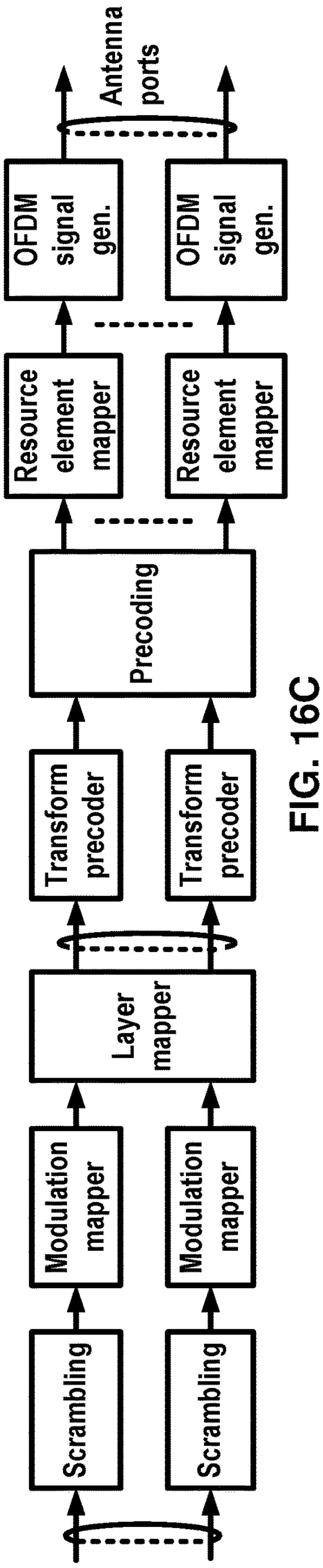

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., aligned to a multiple of eight bits) in length. Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottommost line of the table). The bit order of a parameter field within a MAC PDU may be represented with the first and most significant bit in the leftmost bit and the last and least significant bit in the rightmost bit.

A MAC SDU may be a bit string that is byte aligned (e.g., aligned to a multiple of eight bits) in length. A MAC SDU may be comprised in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, and/or a combination thereof. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; an L field with a multi-bit length; and/or a combination thereof, for example, if the MAC subheader corresponds to a MAC SDU, a variable-sized MAC CE, or padding.

Figure 17A:
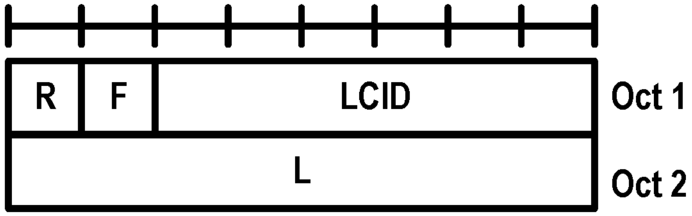
FIG. 17A, FIG. 17B, and FIG. 17C show example MAC subheaders.
Figure 17B:
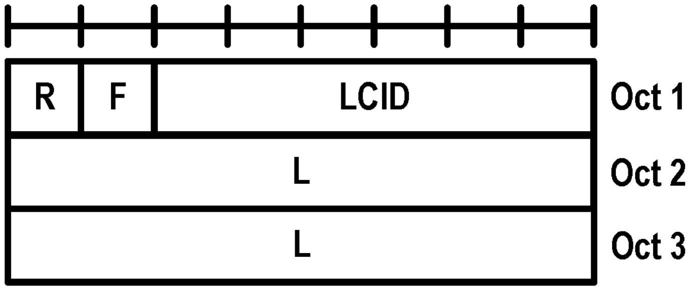
Figure 17C:
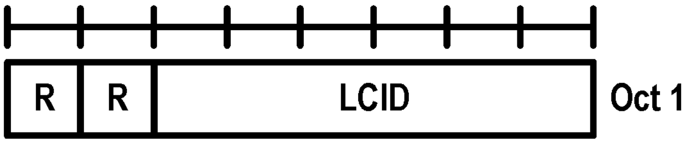

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field. Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

Figure 18A:
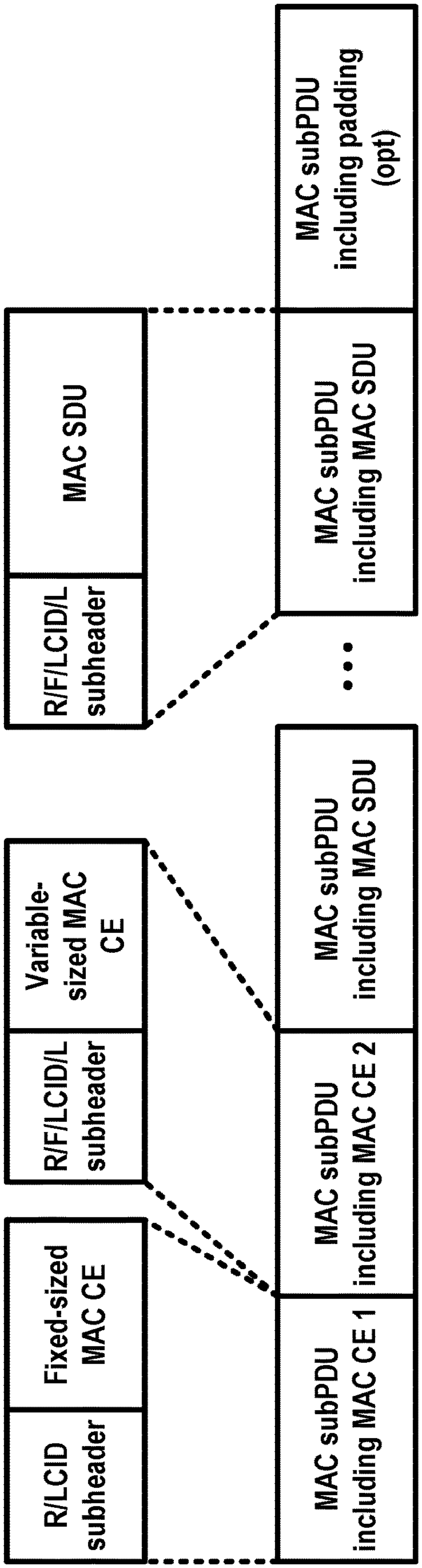
FIG. 18A and FIG. 18B show example MAC PDUs.

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

Figure 18B:
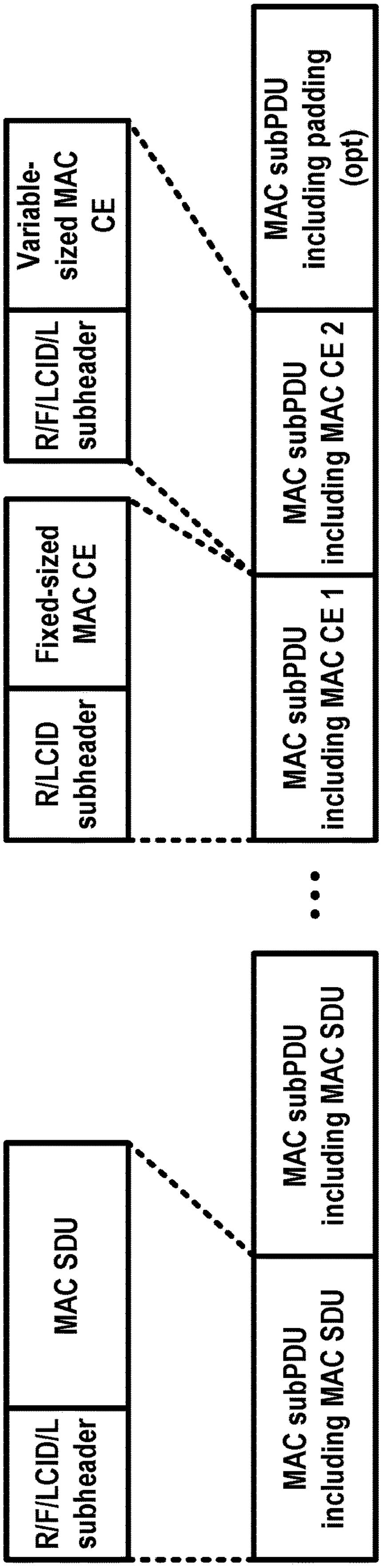

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more CCs may be aggregated, such as in carrier aggregation (CA). A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., "activated") or a dormant state (e.g., "dormant"), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

FIG. 21A shows an example SCell Activation/Deactivation MAC CE of one octet. A first MAC PDU subheader comprising a first LCID (e.g., '111010' as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

FIG. 21B shows an example SCell Activation/Deactivation MAC CE of four octets. A second MAC PDU subheader comprising a second LCID (e.g., '111001' as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

A base station may configure a wireless device with uplink (UL) BWPs and downlink (DL) BWPs to enable bandwidth adaptation (BA) on a PCell. The base station may further configure the wireless device with at least DL BWP(s) (i.e., there may be no UL BWPs in the UL) to enable BA on an SCell, for example, if carrier aggregation is configured. An initial active BWP may be a first BWP used for initial access, for example, for a PCell. A first active BWP may be a second BWP configured for the wireless device to operate on a SCell upon the SCell being activated. A base station and/or a wireless device may independently switch a DL BWP and an UL BWP, for example, in paired spectrum (e.g., FDD). A base station and/or a wireless device may simultaneously switch a DL BWP and an UL BWP, for example, in unpaired spectrum (e.g., TDD).

A base station and/or a wireless device may switch a BWP between configured BWPs using a DCI message or a BWP inactivity timer. The base station and/or the wireless device may switch an active BWP to a default BWP based on (e.g., after or in response to) an expiry of the BWP inactivity timer associated with the serving cell, for example, if the BWP inactivity timer is configured for a serving cell. The default BWP may be configured by the network. One UL BWP for an uplink carrier (e.g., each uplink carrier) and one DL BWP may be active at a time in an active serving cell, for example, if FDD systems are configured with BA. One DL/UL BWP pair may be active at a time in an active serving cell, for example, for TDD systems. Operating on the one UL BWP and the one DL BWP (or the one DL/UL pair) may improve wireless device battery consumption. BWPs other than the one active UL BWP and the one active DL BWP that the wireless device may work on may be deactivated. The wireless device may not monitor PDCCH transmission, for example, on deactivated BWPs. The wireless device may not send (e.g., transmit) on PUCCH, PRACH, and UL-SCH, for example, on deactivated BWPs.

A serving cell may be configured with at most a first number/quantity (e.g., four) of BWPs. There may be one active BWP at any point in time, for example, for an activated serving cell. A BWP switching for a serving cell may be used to activate an inactive BWP and deactivate an active BWP at a time. The BWP switching may be controlled by a PDCCH transmission indicating a downlink assignment or an uplink grant. The BWP switching may be controlled by a BWP inactivity timer (e.g., bwp-InactivityTimer). The BWP switching may be controlled by a wireless device (e.g., a MAC entity of the wireless device) based on (e.g., after or in response to) initiating a Random Access procedure. One BWP may be initially active without receiving a PDCCH transmission indicating a downlink assignment or an uplink grant, for example, upon addition of an SpCell or activation of an SCell. The active BWP for a serving cell may be indicated by configuration parameter(s) (e.g., parameters of RRC message) and/or PDCCH transmission. A DL BWP may be paired with a UL BWP for unpaired spectrum, and BWP switching may be common for both UL and DL.

Figure 22:
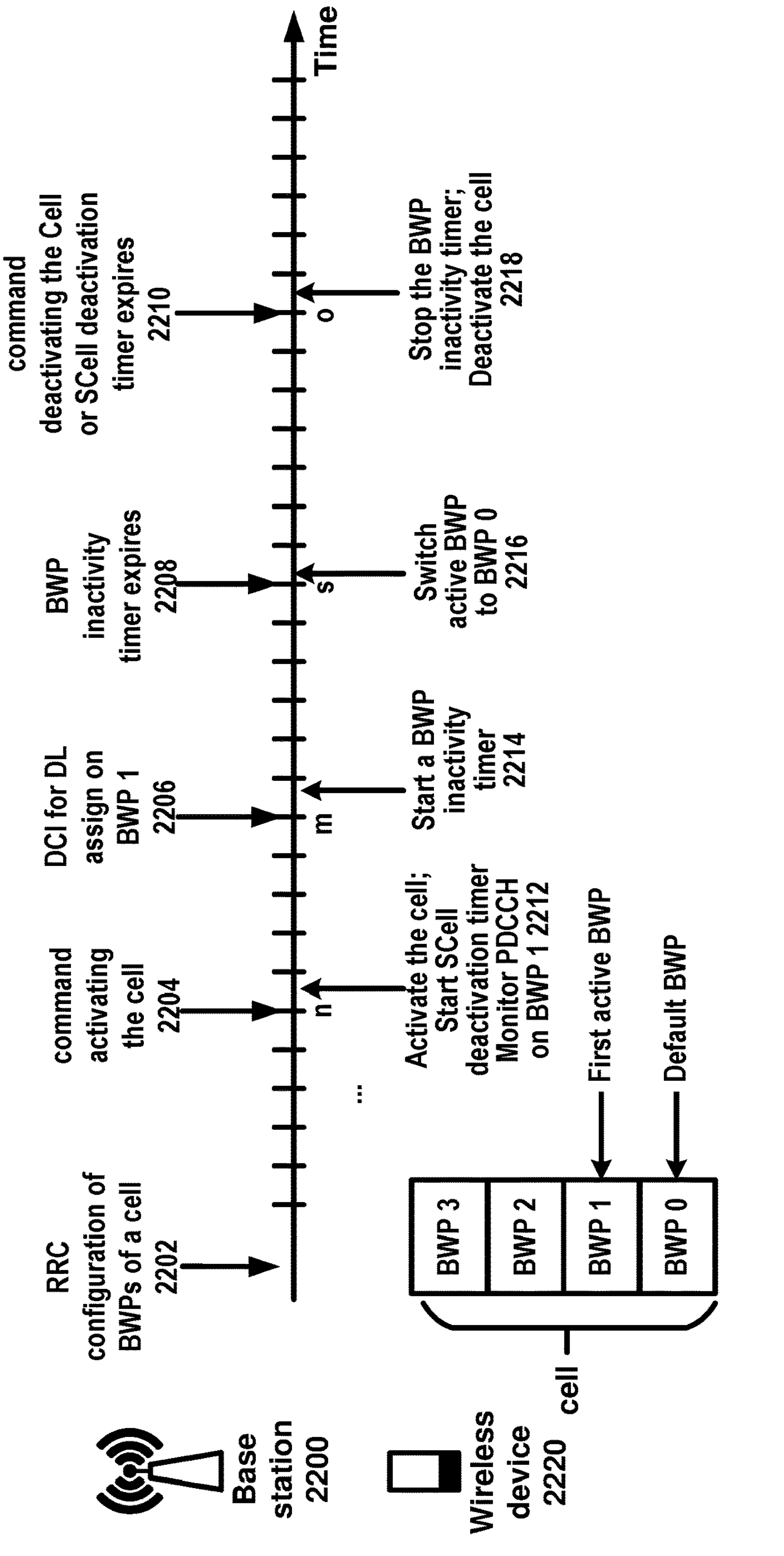
FIG. 22 shows an example of BWP activation/deactivation.

FIG. 22 shows an example of BWP activation/deactivation. The BWP activation/deactivation may be on a cell (e.g., PCell or SCell). The BWP activation/deactivation may be associated with BWP switching (e.g., BWP switching may comprise the BWP activation/deactivation). A wireless device 2220 may receive (e.g., detect) at step 2202, (e.g., from a base station 2200), at least one message (e.g., RRC message) comprising parameters of a cell and one or more BWPs associated with the cell. The RRC message may comprise at least one of: RRC connection reconfiguration message (e.g., RRCReconfiguration), RRC connection reestablishment message (e.g., RRCRestablishment), and/or RRC connection setup message (e.g., RRCSetup). Among the one or more BWPs, at least one BWP may be configured as the first active BWP (e.g., BWP 1), one BWP as the default BWP (e.g., BWP 0). The wireless device 2220 may receive (e.g., detect) a command at step 2204 (e.g., RRC message, MAC CE or DCI message) to activate the cell at an nth slot. The wireless device 2220 may not receive (e.g., detect) a command activating a cell, for example, a PCell. The wireless device 2220 may activate the PCell at step 2212, for example, after the wireless device 2220 receives/detects RRC message comprising configuration parameters of the PCell. The wireless device 2220 may start monitoring a PDCCH transmission on BWP 1 based on (e.g., after or in response to) activating the PCell at step 2212.

The wireless device 2220 may start (or restart) at step 2214, a BWP inactivity timer (e.g., bwp-InactivityTimer) at an $m^{th}$ slot based on (e.g., after or in response to) receiving a DCI message 2206 indicating DL assignment on BWP 1. The wireless device 2220 may switch back at step 2216 to the default BWP (e.g., BWP 0) as an active BWP, for example, if the BWP inactivity timer expires at step 2208, at st slot. At step 2210, the wireless device 2220 may deactivate the cell and/or stop the BWP inactivity timer, for example, if a secondary cell deactivation timer (e.g., sCellDeactivationTimer) expires at step 2210 (e.g., if the cell is a SCell). The wireless device 2220 may not deactivate the cell and may not apply or use a secondary cell deactivation timer (e.g., sCellDeactivationTimer) on the PCell, for example, based on the cell being a PCell.

A wireless device (e.g., a MAC entity of the wireless device) may apply or use various operations on an active BWP for an activated serving cell configured with a BWP. The various operations may comprise at least one of: sending (e.g., transmitting) on UL-SCH, sending (e.g., transmitting) on RACH, monitoring a PDCCH transmission, sending (e.g., transmitting) PUCCH, receiving DL-SCH, and/or (re-) initializing any suspended configured uplink grants of configured grant Type 1 according to a stored configuration, if any.

A wireless device (e.g., a MAC entity of the wireless device) may not perform certain operations, for example, on an inactive BWP for an activated serving cell (e.g., each activated serving cell) configured with a BWP. The certain operations may include at least one of sending (e.g., transmit) on UL-SCH, sending (e.g., transmit) on RACH, monitoring a PDCCH transmission, sending (e.g., transmit) PUCCH, sending (e.g., transmit) SRS, or receiving DL-SCH. The wireless device (e.g., the MAC entity of the wireless device) may clear any configured downlink assignment and configured uplink grant of configured grant Type 2, and/or suspend any configured uplink grant of configured Type 1, for example, on the inactive BWP for the activated serving cell (e.g., each activated serving cell) configured with the BWP.

A wireless device may perform a BWP switching of a serving cell to a BWP indicated by a PDCCH transmission, for example, if a wireless device (e.g., a MAC entity of the wireless device) receives/detects the PDCCH transmission for the BWP switching and a random access procedure associated with the serving cell is not ongoing. A bandwidth part indicator field value may indicate the active DL BWP, from the configured DL BWP set, for DL receptions, for example, if the bandwidth part indicator field is configured in DCI format 1_1. A bandwidth part indicator field value may indicate the active UL BWP, from the configured UL BWP set, for UL transmissions, for example, if the bandwidth part indicator field is configured in DCI format 0_1.

A wireless device may be provided by a higher layer parameter such as a default DL BWP (e.g., Default-DL-BWP) among the configured DL BWPs, for example, for a primary cell. A default DL BWP may be the initial active DL BWP, for example, if a wireless device is not provided with the default DL BWP by the higher layer parameter (e.g., Default-DL-BWP). A wireless device may be provided with a higher layer parameter such as a value of a timer for the primary cell (e.g., bwp-InactivityTimer). The wireless device may increment the timer, if running, every interval of 1 millisecond for frequency range 1 or every 0.5 milliseconds for frequency range 2, for example, if the wireless device may not detect a DCI format 1_1 for paired spectrum operation or if the wireless device may not detect a DCI format 1_1 or DCI format 0_1 for unpaired spectrum operation during the interval.

Procedures of a wireless device on the secondary cell may be substantially the same as on the primary cell using a timer value for a secondary cell and the default DL BWP for the secondary cell, for example, if the wireless device is configured for the secondary cell with a higher layer parameter (e.g., Default-DL-BWP) indicating a default DL BWP among the configured DL BWPs and the wireless device is configured with a higher layer parameter (e.g., bwp-InactivityTimer) indicating the timer value. A wireless device may use an indicated DL BWP and an indicated UL BWP on a secondary cell respectively as a first active DL BWP and a first active UL BWP on the secondary cell or carrier, for example, if the wireless device is configured by a higher layer parameter (e.g., Active-BWP-DL-SCell) associated with the first active DL BWP and by a higher layer parameter (e.g., Active-BWP-UL-SCell) associated with the first active UL BWP on the secondary cell or carrier.

A set of PDCCH candidates for a wireless device to monitor may be referred to as PDCCH search space sets. A search space set may comprise a CSS set or a USS set. A wireless device may monitor PDCCH transmission candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

A wireless device may determine a PDCCH transmission monitoring occasion on an active DL BWP based on one or more PDCCH transmission configuration parameters (e.g., as described with respect to FIG. 27) comprising at least one of: a PDCCH transmission monitoring periodicity, a PDCCH transmission monitoring offset, or a PDCCH transmission monitoring pattern within a slot. For a search space set (SS s), the wireless device may determine that a PDCCH transmission monitoring occasion(s) exists in a slot with number/quantity n_(s,f)^μ in a frame with number/quantity n_f if (n_f·N_“slot” ^(“frame”,μ)+n_(s,f)^μ−o_s) mod f0 〚k_s〛=0. N_“slot”^(“frame”,μ) may be a number/quantity of slots in a frame if numerology μ is configured. o_s may be a slot offset indicated in the PDCCH transmission configuration parameters. k_s may be a PDCCH transmission monitoring periodicity indicated in the PDCCH transmission configuration parameters. The wireless device may monitor PDCCH transmission candidates for the search space set for T_s consecutive slots, starting from slot n_(s, f)^μ, and may not monitor PDCCH transmission candidates for search space set s for the next k_s−T_s consecutive slots. A USS at CCE aggregation level L∈{1, 2, 4, 8, 16} may be defined by a set of PDCCH transmission candidates for CCE aggregation level L.

A wireless device may decide, for a search space set s associated with CORESET p, CCE indexes for aggregation level L corresponding to PDCCH transmission candidate m_(s,n_CI) of the search space set in slot n_(s,f)^μ for an active DL BWP of a serving cell corresponding to carrier indicator field value n_CI as L·{(Y_(p,n_"s,f"^μ)+⌊(m_(s, n_CI)·N_("CCE",p))/(L·M_(s,"max")^((L)))⌋+n_CI) mod ⌊⌊N_("CCE",p)/L⌋}+i, where, Y_(p,n_"s,f"^μ)=0 for any CSS; Y_(p,n_"s,f"^μ)=(A_p·Y_(p,n_"s,f"^μ−1)) mod D for a USS, Y_(p,−1)=n_"RNTI"≠0, A_p=39827 for p mod 3=0, A_p=39829 for p mod 3=1, A_p=39839 for p mod 3=2, and D=65537; i=0, . . . , L−1; N_("CCE",p) is the number/quantity of CCEs, numbered/quantified from 0 to N_("CCE",p)−1, in CORESET p; n_CI is the carrier indicator field value if the wireless device is configured with a carrier indicator field by CrossCarrierSchedulingConfig for the serving cell on which PDCCH transmission is monitored; otherwise, including for any CSS, n_CI=0; m_(s, n_CI)=0, . . . , M_(s,n_CI)^((L))−1, where M_(s,n_CI)^((L)) is the number/quantity of PDCCH transmission candidates the wireless device is configured to monitor for aggregation level L of a search space set s for a serving cell corresponding to n_CI; for any CSS, M_(s,"max")^((L))=M_(s,0)^((L)); for a USS, M_(s,"max")^((L)) is the maximum of M_(s,n_CI)^((L)) over configured n_CI values for a CCE aggregation level L of search space set s; and the RNTI value used for n_"RNTI" is the C-RNTI.

A wireless device may monitor a set of PDCCH transmission candidates according to configuration parameters of a search space set comprising a plurality of search spaces. The wireless device may monitor a set of PDCCH transmission candidates in one or more CORESETs for detecting one or more DCI messages. A CORESET may be configured, for example, as described with respect to FIG. 26. Monitoring may comprise decoding one or more PDCCH transmission candidates of the set of the PDCCH transmission candidates according to the monitored DCI formats. Monitoring may comprise decoding a DCI content of one or more PDCCH transmission candidates with possible (or configured) PDCCH transmission locations, possible (or configured) PDCCH transmission formats (e.g., number/quantity of CCEs, number/quantity of PDCCH transmission candidates in common search spaces, and/or number/quantity of PDCCH transmission candidates in the wireless device-specific search spaces (e.g., the UE-specific search spaces)) and possible (or configured) DCI formats. The decoding may be referred to as blind decoding. The possible DCI formats may be based on examples of FIG. 23.

FIG. 23 shows examples of various DCI formats. The various DCI formats may be used, for example, by a base station to send (e.g., transmit) control information (e.g., to a wireless device and/or to be used by the wireless device) for PDCCH transmission monitoring. Different DCI formats may comprise different DCI fields and/or have different DCI payload sizes. Different DCI formats may have different signaling purposes. DCI format 0_0 may be used to schedule PUSCH transmission in one cell. DCI format 01 may be used to schedule one or multiple PUSCH transmissions in one cell or indicate CG-DFI (configured grant-Downlink Feedback Information) for configured grant PUSCH transmission, etc. The DCI format(s), that the wireless device may monitor for reception via a search space, may be configured.

FIG. 24A shows an example MIB message. FIG. 24A shows example configuration parameters of a MIB of a cell. The cell may be a PCell (or any other cell). A wireless device may receive a MIB via a PBCH. The wireless device may receive the MIB, for example, based on receiving a PSS and/or an SSS. The configuration parameters of a MIB may comprise/indicate a SFN (e.g., indicated via a higher layer parameter systemFrameNumber), subcarrier spacing indication (e.g., indicated via a higher layer parameter subCarrierSpacingCommon), a frequency domain offset (e.g., indicated via a higher layer parameter ssb-SubcarrierOffset) between SSB and overall resource block grid in number of subcarriers, a parameter indicating whether the cell is barred (e.g., indicated via a higher layer parameter cellBarred), a DMRS position indication (e.g., indicated via a higher layer parameter dmrs-TypeA-Position) indicating position of DMRS, parameters of a CORESET and a search space of a PDCCH (e.g., indicated via a higher layer parameter pdcch-ConfigSIB1) comprising a common CORESET, a common search space and necessary PDCCH parameters, etc. Each of the higher layer parameters may be indicated via one or bits. For example, the SFN may be indicated using 6 bits (or any other quantity of bits).

A configuration parameter (e.g., pdcch-ConfigSIB1) may comprise a first parameter (e.g., controlResourceSetZero) indicating a common CORESET of an initial BWP of the cell. The common CORESET may be associated with an indicator/index (e.g., 0, or any other indicator). For example, the common CORESET may be CORESET 0. The first parameter may be an integer between 0 and 15 (or any other integer). Each integer (e.g., between 0 and 15, or any other integer) may indicate/identify a configuration of CORESET 0.

FIG. 24B shows an example configuration of a CORESET. The CORESET may be CORESET 0 (or any other CORESET). A wireless device may determine an SSB and CORESET 0 multiplexing pattern, a quantity/number of RBs for CORESET 0, a quantity/number of symbols for CORESET 0, an RB offset for CORESET 0, for example, based on a value of the first parameter (e.g., controlResourceSetZero).

A higher layer parameter (e.g., pdcch-ConfigSIB1) may comprise a second parameter (e.g., searchSpaceZero). The second parameter may indicate a common search space of the initial BWP of the cell. The common search space may be associated with an indicator/index (e.g., 0, or any other indicator). For example, the common search space may be search space 0. The second parameter may be an integer between 0 and 15 (or any other integer). Each integer (e.g., between 0 and 15, or any other integer) may identify a configuration of search space 0.

FIG. 24C shows an example configuration of a search space. The search space may be search space 0 (or any other search space). A wireless device may determine one or more parameters (e.g., O, M) for slot determination for PDCCH monitoring, a first symbol indicator/index for PDCCH monitoring, and/or a quantity/number of search spaces per slot, for example, based on a value of the second parameter (e.g., searchSpaceZero). For example, for operation without shared spectrum channel access and for the SS/PBCH block and CORESET multiplexing pattern 1, the wireless device may monitor PDCCH (e.g., in the Type0-PDCCH CSS set) over two slots. For SS/PBCH block with index i, the wireless device may determine an index of slot $n_0$ as $n_0=(O\cdot 2^{\wedge}+\lfloor i\cdot M\rfloor) \bmod N_{slot}^{\wedge}(frame,\mu)$. Slot $n_0$ is may be in a frame with a SFN $SFN_C$ that satisfies the condition $SFN_c \bmod 2=0$ (e.g., if $\lfloor((O\cdot 2^{\wedge}+\lfloor i\cdot M\rfloor))/(N_{slot}^{\wedge}(frame,\mu))\rfloor \bmod 2=0$), or in a frame with a SFN that $SFN_C$ satisfies the condition $SFN_c \bmod 2=1$ (e.g., if $\lfloor((O\cdot 2^{\wedge}+\lfloor i\cdot M\rfloor))/(N_{slot}^{\wedge}(frame,\mu))\rfloor \bmod 2=1$), where $\mu\in\{0,1,2,3,5,6\}$ based on the SCS for PDCCH receptions in the CORESET.

A wireless device may monitor a PDCCH for receiving DCI. The wireless device may monitor a search space 0 of a CORESET 0 for receiving the DCI. The DCI may schedule a SIB1. For example, a SIB1 message may be similar to as described with respect to FIG. 25. The wireless device may receive the DCI with CRC scrambled with a SI-RNTI dedicated for receiving the SIB1.

FIG. 25 shows an example SIB. The SIB may comprise one or more configuration parameters (e.g., RRC configuration parameters). A SIB (e.g., SIB1) may be sent/transmitted to one or more wireless devices. For example, the SIB may be broadcasted to multiple wireless devices. The SIB may contain information for evaluating/determining whether a wireless device is allowed to access a cell, information of paging configuration, and/or scheduling configuration of other system information. A SIB may comprise radio resource configuration information that may be common for multiple wireless devices and barring information used/applied to a unified access control. A base station may send/transmit, to a wireless device (or a plurality of wireless devices), one or more SIB information messages. As shown in FIG. 25, parameters of the one or more SIB information messages may comprise: one or more parameters for cell selection related to a serving cell (e.g., cellSelectionInfo), one or more configuration parameters of a serving cell (e.g., in ServingCellConfigCommonSIB information element (IE)), and/or one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, and/or other parameters.

A DownlinkConfigCommonSIB IE may comprise parameters of an initial downlink BWP (e.g., indicated via initialDownlinkBWP IE) of the serving cell (e.g., SpCell). The parameters of the initial downlink BWP may be comprised in a BWP-DownlinkCommon IE (e.g., as shown in FIG. 26). The BWP-DownlinkCommon IE may be used to configure common parameters of a downlink BWP of the serving cell. The base station may configure a parameter (e.g., locationAndBandwidth) such that the initial downlink BWP may comprise an entire CORESET (e.g., CORESET 0) of the serving cell in the frequency domain. The wireless device may use/apply the parameter locationAndBandwidth based on reception of the parameter. The wireless device may use/apply the parameter locationAndBandwidth to determine the frequency position of signals in relation to the frequency as indicated via locationAndBandwidth. The wireless device may keep CORESET 0, for example, until after reception of an RRC setup message (e.g., RRCSetup), RRC resume message (e.g., RRCResume) and/or an RRC re-establishment message (e.g., RRCReestablishment).

The DownlinkConfigCommonSIB IE may comprise parameters of a paging channel configuration. The parameters may comprise a paging cycle value (T, e.g., indicated by defaultPagingCycle IE), a parameter indicating total quantity/number (N) of paging frames (PFs) (e.g., indicated by nAndPagingFrameOffset IE) and paging frame offset in a paging DRX cycle (e.g., indicated by parameter PF_offset), a quantity/number (Ns) for total paging occasions (POs) per PF, a first PDCCH monitoring occasion indication parameter (e.g., firstPDCCH-MonitoringOccasionofPO IE) indicating a first PDCCH monitoring occasion for paging of each PO of a PF. The wireless device may monitor a PDCCH for receiving a paging message, for example, based on parameters of a PCCH configuration.

A parameter (e.g., first-PDCCH-MonitoringOccasionOfPO) may be signaled in SIB1 for paging in initial DL BWP. The parameter first-PDCCH-MonitoringOccasionOfPO may be signaled in the corresponding BWP configuration, for example, for paging in a DL BWP other than the initial DL BWP.

FIG. 26 shows example RRC configuration parameters. The configuration parameters may be RRC configuration parameters for a downlink BWP of a serving cell. The configuration parameters may be indicated via a higher layer parameter BWP-DownlinkCommon IE. A base station may send/transmit to a wireless device (or a plurality of wireless devices) one or more configuration parameters of a downlink BWP (e.g., initial downlink BWP) of a serving cell. The one or more configuration parameters of the downlink BWP may comprise: one or more generic BWP parameters of the downlink BWP, one or more cell-specific parameters for PDCCH of the downlink BWP (e.g., in pdcch-ConfigCommon IE), one or more cell specific parameters for the PDSCH of the BWP (e.g., in pdsch-ConfigCommon IE), and/or one or more other parameters. A pdcch-ConfigCommon IE may comprise parameters of CORESET 0 (e.g., indicated via parameter controlResourceSetZero) which may be used in any common or wireless device-specific search spaces. A value of the controlResourceSetZero may be interpreted in the same manner as the corresponding bits in MIB parameter pdcch-ConfigSIB1. A pdcch-ConfigCommon IE may comprise parameters (e.g., in commonControlResourceSet) of an additional common control resource set which may be configured and used for any common or wireless device-specific search space. The network may use a parameter ControlResourceSetId other than 0 for this ControlResourceSet, for example, if the network configures commonControlResourceSet. The network may configure the commonControlResourceSet in SIB1 such that the SIB1 is contained within the bandwidth of CORESET 0. A pdcch-ConfigCommon IE may comprise parameters (e.g., in commonSearchSpaceList) of a list of additional common search spaces. Parameters of a search space may be implemented based on example of FIG. 27. A pdcch-ConfigCommon IE may indicate, from a list of search spaces, a search space for paging (e.g., via parameter pagingSearchSpace), a search space for random access procedure (e.g., via parameter ra-SearchSpace), a search space for SIB1 message (e.g., via parameter searchSpaceSIB1), a common search space 0 (e.g., via parameter searchSpaceZero), and/or one or more other search spaces.

A CORESET may be associated with a CORESET indicator/index (e.g., indicated via parameter ControlResourceSetId). A CORESET may be implemented based on examples described with respect to FIG. 14A and/or FIG. 14B. The CORESET index 0 may identify a common CORESET configured in MIB and in ServingCellConfigCommon (e.g., indicated via controlResourceSetZero). The CORESET index 0 may not be used in the ControlResourceSet IE. The CORESET index with other values may identify CORESETs configured by dedicated signaling or in SIB1.

The controlResourceSetId may be unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET (e.g., in terms of a quantity/number of symbols). Configuration parameters of a CORESET may comprise at least one of: frequency resource indication (e.g., frequencyDomainResources), a CCE-REG mapping type indicator (e.g., cce-REG-MappingType), a plurality of TCI states, and/or an indicator indicating whether a TCI is present in a DCI, etc. The frequency resource indication (e.g., comprising a quantity/number of bits, such as 45 bits, or any other quantity of bits) may indicate frequency domain resources. Each bit of the frequency resource indication may correspond to a group of RBs (e.g., 6 RBs, or any other quantity of RBs), with the grouping starting from the first RB group in a BWP of a cell (e.g., SpCell, SCell). For example, the first (e.g., left-most, most significant) bit may correspond to the first RB group in the BWP, with the other bits sequentially corresponding to other RB groups. A bit that is set to 1 may indicate that an RB group, corresponding to the bit, is contained in the frequency domain resource of the CORESET. Bits corresponding to a group of RBs not fully contained in the BWP within which the CORESET is configured may be set to zero.

FIG. 27 shows an example configuration of a search space. The configuration of the search space may be within a SearchSpace IE. One or more search space configuration parameters of a search space may comprise at least one of: a search space ID (e.g., searchSpaceId), a CORESET indicator (ID) (e.g., controlResourceSetId), a monitoring slot periodicity and offset parameter (e.g., monitoringSlotPeriodicityAndOffset), a search space time duration value (e.g., duration), a monitoring symbol indication (e.g., monitoringSymbolsWithinSlot), a quantity/number of candidates for an aggregation level (e.g., nrofCandidates), and/or a search space type indicating a common search space type or a wireless device-specific search space type (e.g., searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate symbol(s), of a slot, in which a wireless device may monitor a PDCCH on the search space. The control resource set ID may indicate/identify a CORESET on which a search space may be located.

A wireless device, in an RRC idle state (e.g., RRC_IDLE) or in an RRC inactive state (e.g., RRC_INACTIVE), may periodically monitor POs for receiving paging message(s) for the wireless device. The wireless device, in an RRC idle state or an RRC inactive state and before monitoring the POs, may wake up at a time before each PO for preparation and/or to activate (e.g., turn on) all components in preparation of data reception (e.g., warm up stage). The gap between the waking up and the PO may be set to be sufficient to accommodate all the processing requirements. The wireless device may perform, after the warming up, timing acquisition from SSB and coarse synchronization, frequency and time tracking, time and frequency offset compensation, and/or calibration of local oscillator. The wireless device, after warm up, may monitor a PDCCH for a paging DCI via one or more PDCCH monitoring occasions. The wireless device may monitor the PDCCH, for example, based on configuration parameters of the PCCH configuration (e.g., as configured in SIB1). The configuration parameters of the PCCH configuration may be as described with respect to FIG. 25.

Figure 28:
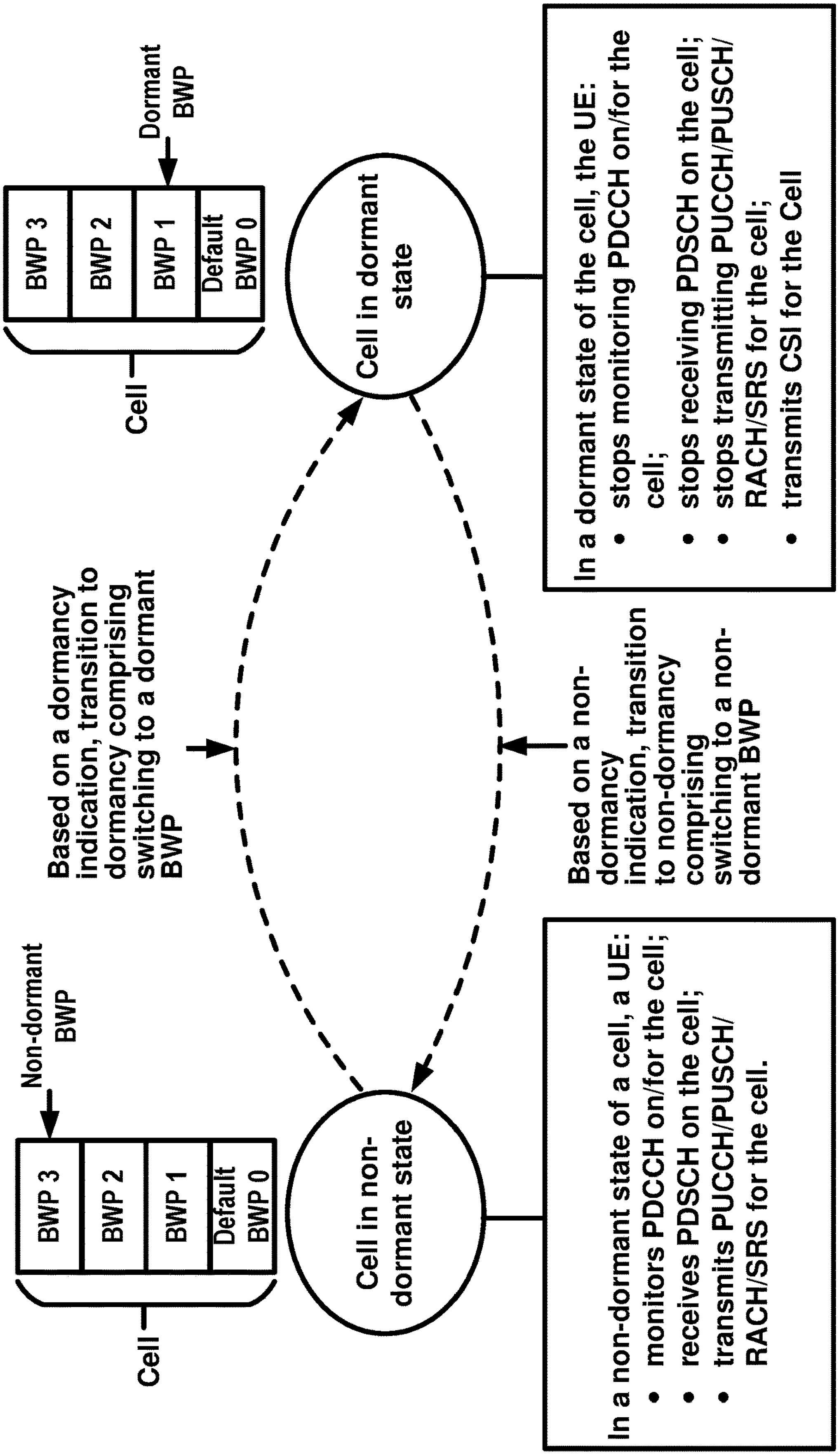
FIG. 28 shows example dormancy management.

FIG. 28 shows example cell dormancy management. Cell dormancy management may comprise transitioning between a dormant state and a non-dormant state. The example transitioning may be for operations on an SCell. A base station may send/transmit, to a wireless device, one or more RRC messages. The one or more RRC messages may comprise configuration parameters of the SCell. The SCell may comprise a plurality of BWPs. Among the plurality of BWPs, a first BWP (e.g., BWP 3) may be configured as a non-dormant BWP, and/or a second BWP (e.g., BWP 1) may be configured as a dormant BWP. A default BWP (e.g., BWP 0) may be configured in the plurality of BWPs. The non-dormant BWP may be a BWP which the wireless device may activate, for example, based on/in response to transitioning the SCell from a dormant state to a non-dormant state. The dormant BWP may be a BWP which the wireless device may switch to based on/in response to transitioning the SCell from a non-dormant state to a dormant state. The configuration parameters may indicate one or more search spaces and/or CORESETs configured on the non-dormant BWP. The configuration parameters may indicate no search spaces or no CORESETs for the dormant BWP. The configuration parameter may indicate CSI reporting configuration parameters for the dormant BWP.

An active BWP for the SCell may be a dormant BWP, a non-dormant BWP, or a default BWP. A default BWP may be different from a dormant BWP. The configuration parameters may indicate one or more search spaces and/or one or more CORESETs configured on the default BWP. A wireless device may switch to the default BWP as an active BWP, for example, if a BWP inactivity timer expires or based on receiving a DCI indicating switching to the default BWP. The wireless device may perform (e.g., if the default BWP is an active BWP), at least one of: monitoring PDCCH on the default BWP of the SCell, receiving a PDSCH transmission via the default BWP of the SCell, sending a PUSCH transmission via the default BWP of the SCell, sending an SRS via the default BWP of the SCell, and/or sending a CSI report (e.g., in a periodic, aperiodic, and/or semi-persistent manner) for the default BWP of the SCell. The wireless device may switch to the dormant BWP as an active BWP of the SCell, for example, if receiving a dormancy/non-dormancy indication indicating a dormant state for a SCell. The wireless device may (e.g., based on/in response to switching to the dormant BWP) perform at least one of: refraining from monitoring a PDCCH on the dormant BWP of the SCell (or for the SCell if the SCell is cross-carrier scheduled by another cell), refraining from receiving a PDSCH transmission via the dormant BWP of the SCell, refraining from sending a PUSCH transmission via the dormant BWP of the SCell, refraining from sending SRS via the dormant BWP of the SCell, and/or sending a CSI report (e.g., periodic, aperiodic, and/or semi-persistent CSI report) for the dormant BWP of the SCell.

A base station may send/transmit, to a wireless device, DCI via a PDCCH resource. The DCI may comprise a dormancy/non-dormancy indication indicating a dormant state or a non-dormant state for the SCell. The wireless device may (e.g., based on the dormancy/non-dormancy indication indicating a dormant state for the SCell): transition the SCell to the dormant state (e.g., if the SCell is in a non-dormant state before receiving the DCI), or maintain the SCell in the dormant state (e.g., if the SCell is in the dormant state before receiving the DCI). Transitioning the SCell to the dormant state may comprise switching to the dormant BWP (e.g., configured by the base station) of the SCell. The wireless device may (e.g., based on the dormancy/non-dormancy indication indicating a non-dormant state for the SCell): transition the SCell to the non-dormant state (e.g., if the SCell is in a dormant state before receiving the DCI), or maintain the SCell in the non-dormant state (e.g., if the SCell is in the non-dormant state before receiving the DCI). Transitioning the SCell to the non-dormant state may comprise switching to a non-dormant BWP (e.g., configured by the base station) of the SCell.

The wireless device may switch to the non-dormant BWP (e.g., BWP 3), configured by the base station, as an active BWP of the SCell, for example, based on transitioning the SCell from a dormant state to a non-dormant state. The wireless device may perform (e.g., based on the switching to the non-dormant BWP as the active BWP of the SCell) at least one of: monitoring PDCCH on the active BWP of the SCell (or monitoring PDCCH for the SCell if the SCell is configured to be cross-carrier scheduled by another cell), receiving a PDSCH transmission via the active BWP of the SCell, and/or sending a PUCCH transmission, a PUSCH transmission, a RACH transmission and/or an SRS transmission via the active BWP (e.g., if the active BWP is an uplink BWP).

The wireless device may switch to the dormant BWP (e.g., BWP 1 of the SCell), configured by the base station, for example, based on transitioning the SCell from a non-dormant state to a dormant state. The wireless device may perform (e.g., based on the switching to the dormant BWP of the SCell) at least one of: refraining from monitoring PDCCH on the dormant BWP of the SCell (or refraining from monitoring PDCCH for the SCell if a the SCell is configured to be cross-carrier scheduled by another cell), refraining from receiving a PDSCH transmission via the dormant BWP of the SCell, refraining from sending a PUCCH transmission, a PUSCH transmission, a RACH transmission, and/or an SRS transmission via the dormant BWP (e.g., if the dormant BWP is an uplink BWP), and/or sending a CSI report for the dormant BWP of the SCell (e.g., based on the CSI reporting configuration parameters configured on the dormant BWP of the SCell).

DRX operation may be used by a wireless device to improve the wireless device battery lifetime. With DRX configured, the wireless device may discontinuously monitor downlink control channel, for example, PDCCH or EPDCCH. A base station may configure DRX operation with a set of DRX parameters, for example, using RRC configuration. The set of DRX parameters may be selected based on the application type such that the wireless device may reduce power and resource consumption. The wireless device may receive data packets with an extended delay, since the wireless device may be in DRX Sleep/Off state at the time of data arrival at the wireless device and the base station may wait until the wireless device transitions to the DRX ON state, for example, based on (e.g., after or in response to) DRX being configured/activated.

For a DRX mode, the wireless device may power down most of its circuitry, for example, if there are no packets to be received. The wireless device may monitor PDCCH discontinuously in the DRX mode. The wireless device may monitor the PDCCH continuously, for example, if a DRX operation is not configured. For this time the wireless device listens to the downlink (DL) (or monitors PDCCHs) which is called DRX Active state. In a DRX mode, a time for which the wireless device doesn't listen/monitor PDCCH is called DRX Sleep state.

Figure 29:
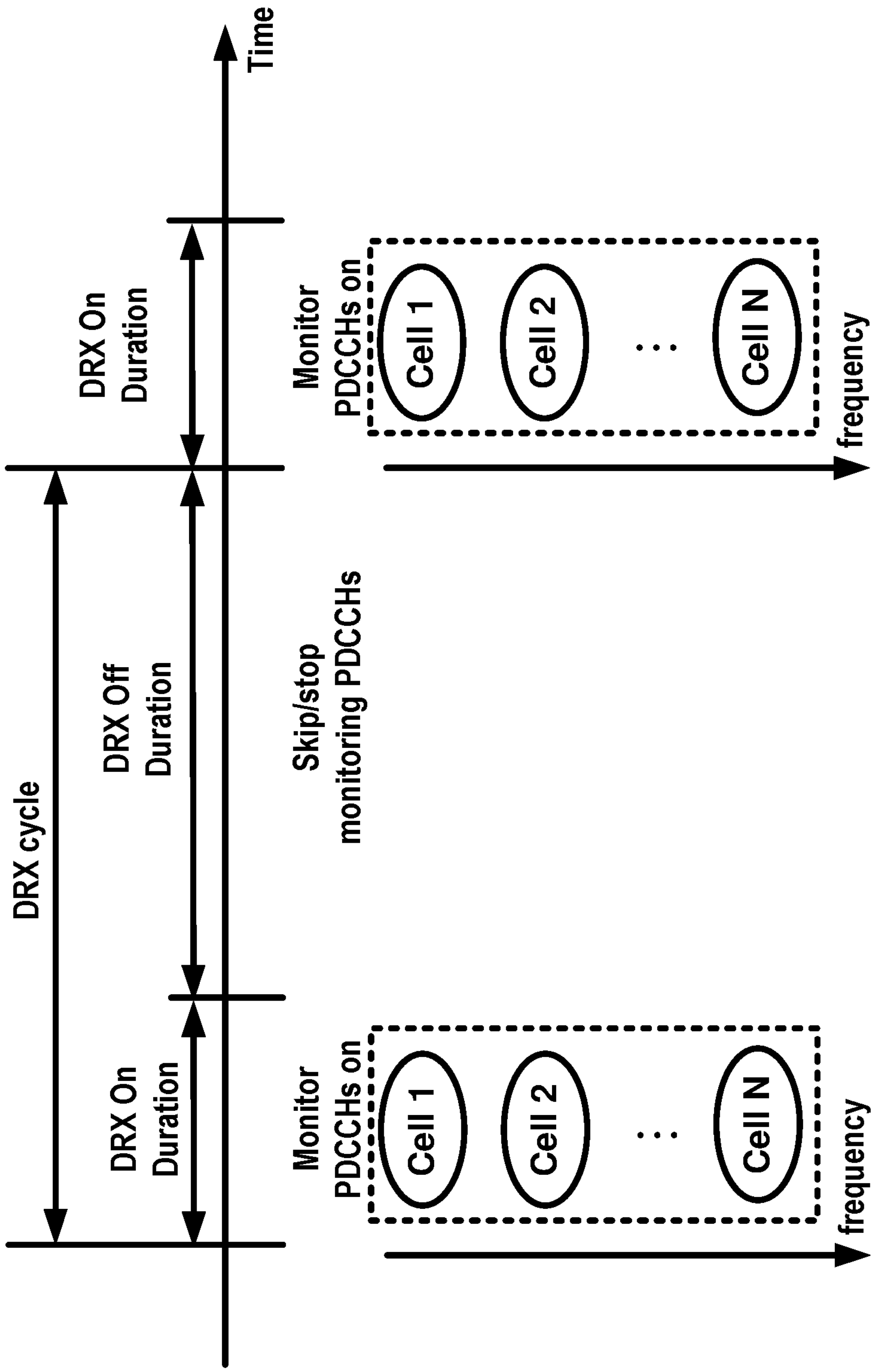
FIG. 29 shows an example of DRX configuration for a wireless device.

FIG. 29 shows an example of DRX configuration for a wireless device. A base station may send (e.g., transmit) an RRC message comprising one or more DRX parameters of a DRX cycle. The one or more parameters may comprise a first parameter and/or a second parameter. The first parameter may indicate a first time/window value of the DRX Active state (e.g., DRX on duration) of the DRX cycle. The second parameter may indicate a second time of the DRX Sleep state (e.g., DRX Off duration) of the DRX cycle. The one or more parameters may further comprise a time duration of the DRX cycle. For the DRX Active state, the wireless device may monitor PDCCHs for detecting one or more DCIs on a serving cell. For the DRX Sleep state, the wireless device may stop monitoring PDCCHs on the serving cell. The wireless device may monitor all PDCCHs on (or for) the multiple cells for the DRX Active state, for example, if multiple cells are in active state. For the DRX off duration, the wireless device may stop monitoring all PDCCH on (or for) the multiple cells. The wireless device may repeat the DRX operations according to the one or more DRX parameters.

DRX may be beneficial to the base station. The wireless device may be sending (e.g., transmitting) periodic CSI and/or SRS frequently (e.g., based on the configuration), for example, if DRX is not configured. With DRX, for DRX OFF periods, the wireless device may not send (e.g., transmit) periodic CSI and/or SRS. The base station may assign these resources to the other wireless devices to improve resource utilization efficiency.

The MAC entity may be configured by RRC with a DRX functionality that controls the wireless device's downlink control channel (e.g., PDCCH) monitoring activity for a plurality of RNTIs for the MAC entity. The plurality of RNTIs may comprise at least one of: C-RNTI; CS-RNTI; INT-RNTI; SP-CSI-RNTI; SFI-RNTI; TPC-PUCCH-RNTI; TPC-PUSCH-RNTI; Semi-Persistent Scheduling C-RNTI; eIMTA-RNTI; SL-RNTI; SL-V-RNTI; CC-RNTI; or SRS-TPC-RNTI. The MAC entity may monitor the PDCCH discontinuously using the DRX operation (e.g., if DRX is configured), for example, based on being RRC_CONNECTED; otherwise the MAC entity may monitor the PDCCH continuously.

RRC may control DRX operation by configuring a plurality of timers. The plurality of timers may comprise: a DRX On duration timer (e.g., drx-onDurationTimer); a DRX inactivity timer (e.g., drx-InactivityTimer); a downlink DRX HARQ round trip time (RTT) timer (e.g., drx-HARQ-RTT-TimerDL); an uplink DRX HARQ RTT Timer (e.g., drx-HARQ-RTT-TimerUL); a downlink retransmission timer (e.g., drx-RetransmissionTimerDL); an uplink retransmission timer (e.g., drx-RetransmissionTimerUL); one or more parameters of a short DRX configuration (e.g., drx-ShortCycle and/or drx-ShortCycleTimer)) and one or more parameters of a long DRX configuration (e.g., drx-LongCycle). Time granularity for DRX timers may be in terms of PDCCH subframes (e.g., indicated as psf in the DRX configurations), and/or in terms of milliseconds.

Based on a DRX cycle being configured, the Active Time of the DRX operation may include the time for which at least one timer is running. The at least one timer may comprise drx-onDurationTimer, drx-InactivityTimer, drx-RetransmissionTimerDL, drx-RetransmissionTimerUL, and/or mac-ContentionResolutionTimer. For the Active time of the DRX operation, the wireless device may monitor PDCCH with RNTI(s) impacted by the DRX operation. The RNTIs may comprise C-RNTI, CI-RNTI, CS-RNTI, INT-RNTI, SFI- RNTI, SP-CSI-RNTI, TPC-PUCCH-RNTI, TPC-PUSCH-RNTI, TPC-SRS-RNTI, and/or AI-RNTI.

A timer (e.g., a drx-Inactivity-Timer) may specify a time duration for which the wireless device may be active, for example, after successfully decoding a PDCCH indicating a new transmission (UL or DL or SL). This timer may be restarted upon receiving PDCCH for a new transmission (UL or DL or SL). The wireless device may transition to a DRX mode (e.g., using a short DRX cycle or a long DRX cycle), for example, based on the expiry of this timer. a cycle (e.g., a drx-ShortCycle) may be a first type of DRX cycle (e.g., if configured) that needs to be followed, for example, if the wireless device enters DRX mode. An IE (e.g., a DRX-Config IE) may indicate the length of the short cycle. A timer (e.g., a drx-ShortCycleTimer) may be expressed as multiples of a cycle (e.g., a shortDRX-Cycle). The timer may indicate the number of initial DRX cycles to follow the short DRX cycle, for example, before entering the long DRX cycle. A timer (e.g., a drx-onDurationTimer) may specify the time duration at the beginning of a DRX Cycle (e.g., DRX ON). A timer (e.g., a drx-onDurationTimer) may indicate the time duration, for example, before entering the sleep mode (DRX OFF). A timer (e.g., a drx-HARQ-RTT-TimerDL) may specify a minimum duration from the time new transmission is received and, for example, before the wireless device may expect a retransmission of a same packet. This timer may be fixed and may not be configured by RRC. A timer (e.g., a drx-RetransmissionTimerDL) may indicate a maximum duration for which the wireless device may be monitoring PDCCH, for example, if a retransmission from the eNodeB is expected by the wireless device.

The Active Time may comprise the time for which a Scheduling Request is sent on PUCCH and is pending, for example, based on (e.g., after or in response to) a DRX cycle being configured. Based on (e.g., after or in response to) a DRX cycle being configured, the Active Time may comprise the time for which an uplink grant for a pending HARQ retransmission can occur and there is data in the corresponding HARQ buffer for synchronous HARQ process. The Active Time may comprise the time for which a PDCCH may indicate a new transmission addressed to the C-RNTI of the MAC entity has not been received, for example, after successful reception of a Random Access Response for the preamble not selected by the MAC entity, for example, based on a DRX cycle being configured.

A timer, such as a DL HARQ RTT Timer (e.g., drx-HARQ-RTT-TimerDL), may expire in a subframe and the data of the corresponding HARQ process may not be successfully decoded. The MAC entity may start the timer (e.g., the drx-RetransmissionTimerDL) for the corresponding HARQ process. A UL HARQ RTT Timer (e.g., drx-HARQ-RTT-TimerUL) may expire in a subframe. The MAC entity may start the timer (e.g., the drx-RetransmissionTimerUL) for the corresponding HARQ process.

A wireless device may receive a DRX Command MAC CE and/or a Long DRX Command MAC CE (e.g., based on examples described herein with respect to FIG. 19). The MAC entity of the wireless device may stop a timer (e.g., a drx-onDurationTimer) and/or stop another timer (e.g., drx-InactivityTimer), for example, based on receiving the DRX Command MAC CE and/or the long DRX Command MAC CE. The MAC entity may start or restart a timer (e.g., a drx-ShortCycleTimer) and/or may use a cycle (e.g., Short DRX Cycle), for example, if an inactivity timer (e.g., drx-InactivityTimer) expires and/or if the cycle is being configured. For example, the MAC entity may use a cycle (e.g., the Long DRX cycle).

A timer (e.g., a drx-ShortCycleTimer) may expire in a subframe. The MAC entity may use a cycle (e.g., the Long DRX cycle). A Long DRX Command MAC control element may be received. The MAC entity may stop a timer (e.g., a drx-ShortCycleTimer) and may use the Long DRX cycle.

The wireless device may start a timer (e.g., a drx-onDurationTimer), for example, after a value (e.g., drx-SlotOffset) from the beginning of the subframe, wherein drx-SlotOffset may be a value (configured in the DRX configuration parameters) indicating a delay, for example, before starting the drx-onDurationTimer, for example, if the Short DRX Cycle is used and [(SFN*10)+subframe number] modulo (drx-ShortCycle)=(drxStartOffset) modulo (drx-ShortCycle). The wireless device may start a timer (e.g., drx-onDurationTimer), for example, after a value (e.g., drx-SlotOffset) from the beginning of the subframe, wherein drx-SlotOffset may be a value (configured in the DRX configuration parameters) indicating a delay, for example, before starting the drx-onDurationTimer, for example, if the Long DRX Cycle is used and [(SFN*10)+subframe number] modulo (drx-longCycle)=drxStartOffset.

Figure 30:
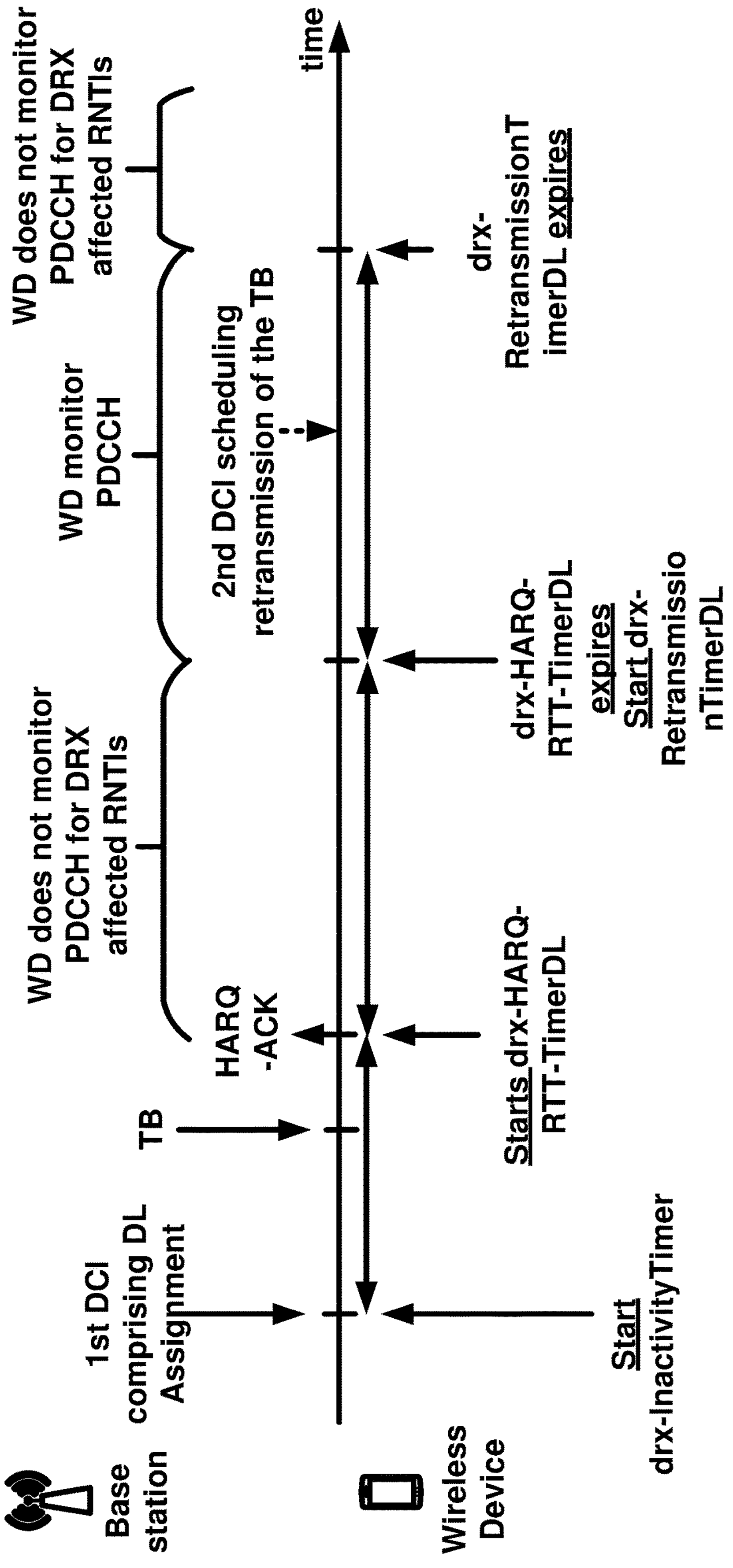
FIG. 30 shows an example of DRX configuration for a wireless device.

FIG. 30 shows an example of DRX configuration for a wireless device. A base station may send (e.g., transmit) an RRC message comprising configuration parameters of DRX operation. The configuration parameters may comprise a first timer value for a DRX inactivity timer (e.g., drx-InactivityTimer), a second timer value for a HARQ RTT timer (e.g., drx-HARQ-RTT-TimerDL, drx-HARQ-RTT-TimerUL), a third timer value for a HARQ retransmission timer (e.g., drx-RetransmissionTimerDL and/or drx-RetransmissionTimerUL).

A base station may send (e.g., transmit), via a PDCCH, DCI (e.g., 1st DCI) comprising downlink assignment for a TB, to a wireless device (such as shown in FIG. 30). The wireless device may start the drx-InactivityTimer, for example, based on (e.g., after or in response to) receiving the DCI. The wireless device may monitor the PDCCH, for example, for a timer (e.g., the drx-InactivityTimer) running. The wireless device may receive a TB based on receiving the DCI. The wireless device may send (e.g., transmit) a NACK to the base station upon unsuccessful decoding the TB. The wireless device may start a HARQ RTT Timer (e.g., drx-HARQ-RTT-TimerDL) in the first symbol, for example, after the end of sending (e.g., transmitting) the NACK. The wireless device may stop a retransmission timer (e.g., the drx-RetransmissionTimerDL) for a HARQ process corresponding to the TB. The wireless device may stop monitoring the PDCCH for one or more RNTI(s) impacted by the DRX operation, for example, for the HARQ RTT Timer running. The one or more RNTI(s) may comprise C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and/or AI-RNTI.

The wireless device may monitor the PDCCH and start a HARQ retransmission timer (e.g., drx-RetransmissionTimerDL), for example, if the HARQ RTT Timer expires (such as shown in FIG. 30). The wireless device, for monitoring the PDCCH, may receive second DCI (e.g., 2nd DCI in FIG. 30) scheduling retransmission of the TB, for example, if the HARQ retransmission timer is running. The wireless device may stop monitoring the PDCCH, for example, if not receiving the second DCI (e.g., before the HARQ retransmission timer expires).

Figure 31A:
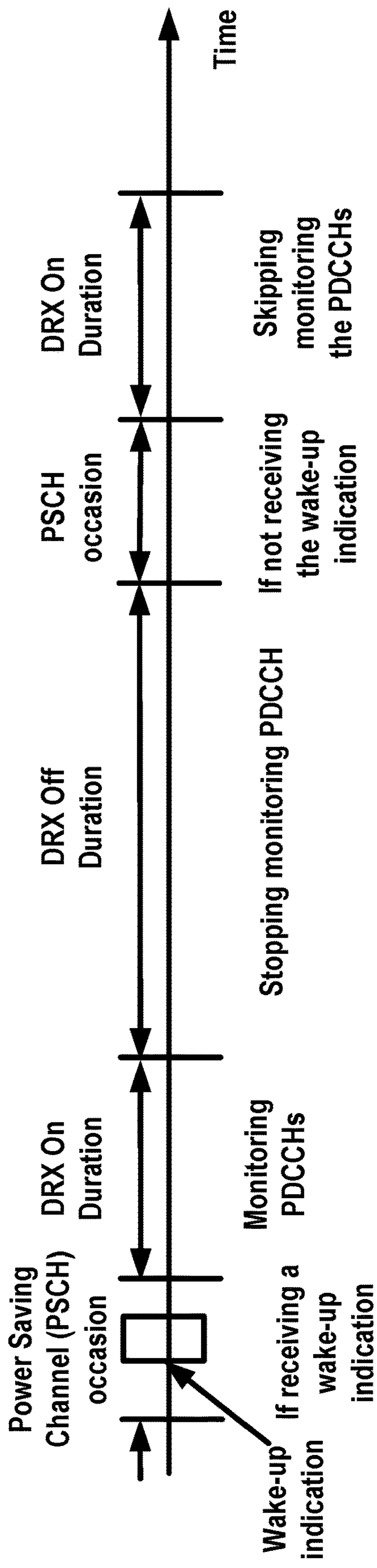
FIG. 31A and FIG. 31B show examples of power saving operations of a wireless device.

FIG. 31A shows an example power saving operation for a wireless device. The example power saving operation of FIG. 31A may be based on a wake-up indication. A base station may send/transmit one or more messages comprising parameters of a wake-up duration (e.g., a power saving duration, or a power saving channel (PSCH) occasion), to a wireless device. The wake-up duration may be located at (e.g., start from) a time that is a quantity/number of slots (or symbols) before a DRX ON duration of a DRX cycle. The quantity/number of slots (or symbols) may be a gap between a wake-up duration and a DRX ON duration. A DRX cycle may be implemented based on examples, such as described with respect to FIG. 29. The quantity of slots may be configured in the one or more RRC messages or may be predefined as a fixed value. The gap may be used for at least one of: synchronization with the base station, measuring reference signals, and/or retuning RF parameters. The gap may be determined based on a capability of the wireless device and/or the base station. The parameters of the wake-up duration may be pre-defined without RRC configuration. The wake-up mechanism may be based on a wake-up indication (e.g., via a PSCH). The parameters of the wake-up duration may comprise at least one of: a PSCH channel format (e.g., numerology, DCI format, PDCCH format), a periodicity of the PSCH, a control resource set, and/or a search space of the PSCH. The wireless device may monitor the PSCH for receiving the wake-up signal during the wake-up duration, for example, if configured with the parameters of the wake-up duration. The wireless device may monitor the PSCH for detecting a wake-up indication during the PSCH occasion/wake-up duration, for example, if configured with the parameters of the PSCH occasion. The wireless device may wake up to monitor PDCCHs in a DRX active time (e.g., comprising DRX ON duration) of a next DRX cycle according to the DRX configuration, for example, based on/in response to receiving the wake-up signal/channel (or a wake-up indication via the PSCH). The wireless device may monitor PDCCHs in the DRX active time (e.g., when drx-onDurationTimer is running), for example, based on/in response to receiving the wake-up indication via the PSCH. The wireless device may go back to sleep if the wireless device does not receive PDCCH transmissions in the DRX active time. The wireless device may stay in a sleep state during the DRX OFF duration of the DRX cycle. The wireless device may skip monitoring PDCCHs in the DRX active time, for example, if the wireless device doesn't receive the wake-up signal/channel (or a wake-up indication via the PSCH) during the wake-up duration (or the PSCH occasion). The wireless device may skip monitoring PDCCHs in the DRX active time, for example, if the wireless device receives, during the wake-up duration (or the PSCH occasion), an indication indicating skipping PDCCH monitoring.

Figure 31B:
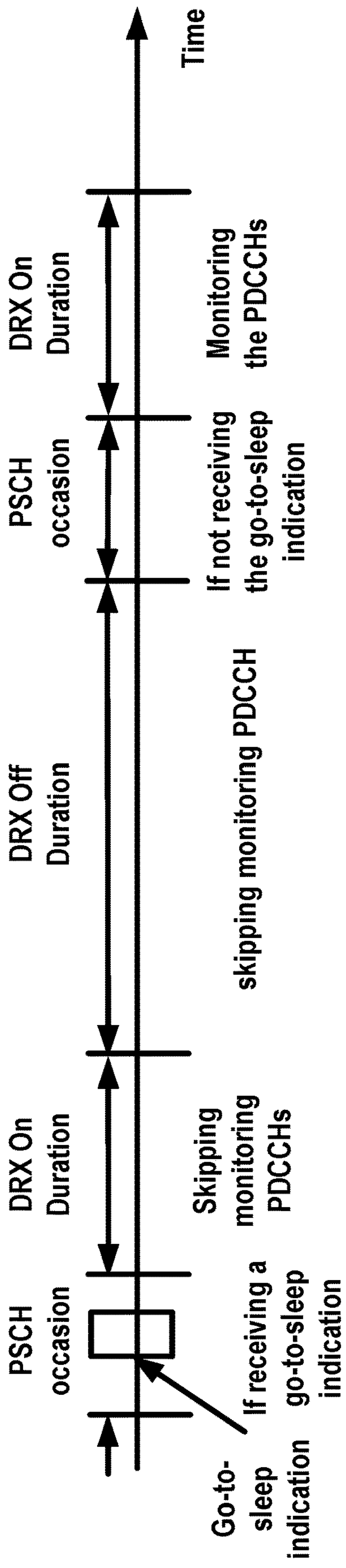

FIG. 31B shows an example power saving operation for a wireless device. The power saving operation of FIG. 31B may be based on go-to-sleep indication. The wireless device may go back to sleep and skip monitoring PDCCHs during the DRX active time (e.g., during a next DRX ON duration of a DRX cycle), for example, based on/in response to receiving a go-to-sleep indication via the PSCH. The wireless device may monitor PDCCH during the DRX active time, according to the configuration parameters of the DRX operation, for example, if the wireless device doesn't receive the go-to-sleep indication via the PSCH during the wake-up duration. The power saving mechanisms of FIGS. 31A and 31B may reduce power consumption for PDCCH monitoring during the DRX active time.

A power saving operation may be based on combining the operations described with respect to FIG. 31A and FIG. 31B. A base station may send/transmit a power saving indication, in DCI via a PSCH, indicating whether the wireless device may wake up for a next DRX ON duration or skip the next DRX ON duration. The wireless device may receive the DCI via the PSCH. The wireless device may wake up for next DRX ON duration, for example, based on/in response to the power saving indication indicating that the wireless device may wake up for next DRX ON duration. The wireless device may monitor PDCCH in the next DRX ON duration in response to the waking up. The wireless device may go to sleep during or skip the next DRX ON duration, for example, based on/in response to the power saving indication indicating the wireless device may skip (or go to sleep) for next DRX ON duration. The wireless device may skip monitoring PDCCH in the next DRX ON duration, for example, based on/in response to the power saving indication indicating the wireless device shall go to sleep for next DRX ON duration. Various examples described with respect to FIG. 30, FIG. 31A, and/or FIG. 31B may be extended and/or combined to further improve power consumption of a wireless device and/or signaling overhead of a base station.

Figure 32A:
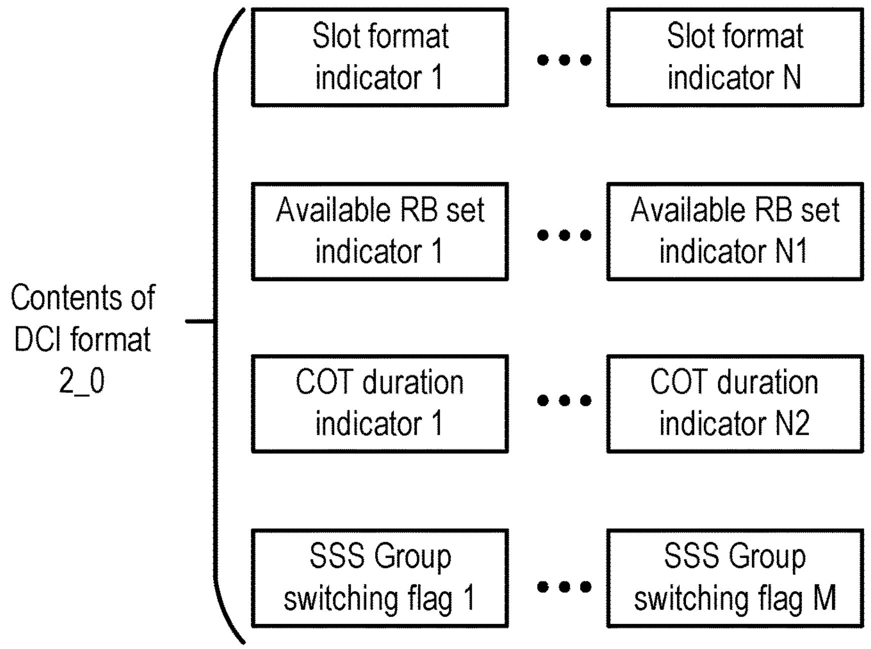
FIG. 32A and FIG. 32B show examples of search space set group (SSSG) switching for power saving of a wireless device.

FIG. 32A shows an example of SSSG switching for power saving of a wireless device. The example of FIG. 32A may comprise an example DCI format. The DCI format may correspond to DCI format 2_0 and may comprise one or more search space set groups (or SSSGs) switching indications (or SSSG switching flags). The DCI format 2_0 may comprise one or more slot format indicators (e.g., slot format indicator 1, slot format indicator 2, . . . slot format indicator N), one or more available RB set indicators, one or more channel occupancy time (COT) duration indications, and/or one or more SSSG switching flags. Each of the one or more SSSG switching flags may correspond to a respective cell group of a plurality of cell groups. Each cell group of the plurality of cell groups may comprise one or more cells. An SSSG switching flag, of the one or more SSSG switching flags, corresponding to a cell group, may indicate switching from a first SSSG to a second SSSG for each cell of the cell group, for example, if the SSSG switching flag is set to a first value. The SSSG switching flag may indicate switching from the second SSSG to the first SSSG for each cell of the cell group, for example, if the SSSG switching flag is set to a second value.

Figure 32B:
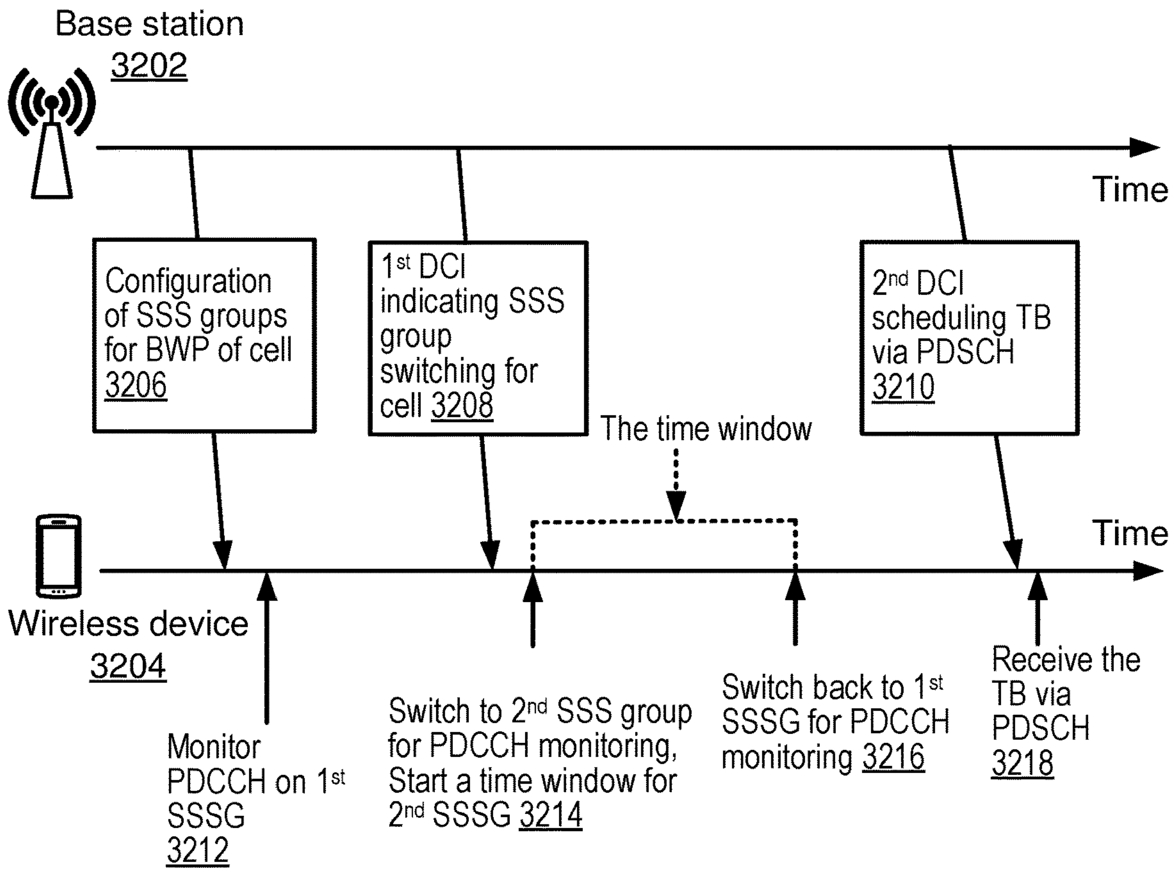

FIG. 32B shows an example of SSSG switching for power saving of a wireless device. The SSSG switching may be based on DCI (e.g., corresponding to DCI format 2_0, or other DCI formats as described with respect to FIG. 23). A wireless device 3004 may receive configuration 3006 of SSSG for a BWP of a cell. The configuration 3006 may comprise a plurality of parameters. The configuration 3006 may be via RRC messaging and/or SIB1 messaging.

The wireless device 3004 may be provided/indicated with a group indicator/index for a search space set (e.g., a Type3-PDCCH CSS set, a USS set, or any other type of search space set) by a parameter (e.g., searchSpaceGroupIdList, as described with respect to FIG. 27) for PDCCH monitoring on a serving cell.

The wireless device 3004 may or may not be provided/indicated with the parameter searchSpaceGroupIdList for a search space set. The SSSG switching as described with respect to FIG. 32B may not be applicable for PDCCH monitoring on the search space, for example, if the search space set is not configured with searchSpaceGroupIdList. The wireless device 3004 may monitor the search space set on a BWP, without switching away from the search space set, for PDCCH monitoring, for example, if the search space set is not configured with searchSpaceGroupIdList.

SSSG switching as shown in FIG. 32B may use/apply to all serving cells within each group, for example, if the wireless device 3004 is provided/indicated with parameter cellGroupsForSwitchList (e.g., as described with respect to FIG. 26), indicating one or more groups of serving cells. The SSSG switching as described with respect to FIG. 32B may use/apply only to a serving cell for which the wireless device 3004 is provided/indicated with parameter searchSpaceGroupIdList, for example, if the wireless device 3004 is not provided/indicated with the parameter cellGroupsForSwitchList. The wireless device 3004 may reset PDCCH monitoring according to search space sets with a specific group index (e.g., group index 0), for example, if a wireless device 3004 is provided/indicated with parameter searchSpaceGroupIdList.

The wireless device 3004 may be provided/indicated with parameter searchSpaceSwitchDelay (e.g., as shown in FIG. 26) with a quantity/number of symbols P_switch based on wireless device processing capability (e.g., wireless device processing capability 1, wireless device processing capability 2, etc.) and sub-carrier spacing (SCS) configuration. Wireless device processing capability 1 for SCS configuration may use/apply unless the wireless device 3004 indicates support for wireless device processing capability 2. For example, P_switch may be 25 for wireless device capability 1 and =0, P_switch may be 25 for wireless device capability 1 and =1, P_switch may be 25 for wireless device capability 1 and =2, P_switch may be 10 for wireless device capability 2 and =0, P_switch may be 12 for wireless device capability 2 and =1, and P_switch may be 22 for wireless device capability 2 and =2, etc.

The wireless device 3004 may be provided/indicated with parameter searchSpaceSwitchTimer (in units of slots, e.g., as shown in FIG. 26). The parameter searchSpaceSwitchTimer may be with a timer value for a serving cell for which the wireless device 3004 is provided with the parameter searchSpaceGroupIdList or may be for a set of serving cells indicated by parameter cellGroupsForSwitchList (e.g., if provided). The wireless device 3004 may decrement the timer value by one after each slot based on a reference SCS configuration that is a smallest SCS configuration among all configured downlink BWPs in the serving cell, or in the set of serving cells. The wireless device 3004 may maintain the reference SCS configuration during the timer decrement procedure.

Parameter searchSpaceSwitchTimer may be defined as a value in unit of slots. The parameter searchSpaceSwitchTimer may indicate a time duration for monitoring PDCCH in the active downlink BWP of the serving cell before moving to a default search space group (e.g., search space group 0). The timer value may be based on SCS. A valid timer value may be one of $\{1, \ldots, 20\}$, for example, if SCS is 15 kHz. A valid timer value may be one of $\{1, \ldots, 40\}$, for example, if SCS is 30 kHz. A valid timer value may be one of $\{1, \ldots, 80\}$, for example, if SCS is 60 kHz. The base station may configure a same timer value for all serving cells in a same cell group as indicated by parameter CellGroupForSwitch.

The wireless device 3004 may monitor (e.g., step 3012) PDCCH on a first SSSG (e.g., search space sets with group index 0) based on configuration of SSSG of a BWP of a cell (e.g., via configuration 3006). The wireless device 3004 may be provided/indicated with SearchSpaceSwitchTrigger indicating a location of a SSSG switching flag field for a serving cell as present in DCI (e.g., DCI corresponding to a DCI format 2_0). The parameter SearchSpaceSwitchTrigger may be configured as shown in FIG. 27.

The wireless device 3004 may receive DCI 3008 (e.g., with DCI format 2_0). The DCI 3008 may indicate a SSSG switching for the cell, for example, if a value of the SSSG switching flag field in the DCI 3008 is 1 (or any other predefined value). The wireless device 3004 may switch (e.g., step 3014) to a second SSSG for PDCCH monitoring. The wireless device 3004 may start monitoring PDCCH on the second SSSG (e.g., search space sets with group index 1) and stop monitoring PDCCH on the first SSSG (or the search space sets with group index 0) for the serving cell. The wireless device 3004 may start monitoring PDCCH on the second SSSG (e.g., search space sets with group index 1) and stop monitoring PDCCH on the first SSSG at a first slot that is at least P_switch symbols after a last symbol of the PDCCH comprising the DCI. The wireless device 3004 may start window (e.g., start a search space switching timer), for example, based on switching to the second SSSG. The wireless device 3004 may set the timer value of the search space switching timer to the value provided/indicated by parameter searchSpaceSwitchTimer, for example, based on receiving the DCI.

The wireless device 3004 may monitor PDCCH on the second SSSG (e.g., search space sets with group index 1) based on configuration of SSSGs of a BWP of a cell. The wireless device 3004 may be indicated, via parameter SearchSpaceSwitchTrigger, a location of a SSSG switching flag field for a serving cell in DCI (e.g., corresponding to DCI format 2_0). The wireless device 3004 may receive DCI. The DCI may indicate SSSG switching for the cell, for example, if a value of the SSSG switching flag field in the DCI is 0. The wireless device 3004 may start monitoring PDCCH on search space sets with group index 0 and stop monitoring PDCCH on search space sets with group index 1 for the serving cell, for example, if a value of the SSSG switching flag field in the DCI is 0. The wireless device 3004 may start monitoring the PDCCH on search space sets with group index 0 and stop monitoring PDCCH on search space sets with group index 1 at a first slot that is at least P_switch symbols after the last symbol of the PDCCH comprising the DCI.

The wireless device 3004 may start monitoring PDCCH for the serving cell on the second SSSG (e.g., search space sets with group index 1), and stop monitoring PDCCH on the first SSSG (e.g., search space sets with group index 0), for example, if the wireless device 3004 initially monitors PDCCH for the serving cell on the first SSSG. The wireless device 3004 may start monitoring PDCCH for the serving cell on the second SSSG and stop monitoring PDCCH on the first SSSG at the beginning of the first slot that is at least P_switch symbols after a slot where the timer expires or after a last symbol of a remaining channel occupancy duration for the serving cell (e.g., as indicated by the DCI 3008).

The wireless device 3004 may or may not be provided/indicated with parameter SearchSpaceSwitchTrigger for a serving cell. For example, the parameter SearchSpaceSwitchTrigger may be absent in configuration parameters corresponding to SlotFormatIndicator (e.g., wherein SlotFormatIndicator is configured for monitoring a Group-Common-PDCCH for Slot-Format-Indicators (SFI)). The DCI 3008 (e.g., corresponding to DCI format 2_0) may not comprise a SSSG switching flag field, for example, based on the parameter SearchSpaceSwitchTrigger not being provided. The wireless device 3004 may start monitoring PDCCH on the second SSSG (e.g., a search space sets with group index 1) and stop monitoring PDCCH according on the first SSSG (e.g., a search space sets with group index 0) for the serving cell, for example, if the parameter SearchSpaceSwitchTrigger is not provided and if the wireless device 3004 detects DCI based on monitoring PDCCH on the first SSSG. The wireless device 3004 may start monitoring PDCCH on the second SSSG and stop monitoring PDCCH on the first SSSG at a first slot that is at least P_switch symbols after the last symbol of the PDCCH comprising the DCI. The wireless device 3004 may set (or restart) the timer value to the value provided by parameter searchSpaceSwitchTimer, for example, if the wireless device 3004 detects DCI based on monitoring PDCCH in any search space set.

The wireless device 3004 may or may not be provided/indicated with parameter SearchSpaceSwitchTrigger for a serving cell. The wireless device 3004 may start monitoring PDCCH for the serving cell according to the second SSSG (e.g., search space sets with group index 1), and stop monitoring PDCCH according to the first SSSG (e.g., a search space sets with group index 0), for the serving cell, for example, if the parameter SearchSpaceSwitchTrigger is not provided and if the wireless device 3004 initially monitors PDCCH for a serving cell according to the first SSSG. The wireless device 3004 may start monitoring PDCCH for the serving cell according to the second SSSG and stop monitoring PDCCH according to the first SSSG at the beginning of the first slot that is at least P_switch symbols after a slot where the timer expires. The wireless device 3004 may start monitoring PDCCH for the serving cell according to the second SSSG and stop monitoring PDCCH according to the first SSSG after a last symbol of a remaining channel occupancy duration for the serving cell that is indicated by DCI format 2_0, for example, if the wireless device 3004 is provided with a search space set to monitor PDCCH for detecting a DCI format 2_0.

The wireless device 3004 may switch back to the first SSSG for PDCCH monitoring (e.g., step 3016), for example, based on/after an expiration of the timer. The wireless device 3004 may start monitoring PDCCH on the first SSSG and stop monitoring PDCCH on the second SSSG, for example, based on expiration of the timer. The wireless device 3004 may receive second DCI 3010 based on the PDCCH monitoring. The second DCI 3010 may schedule a TB via a PDSCH. The wireless device 3004 may receive (e.g., step 3018) the TB via the PDSCH and based on the scheduling indicated via the second DCI 3010.

The wireless device 3004 may determine a slot and a symbol in a slot to start or stop PDCCH monitoring on search space sets for a serving cell for which the wireless device 3004 is provided/indicated with parameter searchSpaceGroupIdList. The wireless device 3004 may start or stop PDCCH monitoring on search space sets for a serving cell if parameter cellGroupsForSwitchList is provided/indicated for a set of serving cells, based on the smallest SCS configuration among all configured downlink BWPs. The downlink BWPs may be in the serving cell or in the set of serving cells and, if any, in the serving cell where the wireless device 3004 receives a PDCCH transmission and detects a corresponding DCI format 2_0 (e.g., triggering the start or stop of PDCCH monitoring on search space sets).

Figure 33:
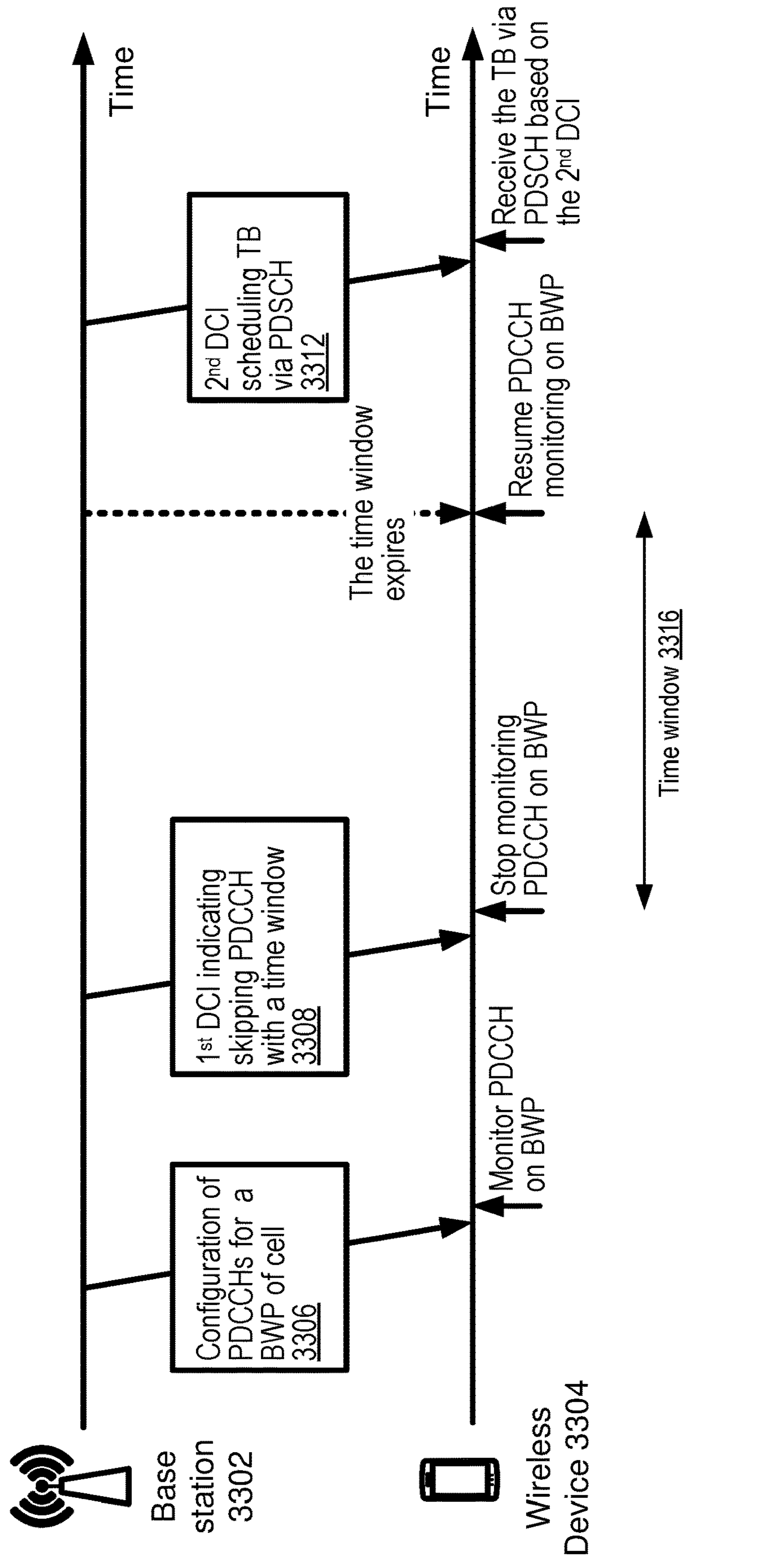
FIG. 33 shows an example of physical downlink control channel (PDCCH) skipping for power saving of a wireless device.

FIG. 33 shows an example PDCCH skipping for power saving of a wireless device. A base station 3302 may send/transmit, to a wireless device 3304, one or more RRC messages comprising configuration parameters 3306. The configuration parameters 3306 may be for a PDCCH for a BWP of a cell (e.g., as described with respect to FIG. 26 and/or FIG. 27). The wireless device 3304 may monitor PDCCH on the BWP, for example, based on the configuration parameters 3306 of the PDCCH. The BWP may a downlink BWP which may be in an active state. The wireless device 3304 may activate the BWP as described with respect to FIG. 22.

The wireless device 3304 may receive first DCI 3308 indicating skipping the PDCCH (e.g., monitoring/receiving via the PDCCH) within a time window 3316. A time value (e.g., duration) for the time window 3316 may be indicated by the first DCI 3308 or configured by the one or more RRC messages. The wireless device 3304 may stop monitoring the PDCCH on the BWP, for example, based on/in response to receiving the first DCI 3308. Stopping monitoring PDCCH on the BWP may comprise stopping monitoring the PDCCH on one or more SSSGs configured on the BWP. The wireless device 3304 may maintain an active state of the BWP. The first DCI 3308 may not indicate an active BWP switching. The base station 3302 may not send/transmit a PDCCH transmission to the wireless device 3304, for example, within/during the time window 3316 (or when a timer associated with the time window 3316 is running).

The wireless device 3304 may resume PDCCH monitoring on the BWP, for example, based on/after the expiration of the time window 3316. The wireless device 3304 may receive second DCI 3312 scheduling TB via a PDSCH, for example, based on resuming PDCCH monitoring. The wireless device 3304 may receive the TB via the PDSCH scheduled by the second DCI 3312. The base station 3302 may send/transmit the second DCI 3312 to the wireless device 3304, for example, based on/in response to expiration of the time window 3316.

A base station may send/transmit one or more SSBs (e.g., periodically) to a wireless device or a plurality of wireless devices. The wireless device (in RRC idle state, RRC inactive state, or RRC connected state) may use the one or more SSBs for time and frequency synchronization with a cell of the base station. An SSB, comprising a PSS, a SSS, a PBCH, and/or a PBCH DM-RS, may be sent/transmitted (e.g., as described with respect to FIG. 11A). An SSB may occupy a quantity/number (e.g., 4, or any other quantity) of OFDM symbols. The base station may send/transmit one or more SSBs in an SSB burst (e.g., to enable beam-sweeping for PSS/SSS and PBCH). An SSB burst may comprise a set of SSBs, with each SSB potentially being transmitted via a corresponding different beam. SSBs, in the SSB burst, may be transmitted using time-division multiplexing. An SSB burst may be within a time window (e.g., a 5 ms window, or a window of any other duration) and may be either located in first-half or in the second-half of a radio frame (e.g., with a duration of 10 ms, or any other duration). An SSB burst may be equivalently referred to as a transmission window (e.g., 5 ms, or any other time duration) in which the set of SSBs are transmitted.

The base station may indicate a transmission periodicity of SSB via an RRC message (e.g., a SIB1 message). For example, the transmission periodicity may be indicated using parameter ssb-PeriodicityServingCell as present in ServingCellConfigCommonSIB of a SIB1 message (e.g., as shown in FIG. 25). A candidate value of the transmission periodicity may be in a range of {5 ms, 10 ms, 20 ms, 40 ms, 80 ms, 160 ms}. The transmission periodicity may have any other value. A maximum quantity/number of candidate SSBs (Lmax) within an SSB burst may depend on a carrier frequency/band of the cell. For example, Lmax=4 if fc<=3 GHz. Lmax=8 if 3 GHz<fc<=6 GHz. Lmax=64 if fc>=6 GHz, etc., wherein fc may be the carrier frequency of the cell. A starting OFDM symbol indicator/index, of a candidate SSB (e.g., occupying 4 OFDM symbols) within an SSB burst (e.g., comprised in a 5 ms time window), may depend on an SCS and a carrier frequency band of the cell.

FIG. 34 shows an example of SSB configurations. FIG. 34 shows an example table for determination of a starting OFDM symbol index of candidate SSBs. OFDM starting symbols may be determined as a function of a SCS and carrier frequency. For example, starting OFDM symbol indexes of SSBs in an SSB burst, for a cell configured with 15 kHz SCS and carrier frequency fc<3 GHz (e.g., Lmax=4), may be 2, 8, 16, and 22. OFDM symbols in a half-frame may be indexed with the first symbol of the first slot being indexed as 0. Starting OFDM symbol indexes of SSBs in an SSB burst, for a cell configured with 15 kHz and carrier frequency 3 GHz<fc<6 GHz (Lmax=8) may be 2, 8, 16, 22, 30, 36, 44 and 50. Starting OFDM symbol indexes for other SCSs and carrier frequencies may be similarly determined in accordance with the table shown in FIG. 34. The base station may send/transmit only one SSB by using the first SSB starting position, for example, if the base station is not transmitting the SSBs with beam forming.

Figure 35:
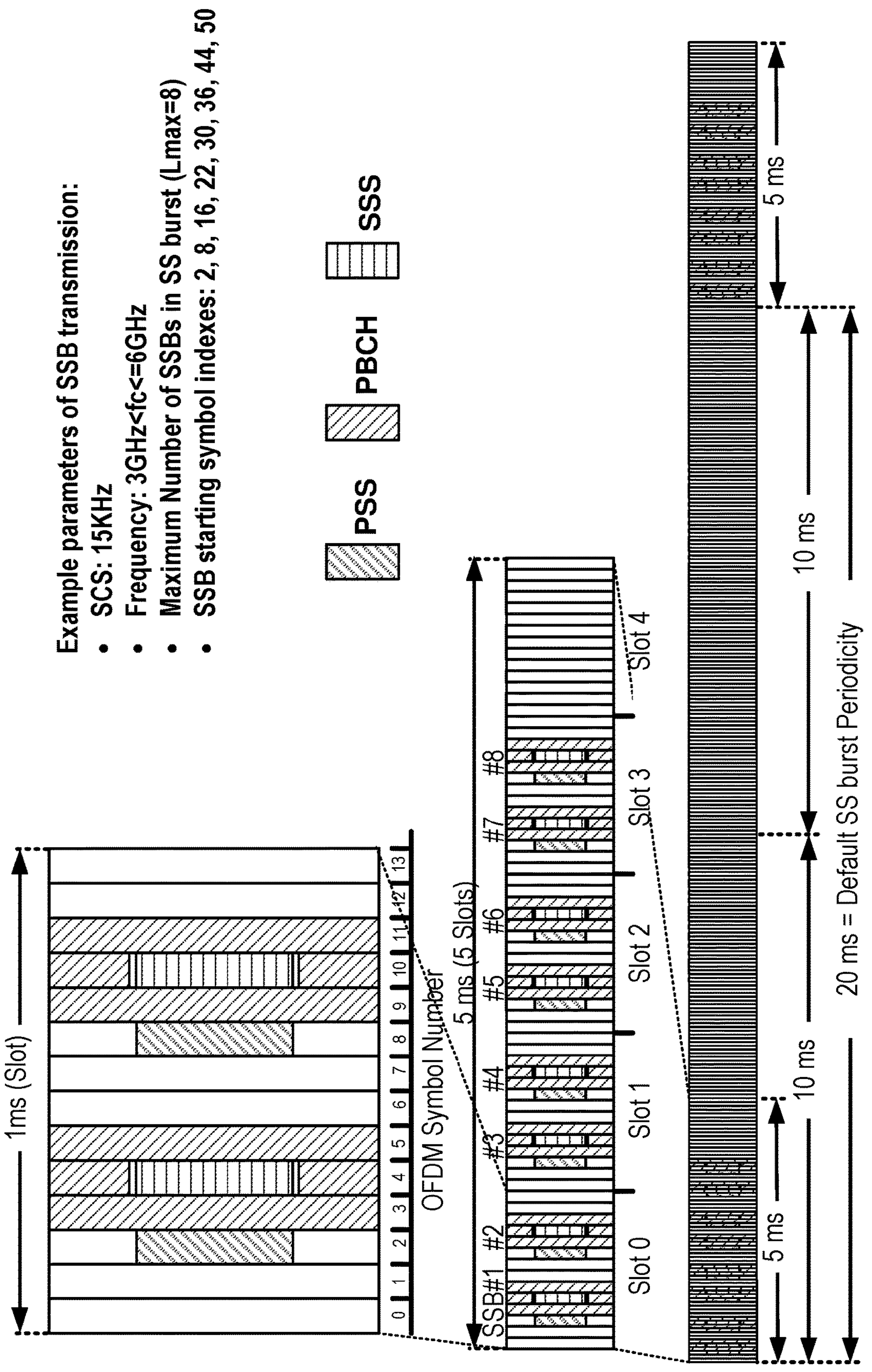
FIG. 35 shows an example of SSB transmissions of a base station.

FIG. 35 shows an example of SSB transmissions of a base station. An SCS of the cell may be 15 kHz, and the cell may be configured with carrier frequency fc, such that 3 GHz<fc<=6 GHz. A maximum quantity of candidate SSBs in an SSB burst may be 8 (Lmax=8), for example, based on the value of f-c. Starting symbols for SSB transmission may be determined in accordance with the table shown in FIG. 34. SSB #1 may start at symbol 2 (of 70 symbols included in 5 ms half-frame), SSB #2 may start at symbol #8, SSB #3 may start at symbol #16, SSB #4 may start at symbol #22, SSB #5 may start at symbol #30, SSB #6 may start at symbol #36, SSB #7 may start at symbol #44, and SSB #8 may start at symbol 50. The SSB burst may be transmitted in the first half (and not the second half) of a radio frame (with 10 ms duration).

The SSB burst (and each SSB of the SSB burst) may be sent/transmitted with a periodicity. A default periodicity of an SSB burst may be 20 ms (e.g., as shown in FIG. 35, or any other duration of time). The default transmission periodicity may be a periodicity, for example, before a wireless device may receive a SIB1 message for initial access of the cell. For example, the base station, with 20 ms transmission periodicity of SSB (or SSB burst), may send/transmit the SSB burst in the first 5 ms of each 20 ms period. The base station may not send/transmit the SSB burst in the rest 15 ms of the each 20 ms period.

A base station may send/transmit RRC messages (e.g., SIB1 messages) indicating cell specific configuration parameters of SSB transmission. The cell specific configuration parameters may comprise a value for a transmission periodicity (e.g., parameter ssb-PeriodicityServingCell) of an SSB burst and locations (e.g., presence) of SSBs (e.g., active SSBs), of a plurality of candidate SSBs, in the SSB burst. The plurality of candidate SSBs (e.g., starting symbols of candidate SSBs) may be determined as described with respect to FIG. 34. The cell specific configuration parameters may comprise a position indication of an SSB in an SSB burst (e.g., parameter ssb-PositionsInBurst). The position indication may comprise a first bitmap (e.g., groupPresence) and a second bitmap (e.g., inOneGroup) indicating locations/presence of SSBs in an SSB burst.

Carrier frequency fc and SCS may determine a maximum quantity of candidate SSBs in an SSB burst (e.g., as described with respect to FIG. 34). The position indication (e.g., parameter ssb-PositionsInBurst) may indicate SSBs (e.g., active SSBs, positions of the active SSBs), of a plurality of candidate SSBs, that are sent/transmitted in the SSB burst (e.g., as further described with respect to FIG. 36). A base station may indicate the transmitted active SSBs and/or a quantity of the active SSBs, in an SSB burst, using the position indication (e.g., parameter ssb-PositionsInBurst). The position indication may be transmitted by the base station, for example, via an RRC message and/or DCI.

Figure 36:
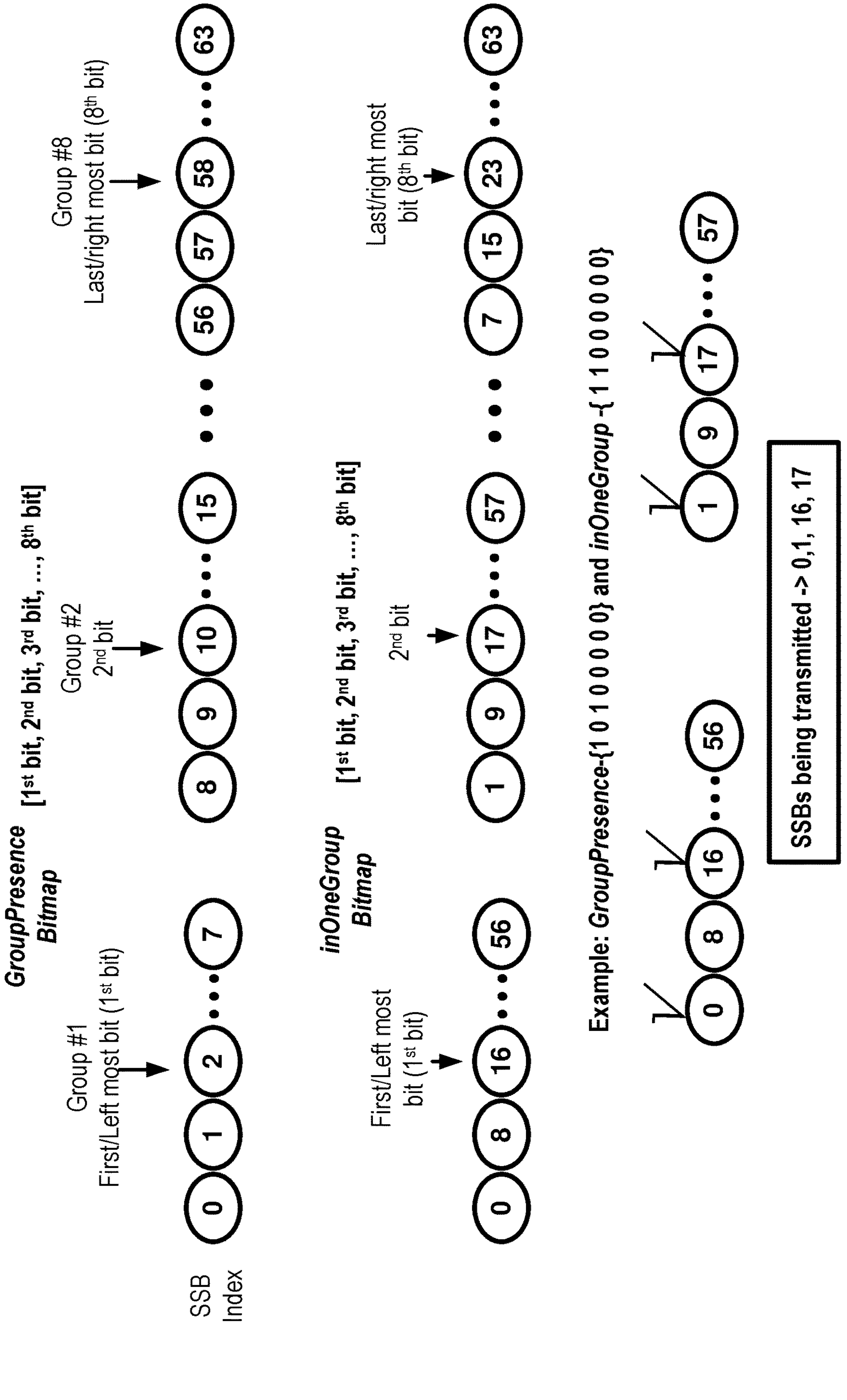
FIG. 36 shows an example of SSB transmissions of a base station.

FIG. 36 shows an example of SSB transmissions of a base station. Indication of SSB location may be in form of an indication of a presence of an SSB group among a plurality of SSB groups. Each group may comprise a subset of a plurality of candidate SSBs (e.g., maximum possible quantity of candidate SSBs) in an SSB burst. For example, a maximum possible quantity of candidate SSBs in an SSB burst may be equal to 64 (e.g., for SCS=120 kHz or 240 kHz, and fc>6 GHz). The candidate SSBs in the SSB burst may comprise SSBs with indexes from 0 to 63. The candidate SSBs in an SSB burst may be divided into SSB groups.

A first bitmap (e.g., parameter groupPresence) may comprise a quantity of bits (e.g., 8, or any other quantity). The first bitmap may be configured/indicated by the SIB1 message. Each bit of the first bitmap may correspond to a respective group of SSB groups. As shown in FIG. 36, a first bit (e.g., left most bit of the first bitmap) may correspond to a first SSB group comprising 1st SSB (with SSB index 0), 2nd SSB (with SSB index 1), . . . and 8th SSB (with SSB index 7). A second bit (e.g., the second bit of the first bitmap) may correspond to a second SSB group comprising 9th SSB (with SSB index 8), 10th SSB (with SSB index 9), . . . and 16th SSB (with SSB index 15). A last bit (e.g., right most bit of the first bitmap) may correspond to an 8th SSB group comprising 57th SSB (with SSB index 56), 58th SSB (with SSB index 57), . . . and 64th SSB (with SSB index 63), etc. An SSB may belong/correspond to at most one SSB group of the first SSB groups. A bit, of the first bitmap, may indicate whether the base station may send/transmit an SSB group, corresponding to the bit, in an SSB burst. The bit being set to a first value (e.g., 1) may indicate that the corresponding SSB group may be sent/transmitted in the SSB burst by the base station. The bit being set to a second value (e.g., 0) may indicate that the corresponding SSB group is not sent/transmitted in the SSB burst by the base station, or vice versa.

A second bitmap (e.g., parameter inOneGroup) may comprise a quantity of bits (e.g., 8, or any other quantity). Each bit of the second bitmap may correspond to a respective group of SSB groups. A first bit (e.g., left most bit of the second bitmap) may correspond to a first SSB group comprising 1st SSB (with SSB index 0), 2nd SSB (with SSB index 8), . . . and 8th SSB (with SSB index 56). A second bit (e.g., the second bit of the second bitmap) may correspond to a second SSB group comprising 1st SSB (with SSB index 1), 2nd SSB (with SSB index 9), . . . and 8th SSB (with SSB index 57). A last bit (e.g., right most bit of the second bitmap) may correspond to an 8th SSB group comprising 1st SSB (with SSB index 7), 2nd SSB (with SSB index 15), . . . and 8th SSB (with SSB index 63), etc. An SSB may belong/correspond to at most one SSB group of the second SSB groups. A bit, of the second bitmap, may indicate whether the base station may send/transmit an SSB group, corresponding to the bit, in an SSB burst. The bit being set to a first value (e.g., 1) may indicate that the corresponding SSB group is sent/transmitted in the SSB burst by the base station. The bit being set to a second value (e.g., 0) may indicate that the corresponding SSB group is not sent/transmitted in the SSB burst by the base station, or vice versa.

The plurality of SSBs (e.g., with SSB index from 0 to 63) may be grouped, for the first bitmap, into first SSB groups. Each of the first SSB groups may comprise SSBs with continuous SSB indexes. A first SSB group of the first SSB groups may comprise SSBs with SSB indexes from 0 to 7, a second SSB group may comprise SSB indexes from 8 to 15, etc. The plurality of SSBs may be also grouped, for the second bitmap, into second SSB groups. Each of the second SSB groups may comprise SSBs with discontinuous SSB indexes. A first SSB group of the second SSB groups may comprise SSBs with SSB indexes {0, 8, 16, . . . 56}. A second SSB group of the second SSB groups comprises SSBs with SSB indexes {1, 9, 17, . . . 57}, etc. SSB index gap between two neighboring SSB indexes in a second SSB group may be equal to 8 (or any other value).

Not all bits of the first and the second bitmap may be considered for determining an SSB group is sent/transmitted or not. A maximum quantity of SSBs within an SSB burst may be equal to four if fc<3 GHz (e.g., in accordance with FIG. 34). A wireless device may determine that the four leftmost bits of a bitmap (e.g., the first bitmap and/or the second bitmap) are valid. The wireless device may ignore the four rightmost bits of the first bitmap and/or the second bitmap.

As shown in FIG. 36, the first bitmap may be indicated, by the base station, as {1 0 1 0 0 0 0 0} and the second bitmap may be indicated as {1 0 0 0 0 0 0}. The base station may send/transmit SSBs with indexes {0 1 16 17} in an SSB burst, for example, based on the grouping configuration of the first SSB groups and the second SSB groups and further based on the first bitmap and the second bitmap.

A base station may send/transmit a MIB via PBCH. The MIB may indicate configuration parameters (e.g., for CORESET 0), for a wireless device monitoring a PDCCH, for scheduling a SIB1 message. The base station may send/transmit a MIB message with a transmission periodicity of 80 ms (or with any other first periodicity). The same MIB message may be repeated (according to SSB periodicity) within the 80 ms. Contents of the MIB message may be the same over the 80 ms period. The same MIB may be sent/transmitted over all SSBs within an SSB burst. The PBCH transmission (e.g., MIB) may indicate that there is no associated SIB1. A wireless device may be pointed to/indicated another frequency from where to search for an SSB that is associated with a SIB1 as well as a frequency range where the wireless device may assume no SSB associated with SIB1 is present, for example, if the PBCH transmission indicates that there is no associated SIB1. The indicated frequency range may be confined within a contiguous spectrum allocation of the same operator in which SSB is detected.

A base station may send/transmit a SIB1 message with a periodicity of 160 ms (or with any other second periodicity). The base station may transmit the same SIB1 message with variable transmission repetition periodicity within 160 ms. A default transmission repetition periodicity of SIB1 may be 20 ms (or any other third periodicity). The base station may determine an actual transmission repetition periodicity based on network implementation. SIB1 repetition transmission period may be 20 ms, for example, for SSB and CORESET multiplexing pattern 1. SIB1 transmission repetition period may be the same as the SSB period, for example, for SSB and CORESET multiplexing patterns 2 or 3. SIB1 may comprise information regarding availability and scheduling (e.g., mapping of SIBs to system information (SI) message, periodicity, SI window size) of other SIBs and/or an indication whether one or more SIBs are only provided on demand. Configuration parameters needed by a wireless device to perform an SI request may be indicated in the SIB1 if the one or more SIBs are only provided on demand.

A base station may enable a power saving operation for a wireless device (e.g., due to limited battery capacity of the wireless device). A base station may enable the power saving operation for a wireless device, for example, based on active BWP management (such as shown in FIG. 22), SCell dormancy mechanism (such as shown in FIG. 28), wake-up/go-to-sleep indication (such as shown in FIG. 31A and/or FIG. 31B), SSSG switching on an active BWP (such as shown in FIG. 32A and/FIG. 32B), and/or PDCCH skipping (such as shown in FIG. 33). A base station may not be able to save energy from the viewpoint of the base station, (e.g., if the base station is required to send/transmit some always-on downlink signals periodically (e.g., SSB, MIB, SIB1, SIB2, periodic CSI-RS, etc.) in some time period, even in some time period for which there is no active wireless device sending/transmitting to and/or receiving from the base station), for example, if indicating a power saving operation for a wireless device (e.g., based on examples described herein with respect to FIG. 22, FIG. 28, FIG. 31A, FIG. 31B, FIG. 32A, FIG. 32B, and/or FIG. 33). The base station may be required to send/transmit some always-on downlink signals periodically (e.g., SSB, MIB, SIB1, SIB2, periodic CSI-RS, etc.), for example, if the base station transitions a cell into a dormant state by switching an active BWP to a dormant BWP of the cell (e.g., such as described with respect to FIG. 28).

A base station may send/transmit an RRC message (e.g., SIB1) indicating a longer periodicity for the always-on downlink signal transmission, for example, if the base station needs to reduce periodicity of the always-on downlink signal transmission. A base station may send/transmit RRC reconfiguration messages to a wireless device in a source cell (e.g., each wireless device in a source cell) to indicate a handover to a neighbor cell. For example, the base station may send/transmit the RRC reconfiguration messages to indicate the handover based on determining to power off (e.g., both RF modules and base band units (BBUs)) for energy saving (e.g., before powering off).

A base station may send (e.g., transmit) a SIB1 message with a periodicity (e.g., a periodicity of 160 ms). The base station may send (e.g., transmit) the same SIB1 message with a variable transmission repetition periodicity (e.g., as a variable transmission repetition periodicity within 160 ms). A default transmission repetition periodicity of SIB1 may be 20 ms. The base station may determine an actual transmission repetition periodicity based on network implementation. For synchronization signal block (SSB) and control resource set (CORESET) multiplexing pattern 1, SIB1 repetition transmission period may be 20 ms. For SSB and CORESET multiplexing pattern 2/3, SIB1 transmission repetition period may be the same as the SSB period. SIB1 may comprise information regarding the availability and/or scheduling (e.g., mapping of SIBs to SI message, periodicity, SI-window size) of other SIBs, and an indication of if one or more SIBs may be provided only on-demand and, if so, configuration parameters that may be needed by a wireless device to perform an SI request.

A base station may be equipped with multiple transmission reception points (TRPs) to improve spectrum efficiency and/or transmission robustness. The base station may send (e.g., transmit) downlink (DL) signals and/or channels via intra-cell multiple TRPs (e.g., as described below in FIG. 37A) and/or via inter-cell multiple TRPs (e.g., as described below in FIG. 37B).

A base station may be equipped with more than one TRP. A first TRP may be physically located at a different place from a second TRP. The first TRP may be connected with the second TRP via a backhaul link (e.g., a wired and/or wireless link), the backhaul link may be an ideal backhaul link with zero and/or a negligible transmission latency, or, alternatively, the backhaul link may be a non-ideal backhaul link. A first TRP may be implemented with antenna elements, an RF chain, and/or baseband processor independently configured and/or managed from a second TRP.

Figure 37A:
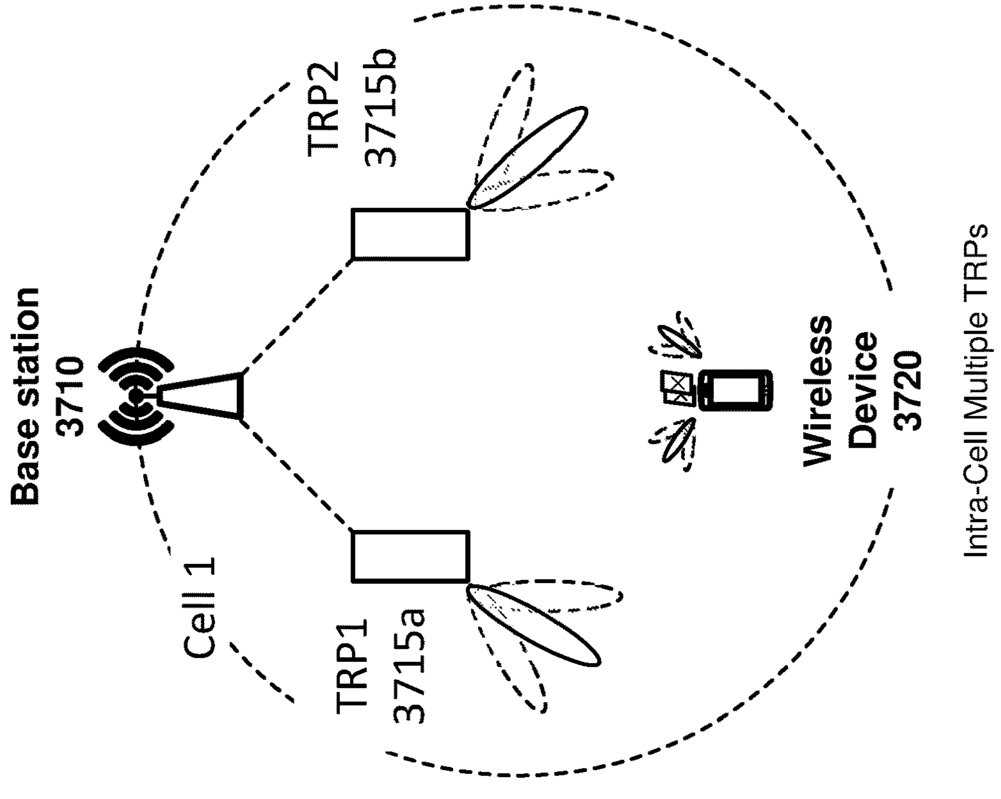
FIG. 37A and FIG. 37B show examples of multiple transmission and reception points (TRPs).

FIG. 37A shows an example of a communication between a base station 3710, equipped with multiple TRPs, and a wireless device 3720, equipped with a single panel and/or multiple panels based on intra-cell TRPs. Transmission and/or reception with multiple TRPs may improve system throughput and/or transmission robustness for a wireless communication in a high frequency (e.g., above 6 GHz). The multiple TRPs may be associated with identical physical cell identifiers (PCIs). Multiple TRPs, on which physical downlink control channel (PDCCH), physical downlink shared channel (PDSCH), physical uplink control channel (PUCCH), and/or physical uplink shared channel (PUSCH) resources of a cell may be shared, may be referred to as intra-cell TRPs and/or intra-PCI TRPs.

A TRP of multiple TRPs (e.g., TRP1 3715*a* and/or TRP2 3715*b*) of the base station 3710 may be identified by at least one of: a TRP identifier (ID), a virtual cell index, a reference signal index, and/or a group index. A TRP in a cell may be identified by a CORESET group and/or pool index (e.g., CORESETPoolIndex as described herein in FIG. 26) of a coreset group from which downlink control information (DCI) may be sent (e.g., transmitted) by the base station 3710 on a coreset. A TRP ID of a TRP may comprise a TRP index indicated in the DCI. A TRP ID of a TRP may comprise a transmission configuration indicator (TCI) state group index of a TCI state group. A TCI state group may comprise at least one TCI state with which the wireless device 3720 may receive the downlink transport blocks (TBs), and/or with which the base station 3710 may send (e.g., transmit) the downlink TBs.

A base station 3710 may send (e.g., transmit) to a wireless device 3720 one or more radio resource control (RRC) messages comprising configuration parameters of a plurality of CORESETs on a cell and/or a bandwidth part (BWP) of the cell. Each of the CORESETS of the plurality of CORESETs may be identified with a CORESET index and/or may be associated and/or configured with a CORESET pool and/or group index. One or more CORESETs, of the plurality of CORESETs, that may have an identical CORESET pool index may indicate that DCIs received on the one or more CORESETs may be sent (e.g., transmitted) from an identical TRP of a plurality of TRPs of the base station 3710. The wireless device 3720 may determine that receiving beams and/or spatial domain filters for PDCCHs and/or PDSCHs based on a TCI indication (e.g., DCI) and/or a CORESET pool index associated with a CORESET for the DCI.

A wireless device 3720 may receive multiple PDCCHs scheduling fully, partially, and/or non-overlapped PDSCHs in time and/or frequency domain, for example, if the wireless device 3720 receives one or more RRC messages (e.g., PDCCH-Config IE) comprising a first CORESET pool index (e.g., CORESETPoolIndex) value and/or a second COESET pool index in a CORESET (e.g., in ControlResourceSet IE). The wireless device 3720 may determine the reception of full and/or partially overlapped PDSCHs in the time domain, for example, only if PDCCHs that schedule two PDSCHs are associated with different ControlResourceSets having different values of CORESETPoolIndex.

A wireless device 3720 may determine that the ControlResourceSet may be assigned with a CORESETPoolIndex of 0 for a ControlResourceSet without a CORESETPoolIndex. Scheduling information for receiving a PDSCH may be indicated and/or carried only by a corresponding PDCCH, for example, if the wireless device 3720 is scheduled with fully, partially, and/or non-overlapped PDSCHs in time and/or frequency domain. The wireless device 3720 may be scheduled with the same active BWP and/or the same subcarrier spacing (SCS). A wireless device 3720 may be scheduled with at most two codewords simultaneously, for example, if the wireless device 3720 is scheduled with full and/or partially overlapped PDSCHs in time and/or frequency domain.

A wireless device 3720 may perform a number of operations, for example, if PDCCHs that schedule two PDSCHs are associated to different ControlResourceSets having different values of CORESETPoolIndex. The wireless device 3720 may be scheduled to receive a PDSCH starting earlier than the end of a first PDSCH with a PDCCH associated with a different value of CORESETpoolIndex that ends later than symbol i, for any two HARQ process IDs in a given scheduled cell, for example, if the wireless device 3720 is scheduled to start receiving a first PDSCH starting in symbol j by a PDCCH associated with a value of CORESETpoolIndex ending in symbol i in a given scheduled cell. The wireless device 3720 may receive a first PDSCH in slot i, using a corresponding HARQ-ACK that may be assigned to be sent (e.g., transmitted) in slot j, and a second PDSCH associated with a value of CORESETpoolIndex that may be different from that of the first PDSCH starting later than the first PDSCH, using a corresponding HARQ-ACK that may be assigned to be sent (e.g., transmitted) in a slot before slot j.

A wireless device 3720 may act as though data management reference signal (DM-RS) ports of PDSCH may be associated with a value of CORESETPoolIndex of a serving cell that may be quasi co-located with a RS(s) of a CORESET that may be associated with a monitored search space, for example, if a wireless device 3720 configured by higher layer parameter PDCCH-Config that contains two different values of CORESETPoolIndex in ControlResourceSet, for both cases, if tci-PresentInDCI is set to 'enabled' and tci-PresentInDCI is not configured in RRC connected mode, if the offset between the reception of the DL DCI, and if the corresponding PDSCH is less than the threshold timeDurationForQCL. The monitored search space may have a lowest CORESET-ID among CORESETs that may be configured with an identical value of CORESETPoolIndex as the PDCCH scheduling that PDSCH. The wireless device 3720 may monitor a latest slot in which one or more CORESETs may be associated with an identical value of CORESETPoolIndex as the PDCCH scheduling the PDSCH within an active BWP of a serving cell. Quasi co-located with the RS(s) may be with respect to the QCL parameter(s) used for PDCCH quasi co-location indication. The wireless device 3720 may act as though the DM-RS ports of PDSCH of a serving cell may be quasi co-located with the RS(s) with respect to the QCL parameter(s) associated with TCI states corresponding to a lowest codepoint among TCI codepoints containing two different TCI states, for example, if the offset between the reception of the DL DCI and the corresponding PDSCH is less than the threshold timeDurationForQCL, and at least one configured TCI state for the serving cell of scheduled PDSCH contains the 'QCL-TypeD,' and at least one TCI codepoint indicates two TCI states.

Figure 37B:
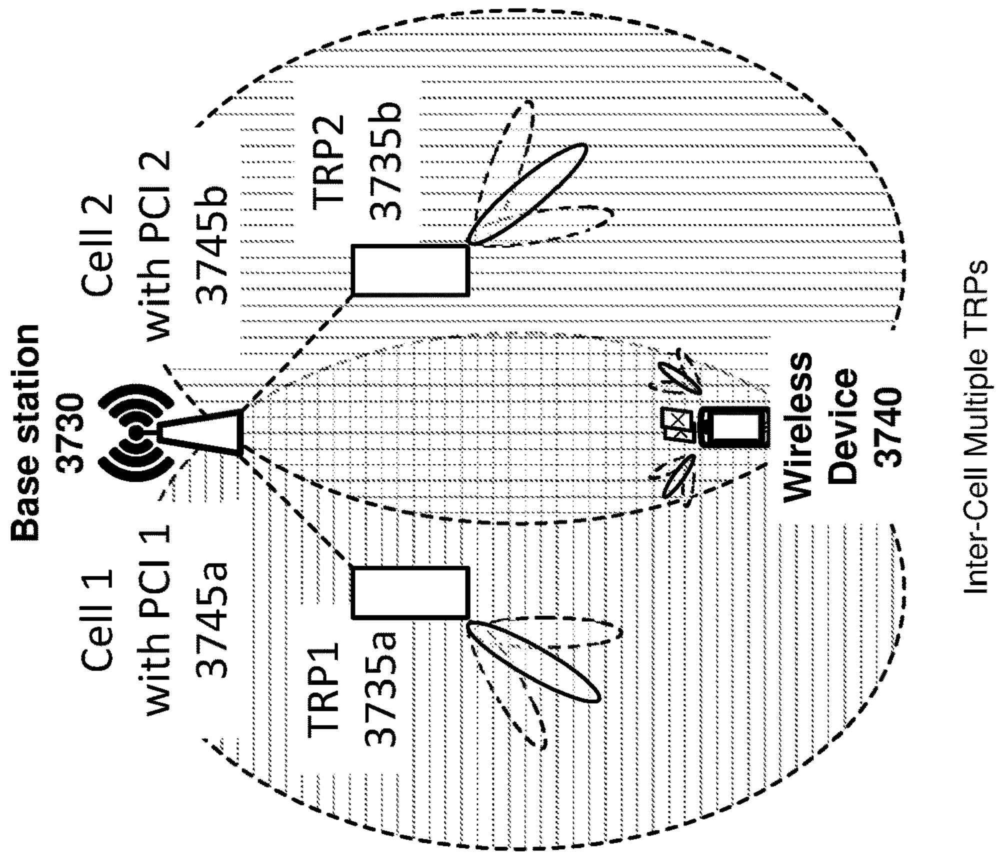

FIG. 37B shows an example of a communication between a base station 3730, equipped with multiple TRPs (e.g., TRP1 3735*a* and TRP2 3735*b*), and a wireless device 3740, equipped with a single panel or multiple panels based on inter-cell TRPs and/or inter-PCI TRPs. The multiple TRPs (e.g., TRP1 3735*a* and TRP2 3735*b*) of FIG. 37*b* may differ from the multiple TRPs (e.g., TRP1 3715*a* and TRP2 3715*b*) of FIG. 37A in that the multiple TRPs (e.g., TRP1 3735*a* and TRP2 3735*b*) of FIG. 37*b* may be associated with different PCIs. The multiple TRPs (e.g., TRP1 3735*a* and TRP2 3735*b*) of FIG. 37*b* may also differ from the multiple TRPs (e.g., TRP1 3715*a* and TRP2 3715*b*) of FIG. 37A in that the multiple TRPs (e.g., TRP1 3735*a* and TRP2 3735*b*) of FIG. 37*b* may be associated with and/or belong to different physical cells (e.g., Cell 1 3745*a* with PCI 1 and/or Cell 2 3745*b* with PCI 2). Communication between a base station 3730 and a wireless device 3740 as described in FIG. 37B may be referred to as inter-cell TRPs and/or inter-PCI TRPs. A cell may be a serving cell and/or a non-serving (e.g., neighbor) cell of the wireless device 3740. A base station 3730 may configure Cell 2 3745*b* with PCI 2 as a part of Cell 1 3745*a* with PCI 1 (e.g., a second TRP with a second PCI different from a first PCI of a first TRP). The wireless device 3740 may receive $1^{st}$ SSBs from Cell 1 3745*a* with PCI 1 and/or receive $2^{nd}$ SSBs from Cell 2 3745*b* with PCI 2, for example, if operating the inter-cell TRPs for a wireless device 3740. The $1^{st}$ SSBs and the $2^{nd}$ SSBs may have different configuration parameters, wherein the configuration parameters may be implemented as described above with respect to FIG. 34, FIG. 35 and/or FIG. 36. With the inter-cell TRPs, the wireless device 3740 may receive PDCCHs and/or PDSCHs and/or send (e.g., transmit) PUCCH and/or PUSCHs on Cell 1 3745*a* with PCI1 and Cell 2 3745*b* with PCI 2 with different TCI states (e.g., one being associated with one of the $1^{st}$ SSBs, another being associated with one of the $2^{nd}$ SSBs, etc.).

A serving cell may be a cell (e.g., PCell, SCell, PSCell, etc.) on which the wireless device 3740 receives SSB, CSI-RS, PDCCH, and/or PDSCH and/or transmits PUCCH, PUSCH, SRS, etc. The serving cell may be identified by a serving cell index (e.g., ServCellIndex or SCellIndex configured in RRC message).

A non-serving (e.g., neighbor) cell may be a cell on which a wireless device 3740 does not receive PDCCH and/or PDSCH and/or does not send (e.g., transmit) PUCCH, PUSCH, SRS, etc. The non-serving cell may have a physical cell identifier (PCI) different from a PCI of a serving cell. The non-serving cell may not be identified by a serving cell index (e.g., ServCellIndex or SCellIndex). The wireless device 3740 may rely on a SSB of a non-serving cell for Tx/Rx beam and/or spatial domain filter determination (e.g., for PDCCH, PDSCH, PUCCH, PUSCH, CSI-RS, and/or SRS for a serving cell, etc.), for example, if a TCI state of the serving cell is associated with (e.g., in TCI-state IE of TS 38.331) a SSB of the non-serving cell. The base station 3730 may not send (e.g., transmit) RRC messages configuring resources of PDCCH, PDSCH, PUCCH, PUSCH, and/or SRS of a non-serving cell for the wireless device 3740.

In FIG. 37B, for a specific wireless device 3740, Cell 1 3745*a* may be a serving cell and may be associated with a first TRP (e.g., TRP 1 3735*a*). Cell 2 3745*b* may be a non-serving (e.g., neighbor) cell and may be associated with a second TRP (e.g., TRP2 3735*b*). A base station 3730 may send (e.g., transmit) to a wireless device 3740 one or more RRC messages comprising configuration parameters of Cell 1 3745*a*. The configuration parameters of Cell 1 3745*a* may indicate a plurality of additional PCI configurations (e.g., SSB-MTC-AddtionalPCI IE) for a plurality of non-serving (e.g., neighbor) cells for Cell 1 3745*a*, each additional PCI configuration corresponding to a non-serving (e.g., neighbor) cell may have a PCI different from the PCI value of the serving cell, and may comprise: an additional PCI index (AddtionalPCIIndex) identifying the additional PCI configuration, a PCI of the non-serving cell, a SSB periodicity indication, position indications of candidate SSBs in a SSB burst, a transmission power indication of SSBs, etc. The configuration parameter of Cell 1 3745*a* may further indicate a plurality of TCI states. Each TCI state of the plurality of TCI states may be associated with one or more TCI parameters comprising a TCI state identifier identifying the TCI state, one or more QCL information parameters comprising a SSB index identifying the SSB, and a QCL type indicator indicating a QCL type of a plurality of QCL types, for example, if the SSB is sent (e.g., transmitted) via Cell 1 3745*a* and/or in another serving cell. The TCI state may be further associated with an additional PCI index (AddtionalPCIIndex) indicating a non-serving (e.g., neighbor) cell configured in the SSB-MTC-AddtionalPCI IE, for example, if a SSB of a TCI state is sent (e.g., transmitted) via a wireless device 3740 cell. The wireless device 3740 may receive downlink signals and/or send (e.g., transmit) uplink signals based on an activated and/or indicated TCI state associated with a TRP. The difference between intra-cell multiple TRPs and inter-cell multiple TRPs is that a reference RS of a TCI state for a serving cell may come from and/or be sent (e.g., transmitted) via a non-serving (e.g., neighbor) cell for the latter cases. A SSB may be implemented as described herein in FIG. 34, FIG. 35 and/or FIG. 36.

In FIG. 37B, Cell 1 3745*a* may be a serving cell for a wireless device 3740. Cell 2 3745*b* may be a non-serving (e.g., neighbor) cell associated with Cell 1 3745*a* for the wireless device 3740. Cell 2 3745*b* may be a serving cell for a second wireless device 3740. Cell 1 3745*a* may be a non-serving (e.g., neighbor) cell for the second wireless device 3740. Different wireless devices may have different serving cells and/or non-serving (e.g., neighbor) cells.

A base station 3730 may use both TRPs for transmissions via Cell 1 3745*a* to a wireless device 3740. The base station 3730 may indicate (e.g., by DCI and/or MAC CE) a first TCI state associated with an SSB and/or CSI-RS sent (e.g., transmitted) via Cell 1 3745*a* and/or another serving cell for a first transmission (e.g., via PDCCH, PDSCH, PUSCH, PUCCH, and/or SRS resources of Cell 1 3745*a*) to the wireless device 3740. The base station 3730 may indicate (e.g., by identical DCI and/or MAC CE and/or another DCI and/or MAC CE) a second TCI state associated with a second SSB sent (e.g., transmitted) via Cell 2 3745*b* that may be a non-serving (e.g., neighbor) cell indicated by AddtionalPCHIndex in TCI configuration parameters for a second transmission (e.g., via PDCCH, PDSCH, PUSCH, PUCCH, and/or SRS resources of Cell 1 3745*a*) to the wireless device 3740. The second SSB sent (e.g., transmitted) via Cell 2 3745*b* may be different from the first SSB sent (e.g., transmitted) via Cell 1 3745*a*. Using two TCI states from two TRPs, one may be from a serving cell and/or another may be from a non-serving (e.g., neighbor) cell, may avoid executing a time-consuming handover (HO) from Cell 1 3745*a* to Cell 2 3745*b* and/or may improve coverage, for example, if the wireless device 3740 is moving at the overlap of Cell 1 3745*a* with Cell 2 3745*b*.

In FIG. 37A and FIG. 37B, a wireless device 3720 or 3740 may be provided two TCI states, each TCI state may correspond to a TRP of multiple TRPs. A TCI state may be referred to as a channel-specific TCI state, for example, if the TCI state is used for a specific channel (e.g., PPDSCH, PDCCH, PUCCH, PUSCH, etc.), where different channels may be associated with different channel-specific TCI states. A TCI state may be referred to as a unified TCI state, for example, if the TCI state is used for multiple channels (e.g., PPDSCH, PDCCH, PUCCH, PUSCH, etc.), where different channels may be associated with the same unified TCI state. The base station 3710 or 3730 may send (e.g., transmit) RRC messages indicating whether a TCI state is a unified TCI state for the wireless device 3720 or 3740.

As described in FIG. 37A and FIG. 37B, a base station may perform data and/or signaling transmissions based on intra-cell multiple TRPs (e.g., Intra-cell M-TRP or Intra-PCI M-TRP) for a wireless device, for example, if the wireless device is close to the center of a cell, has more data to deliver and/or requires high reliability (e.g., for URLLC service). The base station may perform data and/or signaling transmissions based on inter-cell multiple TRPs (e.g., Inter-cell M-TRP or Inter-PCI M-TRP) for a wireless device, for example, if the wireless device is at the edge of a cell and may be moving and/or located in the coverage of another cell that may or may not be a serving cell of the wireless device.

In exiting technologies, a base station may enable a power saving operation for a wireless device due to limited battery capacity of a wireless device, for example, based on active BWP management (e.g., as described herein in FIG. 22), SCell dormancy mechanism (e.g., as described herein in FIG. 28), wake-up and/or go-to-sleep indication (e.g., as described herein in FIG. 31A and/or FIG. 31B), SSSG switching on an active BWP (e.g., as described herein in FIG. 32A and/FIG. 32B), and/or PDCCH skipping (e.g., as described herein in FIG. 33).

A base station that may be indicating a power saving operation for a wireless device (e.g., as described herein in FIG. 22, FIG. 28, FIG. 31A, FIG. 31B, FIG. 32A, FIG. 32B and/or FIG. 33), may not be able to save energy from the viewpoint of the base station, for example, if the base station is required to send (e.g., transmit) some always-on downlink signals periodically (e.g., SSB, MIB, SIB1, SIB2, periodic CSI-RS, etc.) over some time period even, and if there is no active wireless device sending (e.g., transmitting) to and/or receiving from the base station. The base station may be required to send (e.g., transmit) some always-on downlink signals periodically (e.g., SSB, MIB, SIB1, SIB2, periodic CSI-RS, etc.), for example, if the base station transitions a cell into a dormant state by switching an active BWP to a dormant BWP of the cell (e.g., as described herein in FIG. 28).

A base station may send (e.g., transmit) a RRC message (e.g., SIB1) indicating a longer periodicity for the always-on downlink signal transmission if the base station needs to reduce periodicity of the always-on downlink signal transmission. A base station, before determining to power off (e.g., both RF modules and base band units (BBUs)) for energy saving, may send (e.g., transmit) RRC reconfiguration messages to each wireless device in a source cell to indicate a handover to a neighbor cell. A handover (HO) procedure may be implemented based on example embodiments of FIG. 38.

Figure 38:
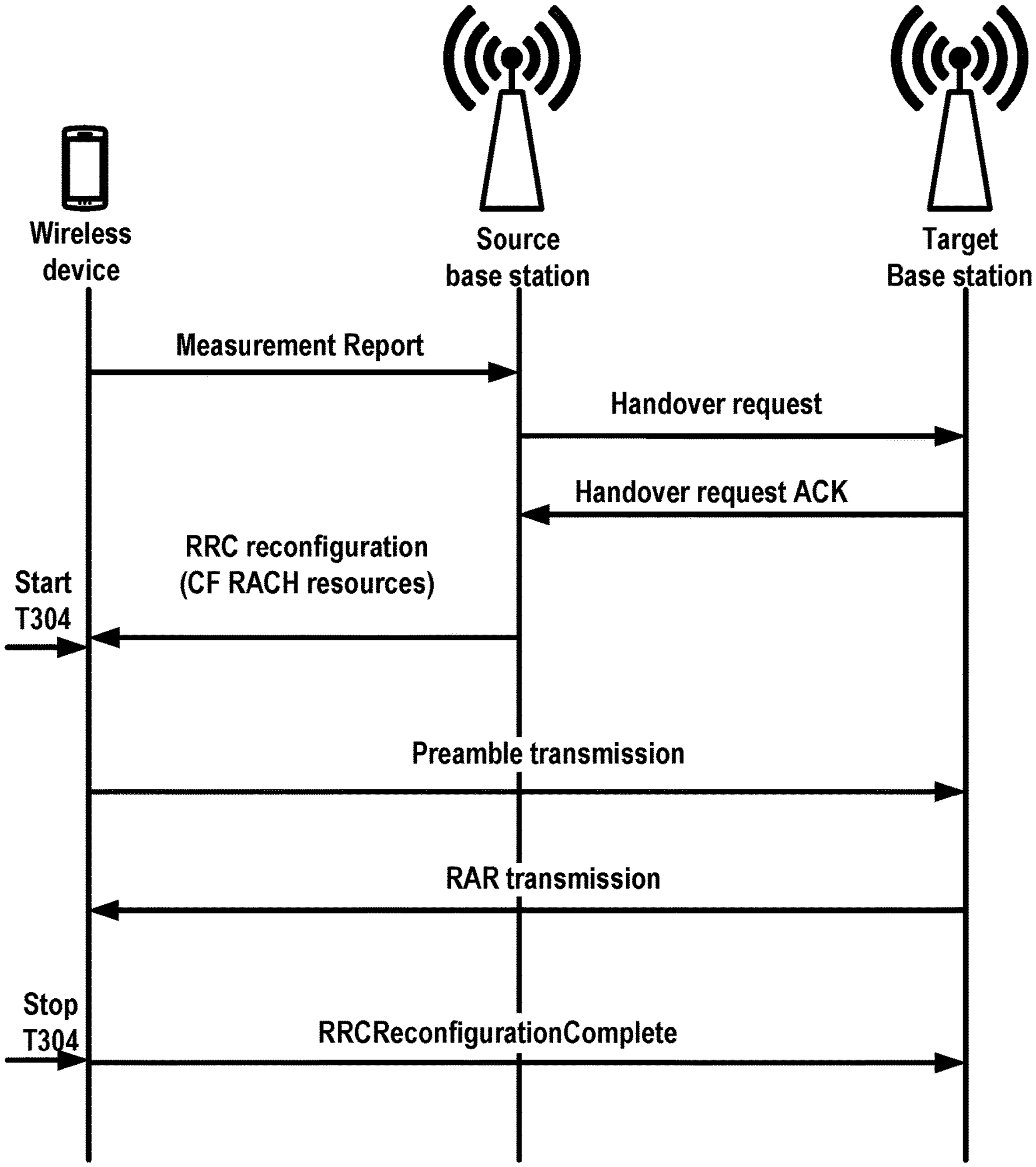
FIG. 38 shows an example of layer 3 based normal handover (HO) procedure.

FIG. 38 shows an example of executing HO procedure from a source base station to a target base station for a wireless device. For network-controlled mobility in RRC_CONNECTED, the PCell may be changed using an RRC Connection Reconfiguration message (e.g., RRCReconfiguration) including reconfigurationWithSync (in NR specifications) or mobilityControlInfo in LTE specifications (handover). The SCell(s) may be changed using the RRC Connection Reconfiguration message either with or without the reconfigurationWithSync or mobilityControlInfo. The network may trigger the HO procedure e.g., based on radio conditions, load, QoS, UE category, and/or the like. The RRC connection Reconfiguration message may be implemented based on example embodiments which will be described later in FIG. 39.

As shown in FIG. 38, the network may configure the wireless device to perform measurement reporting (possibly including the configuration of measurement gaps). The measurement reporting is a layer 3 reporting, different from layer 1 CSI reporting. The wireless device may send (e.g., transmit) one or more measurement reports to the source base station and/or source PCell). the network may initiate HO blindly, for example without having received measurement reports from the wireless device. Before sending the HO message to the wireless device, the source base station may prepare one or more target cells. The source base station may select a target PCell.

As shown in FIG. 38, based on the one or more measurement reports from the wireless device, the source base station may provide the target base station with a list of best cells on each frequency for which measurement information is available, for example, in order of decreasing RSRP. The source base station may also include available measurement information for the cells provided in the list. The target base station may decide which cells are configured for use after HO, which may include cells other than the ones indicated by the source base station. as shown in FIG. 38, the source base station may send (e.g., transmit) a HO request to the target base station. The target base station may response with a HO message. in the HO message, the target base station may indicate access stratum configuration to be used in the target cell(s) for the wireless device.

A source base station may transparently (for example, does not alter values/content) forward the HO message and/or information received from the target base station to the wireless device. In the HO message, RACH resource configuration may be configured for the wireless device to access a cell in the target base station. When appropriate, the source base station may initiate data forwarding for (a subset of) the dedicated radio bearers.

As shown in FIG. 38, after receiving the HO message, the wireless device may start a HO timer (e.g., T304) with an initial timer value. The HO timer may be configured in the HO message. Based on the HO message, the wireless device may apply the RRC parameters of a target PCell and/or a cell group (MCG/SCG) associated with the target PCell of the target base station and perform downlink synchronization to the target base station. After or in response to performing downlink synchronization to the target base station, the wireless device may initiate a random access (e.g., contention-free, or contention-based) procedure attempting to access the target base station at the available RACH occasion according to a RACH resource selection, where the available RACH occasion may be configured in the RACH resource configuration. When allocating a dedicated preamble for the random access in the target base station, RAN may ensure the preamble is available from the first RACH occasion the wireless device may use. A wireless device may release RRC configuration parameters of the source PCell and an MCG/SCG associated with the source PCell.

An HO triggered by receiving a RRC reconfiguration message (e.g., RRCReconfiguration) comprising the HO command/message (e.g., by including reconfigurationWithSync (in NR specifications) or mobilityControlInfo in LTE specifications (handover)) is referred to as a normal HO, an unconditional HO, which is contrast with a conditional HO (CHO) which will be described later in FIG. 40.

As shown in FIG. 38, a wireless device may send (e.g., transmit) a preamble to the target base station via a RACH resource. The RACH resource may be selected from a plurality of RACH resources (e.g., configured in rach-ConfigDedicated IE as shown in FIG. 39) based on SSBs and/or CSI-RSs measurements of the target base station. The wireless device may select a (best) SSB and/or CSI-RS of the configured SSBs and/or CSI-RSs of the target base station. The wireless device then determines a RACH occasion (e.g., time domain resources, etc.) associated with the selected SSB and/or CSI-RS and determines the preamble associated with the selected SSB and/or CSI-RS.

A target base station may receive the preamble sent (e.g., transmitted) from the wireless device. The target base station may send (e.g., transmit) a random access response (RAR) to the wireless device, where the RAR includes the preamble sent (e.g., transmitted) by the wireless device. In response to receiving the RAR comprising the preamble, the wireless device may complete the random access procedure. In response to completing the random access procedure, the wireless device may stop the HO timer (T304). The wireless device may send (e.g., transmit) an RRC reconfiguration complete message to the target base station, after completing the random access procedure, or before completing the random access procedure. The wireless device, after completing the random access procedure towards the target base station, may apply first parts of CQI reporting configuration, SR configuration and SRS configuration that do not require the wireless device to know a system frame number (SFN) of the target base station. The wireless device, after completing the random-access procedure towards the target PCell, may apply second parts of measurement and radio resource configuration that require the wireless device to know the SFN of the target base station (e.g., measurement gaps, periodic CQI reporting, SR configuration, SRS configuration), upon acquiring the SFN of the target base station.

Based on a HO procedure (e.g., as shown in FIG. 38), for network energy saving purpose, a base station may instruct each wireless device in a source cell to perform a 4-step or 2-step RACH-based HO to a neighbor cell. After the wireless devices complete the HO procedure to neighbor cells, the base station may turn off (RF parts and BBUs, etc.) for energy saving.

FIG. 39 shows an example embodiment of a RRC message for HO. In FIG. 39, a base station may send (e.g., transmit), and/or a wireless device may receive, a RRC reconfiguration message (e.g., RRCReconfiguration-IEs) that may indicate an RRC connection modification. The RRC message may convey information for measurement configuration, mobility control, radio resource configuration (e.g., RBs, MAC main configuration, physical channel configuration, etc.) and AS security configuration. The RRC reconfiguration message may comprise a configuration of a master cell group (masterCellGroup). The master cell group may be associated with a SpCell (SpCellConfig). The wireless device may determine that the SpCell may be a target PCell for the HO, for example, if the SpCellConfig comprises a reconfiguration with Sync (reconfigurationWithSync). The reconfiguration with sync (reconfigurationWithSync) may comprise cell common parameters (spCellConfigCommon) of the target PCell, a RNTI (newUE-Identity) that may identify the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc.

Executing a HO triggered by receiving a RRC reconfiguration message may comprise a reconfigurationWithSync IE and/or may introduce HO latency (e.g., a too-late HO), for example, if a wireless device is moving in a network deployed with multiple small cells (e.g., with hundreds of meters of cell coverage per cell). An improved HO mechanism, based on measurement event triggering, is proposed to reduce the HO latency as shown in FIG. 40.

Figure 40:
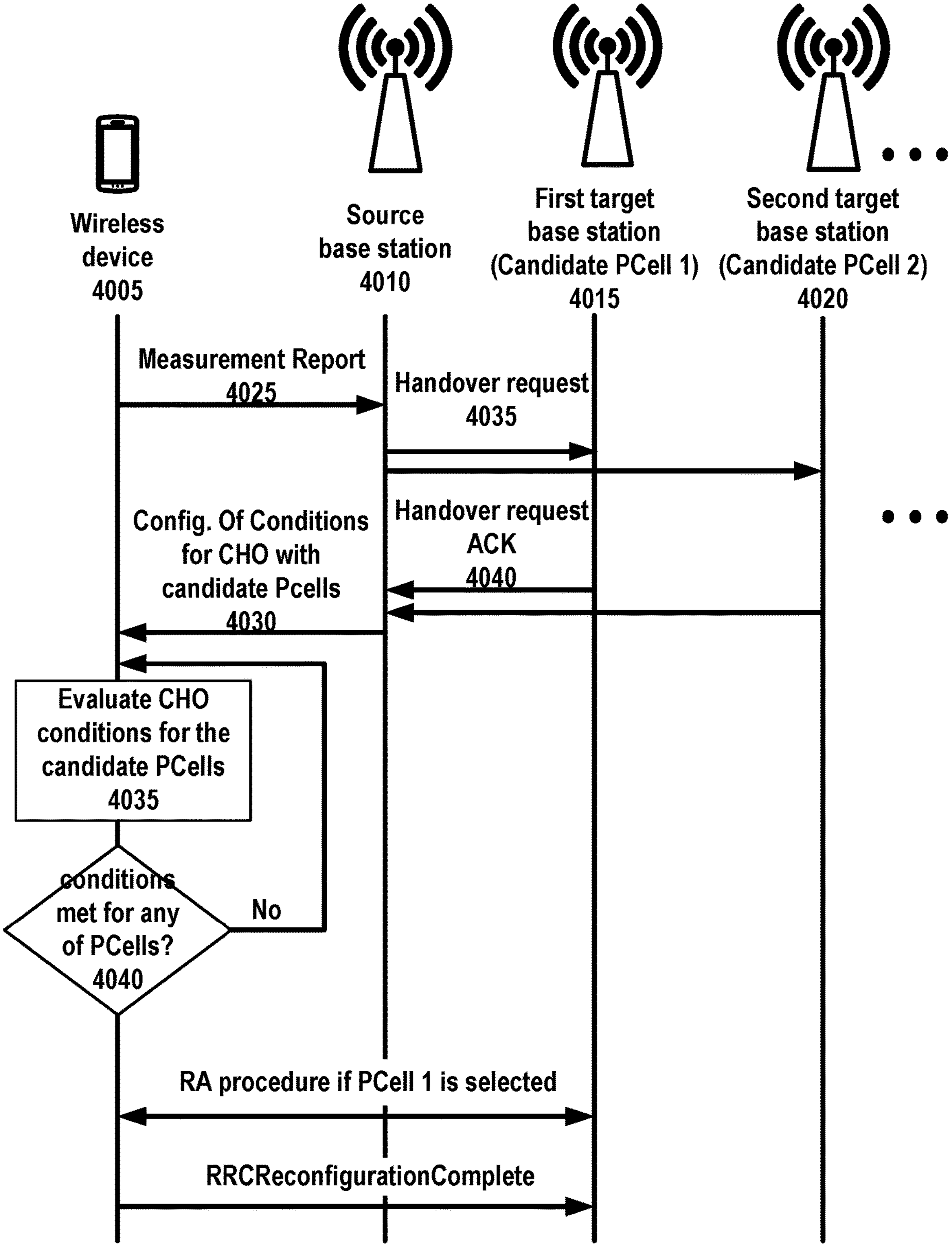
FIG. 40 shows an example of layer 3 based conditional HO (CHO) procedure.

FIG. 40 shows an example embodiment of a conditional handover (CHO) procedure. A network (e.g., a base station, a source base station 4010, etc.) may configure a wireless device 4005 to perform measurement reporting, and may include the configuration of measurement gaps, for a plurality of neighbor cells (e.g., cells from a candidate target base station 1 4015, a candidate target base station 2 4020, etc.). The measurement reporting may be a layer 3 reporting, and may be different from layer 1 CSI reporting. The wireless device 4005 may send (e.g., transmit) one or more measurement reports 4025 to the source base station 4010 and/or source PCell.

A source base station 4010 may provide a target base station (e.g., a first target base station 4015, a second target base station 4020, etc.) with a list of best cells for each frequency for which measurement information may be available, for example, based on one or more measurement reports 4025 from a wireless device 4005 and in order of decreasing RSRP. The source base station 4010 may also include available measurement information for the cells provided in the list. The target base station (e.g., a first target base station 4015, a second target base station 4020, etc.) may determine the cells that may be configured for use after the CHO. The cells that may be configured for use after the CHO may include cells other than the ones indicated by the source base station 4010. The source base station 4010 may send (e.g., transmit) a HO request 4035 to the target base station. The target base station may respond with a HO message 4040. The target base station may indicate, in the HO message 4040, access stratum configuration (e.g., RRC configurations of the target cells) that may be used in the target cell(s) for the wireless device 4005.

A source base station 4010 may transparently (e.g., the source base station 4010 does not alter values and/or content) forward the handover (e.g., contained in RRC reconfiguration messages of the target base station) message and/or information received from the target base station (e.g., a first target base station 4015, a second target base station 4020, etc.) to the wireless device.

A source base station 4010 may configure a CHO procedure that may be different than a normal HO procedure (e.g., as described herein in FIG. 38 and/or FIG. 39), for example, by sending a conditional reconfiguration message 4030 (e.g., conditionalReconfiguration IE in a RRC reconfiguration message, as described herein in FIG. 41). The conditional reconfiguration message 4030 may comprise a list of candidate target PCells. Each candidate target PCell may be associated with dedicated random access channel (RACH)

resources for the RA procedure, for example, if a CHO is executed to the candidate target PCell, a CHO execution condition and/or RRC reconfiguration condition for each of the candidate target PCells, etc. A CHO execution condition may comprise a measurement event A3, for example, if a candidate target PCell becomes an amount of offset better than the current PCell (e.g., the PCell of the source base station 4010. A CHO execution condition may comprise a measurement event A4, for example, if a candidate target PCell becomes better than an absolute threshold configured in the RRC reconfiguration message, A CHO execution condition may comprise a measurement event A5, for example, if the current PCell becomes worse than a first absolute threshold and a candidate target PCell becomes better than a second absolute threshold, etc.

A wireless device 4005 according to received RRC reconfiguration messages 4030 comprising parameter of a CHO procedure, may evaluate the RRC reconfiguration conditions for a list of candidate target PCells and/or the current (e.g., source) PCell. The wireless device 4005 may measure RSRP and/or RSRQ of SSBs and/or CSI-RSs of each candidate target PCell of the list of candidate target PCells. The wireless device 4005 may not execute HO to the target PCell, for example, based on receiving the RRC reconfiguration messages 4030 comprising the parameters of the CHO procedure, for example, contrary to the HO procedure described herein in FIG. 38. The wireless device 4005 may execute the HO to a target PCell for the CHO, for example, only if the RRC reconfiguration condition(s) 4040 of the target PCell are met and/or satisfied. Alternatively, the wireless device may keep evaluating the reconfiguration conditions for the list of the candidate target PCells, e.g., until an expiry of a HO timer, and/or receiving a RRC reconfiguration indicating an abort of the CHO procedure.

A wireless device 4005 may execute a CHO procedure towards a first candidate target PCell, for example, based on a reconfiguration condition of a first candidate target PCell (e.g., PCell 1) being met and/or satisfied. The wireless device 4005 may select one of multiple candidate target PCells, for example, if the multiple candidate target PCells have reconfiguration conditions satisfied and/or met.

Executing a CHO procedure towards a first candidate target PCell may be identical and/or similar to executing a HO procedure as described herein in FIG. 38. The wireless device 4005 may release RRC configuration parameters of the source PCell and/or a master cell group (MCG) associated with the source PCell, apply the RRC configuration parameters of the PCell 1, reset media access control (MAC), perform cell group configuration for the received MCG comprised in the RRC reconfiguration message of the PCell 1, and/or perform RA procedure to the PCell 1, etc., for example, based on executing the CHO procedure, A MCG of a RRC reconfiguration message of a PCell 1 may be associated with a SpCell (SpCellConfig) on the target base station 1 4015 (e.g., first target base station). A wireless device 4005 may determine that the SpCell may be a target PCell (PCell 1) for a HO, for example, if the sPCellConfig comprises a reconfiguration with Sync (reconfigurationWithSync). A reconfiguration with sync (reconfigurationWithSync) may comprise cell common parameters (spCellConfigCommon) of the target PCell, a RNTI (newUE-Identity) that may identify the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc. The wireless device 4005 may perform a cell group configuration for a received MCG comprised in the RRC reconfiguration message of the PCell 1 on the target base station 1 4015 (e.g., first target base station) as described herein in FIG. 38.

FIG. 41 shows an example of a RRC message for CHO. In FIG. 41, abase station may send (e.g., transmit), and/or a wireless device may receive, a RRC reconfiguration message (e.g., RRCReconfiguration-V1610-IEs) that may indicate an RRC connection modification. The RRC reconfiguration message may be comprised in a parent RRC reconfiguration message (e.g., RRCReconfiguration-IEs) as described herein in in FIG. 39. The parent RRC reconfiguration message may comprise a L3 beam and/or cell measurement configuration (e.g., measConfig IE).

A RRC reconfiguration message (e.g., RRCReconfiguration-V1610-IEs) may comprise a conditional reconfiguration IE (conditionalReconfiguration IE). The conditional reconfiguration IE may comprise a list of conditional reconfigurations (condReconfigToAddModList). Each conditional reconfiguration may correspond to a respective candidate target cell (e.g., PCell) of a list of candidate target cells. For each conditional reconfiguration of the list of conditional reconfigurations, a base station may indicate one or more measurement events (condExecutionCond) for triggering a CHO on the candidate target PCell, a RRC reconfiguration message (condRRCReconfig) of a candidate target cell (e.g., PCell) which may be received by the source base station from the target base station via an X2 and/or Xn interface. The RRC reconfiguration message of the candidate target cell may be implemented as described herein in FIG. 39. The RRC reconfiguration message may comprise a configuration of a MCG (masterCellGroup) for a target base station. The MCG may be associated with a SpCell (SpCellConfig). A SpCell may be a target PCell for executing the CHO, for example, if the sPCellConfig comprises a reconfiguration with Sync (reconfigurationWithSync). The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. a dedicated RACH resource may comprise one or more RACH occasions, one or more SSBs, one or more CSI-RSs, one or more RA preamble indexes, etc.

A measurement event (condExecutionCond) for triggering a CHO on a candidate target PCell may be an execution condition that needs to be fulfilled, at the wireless device, to trigger an execution of a conditional reconfiguration for CHO. An indication of the measurement event may point to a measurement ID (MeasId) that may identify a measurement configuration of a plurality of measurement configurations (e.g., comprised in measConfig IE) configured by the source base station. The measurement configuration may be associated with a measurement event and/or a conditional event of a plurality of measurements. A conditional event may comprise a conditional event A3, a conditional event A4, and/or a conditional event A5, etc. A conditional event A3 may be that a candidate target PCell may become better than a current PCell (e.g., the PCell of the source base station) by an amount of an offset (e.g., a threshold). A conditional event A4 may be that a candidate target PCell may become better than an absolute threshold configured in the RRC reconfiguration message. A conditional event A5 may be that the current PCell may become worse than a first absolute threshold and a candidate target PCell may become better than a second absolute threshold, etc.

Executing CHO by a wireless device's determination based on evaluating reconfiguration conditions (e.g., long-term and/or layer 3 beam and/or cell measurements against one or more configured thresholds) on a plurality of candidate target cells may cause unbalanced load on cells, and/or lead to CHO failure, for example, if the target cell changes its configuration (e.g., for network energy saving) during the CHO condition evaluation, etc. An improved handover may be based on layer 1 and/or layer 2 (e.g., layer 1/2) signaling and/or triggering (e.g., as described herein in FIG. 42). A layer 1 signaling may comprise DCI sent (e.g., transmitted) via a PDCCH. A layer 2 signaling may comprise a MAC CE scheduled by DCI. Layer 1/2 signaling may be different from layer 3 signaling, for HO/CHO, that may comprise a RRC reconfiguration message.

Figure 42:
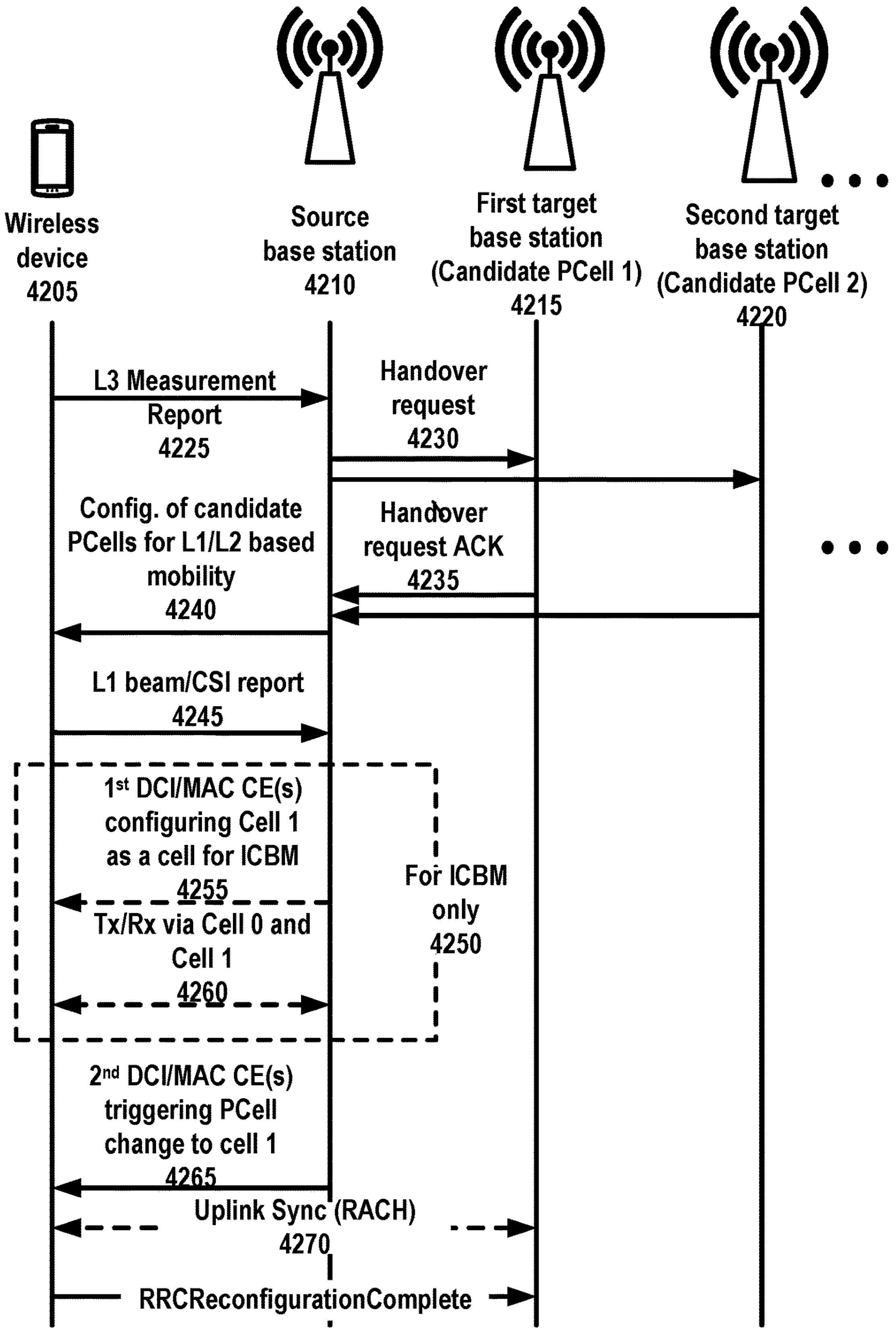
FIG. 42 shows an example of layer 1 and/or layer 2 (layer 1/2) signaling based HO procedure.

FIG. 42 shows an example embodiment of layer 1/2 triggered HO procedure. A network (e.g., a base station, a source base station 4210, etc.) may configure a wireless device 4205 to perform measurement reporting that may include a configuration of measurement gaps for a plurality of neighbor cells (e.g., cells from a candidate target base station 1 4215, a candidate target base station 2 4220, etc.). The measurement reporting may be a layer 3 reporting, rather than layer 1 CSI reporting. The wireless device 4205 may send (e.g., transmit) one or more measurement reports 4225 to the source base station 4210 and/or source PCell, cell 0 in FIG. 42.

A source base station 4210 may provide a target base station (e.g., a first target base station 4215, a second target base station 4220, etc.) with a list of best cells on each frequency for which measurement information is available, for example, based on the one or more measurement reports from the wireless device 4205 and may be in an order of decreasing RSRP. The source base station 4210 may also include available measurement information for the cells provided in the list. The target base station may determine cells that may be configured for use (e.g., as a target PCell and/or one or more SCells) that may include cells other than the ones indicated by the source base station 4210 for example, after a HO. The source base station 4210 may send (e.g., transmit) a HO request 4230 to the target base station. The target base station may respond with a HO message 4235. The target base station, in the HO message, may indicate access stratum configuration (e.g., RRC configurations of the target cells) that may be used in the target cell(s) for the wireless device 4205.

A source base station 4210 may transparently (e.g., the source base station 4210 does not alter values and/or content) forward the HO (e.g., contained in RRC reconfiguration messages of the target base station, cell group configuration IE of the target base station, and/or SpCell configuration IE of a target PCell/SCells of the target base station) message and/or information received from the target base station to the wireless device 4205.

A source base station 4210 may configure a layer 1/2 signaling based HO (PCell changing and/or switching, mobility, etc.) procedure different from a normal HO procedure (e.g., as shown in FIG. 38 and/or FIG. 39) and/or a CHO procedure (e.g., as described herein in FIG. 40 and/or FIG. 41), by comprising a layer 1/2 candidate PCell configuration message 4240 (e.g., a newly defined candidates-L1L2-Config IE) that may be in a RRC reconfiguration message of the source base station 4210. The layer 1/2 candidate PCell configuration message 4240 may comprise a list of candidate target PCells, each candidate target PCell may be associated with dedicated RACH resources for a RA procedure, for example, if a layer 1/2 signaling based HO is trigged by a layer 1/2 signaling and executed to the candidate target PCell, etc. There may be multiple options for parameter configurations of a candidate target PCell.

A first option for a parameter configuration may comprise, for each candidate target PCell, a RRC reconfiguration message of a source base station 4210 may comprise a capsuled RRC reconfiguration message (e.g., RRCReconfiguration), of a candidate target base station, received by the source base station 4210 from a candidate target base station via X2 and/or Xn interface. The capsuled RRC reconfiguration message, of the candidate target base station, may reuse the same signaling structure of the RRC reconfiguration message of the source base station 4210 (e.g., as described herein in FIG. 39).

A second option for a parameter configuration may comprise, for each candidate target PCell, a RRC reconfiguration message of a source base station 4210 may comprise a capsuled cell group configuration message (e.g., CellGroupConfig), of a candidate target base station, received by the source base station 4210 from a candidate target base station via X2 and/or Xn interface. The capsuled cell group configuration message, of the candidate target base station, may reuse the same signaling structure of the cell group configuration message of the source base station 4210 (e.g., as described herein in FIG. 39). The second option may reduce signaling overhead of the parameter configuration of a candidate target PCell compared with the first option.

A third option for the parameter configuration may comprise, for each candidate target PCell, a RRC reconfiguration message of the source base station 4210 may comprise a capsuled SpCell configuration message (e.g., SpCellConfig), of a candidate target base station, received by the source base station 4210 from a candidate target base station via X2 and/or Xn interface. The capsuled SpCell configuration message, of the candidate target base station, may reuse the same signaling structure of the SpCell configuration message of the source base station 4210, as shown in FIG. 39. The third option may reduce signaling overhead of the parameter configuration of a candidate target PCell compared with the second option.

A source base station 4210 may indicate cell common and/or wireless device 4205 specific parameters (e.g., SSBs and/or CSI-RSs, BWPs, RACH resources, PDCCH, PDSCH, PUCCH, and/or PUSCH resources etc.), for example, for each candidate target PCell.

A wireless device 4205, according to received RRC reconfiguration messages comprising parameters of a layer 1/2 signaling based HO procedure, may perform layer 1/2 measurement report (e.g., CSI and/or beam) for a list of candidate target PCells and/or a current PCell. The layer 1/2 measurement report may comprise layer 1 RSRP, layer 1 RSRQ, PMI, RI, layer 1 SINR, CQI, etc. The layer 1/2 measurement report may be sent (e.g., transmitted) 4245 with a periodicity configured by the source base station 4210. The layer 1/2 measurement report may be triggered, for example, if a measurement of the CSI and/or beam of a candidate target PCell is greater than a threshold, or an offset amount greater than the current PCell, etc.

A base station may perform an inter-cell beam management (ICBM) procedure before transmitting a layer 1/2 signaling triggering the HO procedure comprising switching PCell from the source base station 4210 to a target base station (e.g., a first target base station 4215, a second target base station 4220, etc.). The ICBM procedure may allow the base station and a wireless device 4205 to use resources (e.g., time, frequency, spatial, etc.) of the target base station and/or a PCell and/or SCell of the target base station without executing HO procedure to the target base station, therefore reducing frequently executing the HO procedure. The ICBM procedure may allow the base station and the wireless device 4205 to synchronize time, frequency, and/or beam to a target PCell of the target base station before executing the HO, which may reduce HO latency. The ICBM may be implemented as described herein in FIG. 43.

Based on an ICBM procedure being configured 4250, a source base station 4210 may send (e.g., transmit) 4255 to the wireless device 4205 first DCI and/or MAC CE configuring and/or indicating a first candidate target cell 4215 (e.g., PCell 1) of the candidate target cells (e.g., PCells and/or SCells) as a non-serving (e.g., neighbor) cell, in addition to the current PCell (e.g., Cell 0), for the wireless device 4205. A base station may select the first candidate target cell 4215 from the candidate target cells, based on a layer 1/2 measurement report from the wireless device 4205.

First DCI and/or MAC CE (e.g., activating TCI states) may indicate that a reference RS (e.g., SSB and/or CSI-RS) associated with a first TCI state may be from a first candidate target cell 4215 (e.g., PCell 1) (e.g., by associating the reference RS with an additional PCI different from a PCI of the Cell 0), in addition to a reference RS associated with a second TCI state being from the current PCell 4210 (e.g., Cell 0). Association between a reference signal and a TCI state may be implemented as described herein in FIG. 37B. Activating, by DCI and/or MAC CE, a TCI state with a RS of a neighbor (e.g., non-serving) cell as a reference RS, may allow the base station to use a beam of the neighbor cell to send (e.g., transmit) downlink signals and/or channels or to receive uplink signals and/or channels, and/or use a beam of the current cell for the transmissions and/or receptions, without performing HO to the neighbor cell for the transmissions and/or receptions.

A wireless device 4205, based on receiving first DCI and/or MAC CE, may apply a first TCI state and/or a second TCI state for downlink reception and/or uplink transmission 4260. Applying the first TCI state and/or the second TCI state for downlink reception may comprise: receiving (e.g., from Cell 1) PDCCH, PDSCH, and/or CSI-RS with a reception beam and/or filter that may be identical as that for receiving a reference signal, sent (e.g., transmitted) from Cell 1, according to and/or associated with the first TCI state, and/or receiving (e.g., from cell 0) PDCCH, PDSCH, and/or CSI-RS with a reception beam and/or filter that may be identical as that for receiving the reference signal, sent (e.g., transmitted) from Cell 0, according to and/or associated with the second TCI state.

A first TCI state and/or a second TCI state may be applied for uplink transmission and may comprise: transmitting (e.g., via Cell 1) PUCCH, PUSCH, and/or SRS with a transmission beam and/or filter that may be identical as that for receiving a reference signal, sent (e.g., transmitted) from Cell 1, according to and/or associated with the first TCI state, and/or transmitting (via cell 0) PUCCH, PUSCH, and/or SRS with a transmission beam and/or filter same as that for receiving the reference signal, sent (e.g., transmitted) from Cell 0, according to and/or associated with the second TCI state.

A base station may skip performing the ICBM procedure before transmitting the layer 1/2 signaling triggering the HO procedure. The base station may skip performing the ICBM procedure, for example, if beamforming is not used in the target PCell, a wireless device 4205 does not support ICBM, and/or the base station does not support ICBM.

A source base station 4210 may determine to handover a wireless device 4205 from the source base station 4210 (e.g., Cell 0) to a target base station 4215 (e.g., Cell 1). The source base station 4210 may determine the handover based on a load and/or traffic condition, a CSI and/or beam report of the target base station, a location and/or trajectory of the wireless device 4205, a network energy saving strategy (e.g., the source base station 4210 determines to turn off the Cell 0 and/or one or more SCells for power saving), etc.

A source base station 4210 may send (e.g., transmit) 4265 second DCI and/or MAC CE indicating a PCell changing from the current PCell (e.g., Cell 0 4210) to a new cell. A new cell may be one of the neighbor (e.g., non-serving) cells used in a ICBM procedure (e.g., as indicated by first DCI and/or MAC CE). The new cell may be Cell 1 4215 in the example of FIG. 42. When the ICBM procedure is supported and/or configured, the wireless device 4205, before executing HO procedure indicated by the source base station 4210, may have already synchronized with a target base station regarding a beam that should be used for sending (e.g., transmission) and/or reception via the target base station; this differs from layer 3 signaling based CHO (e.g., as described herein in FIG. 38 and/or FIG. 41), where a wireless device 4205 needs to synchronize to the target base station upon executing the PUCCH, PUSCH, and/or SRS.

A new cell may be one of a plurality of neighbor (e.g., non-serving) cells comprised in L1 beam and/or CSI report (e.g., with a best measurement report, with a distance closest to the wireless device, etc.), for example, if an ICBM procedure is not configured, supported, and/or indicated. A wireless device 4205 may change a PCell from Cell 0 4210 to Cell 1 4215 based on receiving second DCI and/or MAC CE. The wireless device 4205 may apply the stored and/or received RRC parameters (e.g., as comprised in RRCReconfiguration, CellGroupConfig, and/or SpCellConfig IE) of the target PCell (e.g., Cell 1 4215) as the current PCell.

A wireless device 4205 may skip downlink (e.g., time, frequency, and/or beam) synchronization (e.g., monitoring MIB/SSB/SIBs and/or selecting a SSB as a reference for downlink reception and/or uplink transmission), for example, if the ICBM is configured, supported, and/or indicated before receiving the second/2nd DCI and/or MAC CE, and if the wireless device 4205 has already synchronized with the target PCell based on the ICBM procedure.

A wireless device 4205 may skip performing RA procedure towards a target PCell before sending (e.g., transmitting) to and/or receiving from the target PCell, for example, if the target PCell is close to the source PCell, the uplink TA is identical or similar to the source PCell and/or the target PCell, and/or the dedicated RACH resource is not configured in the RRC reconfiguration message of the target PCell.

A wireless device 4205 may perform downlink synchronization (e.g., SSB, PBCH, SIBs monitoring, etc.) and/or uplink synchronization 4270 (e.g., RA procedure) for the layer 1/2 signaling based HO (e.g., if ICBM is not configured, indicated, and/or supported) as may be done for layer 3 signaling based on PUCCH, PUSCH, and/or SRS (e.g., as described herein in FIG. 38, FIG. 39, FIG. 40 and/or FIG. 41).

Figure 43:
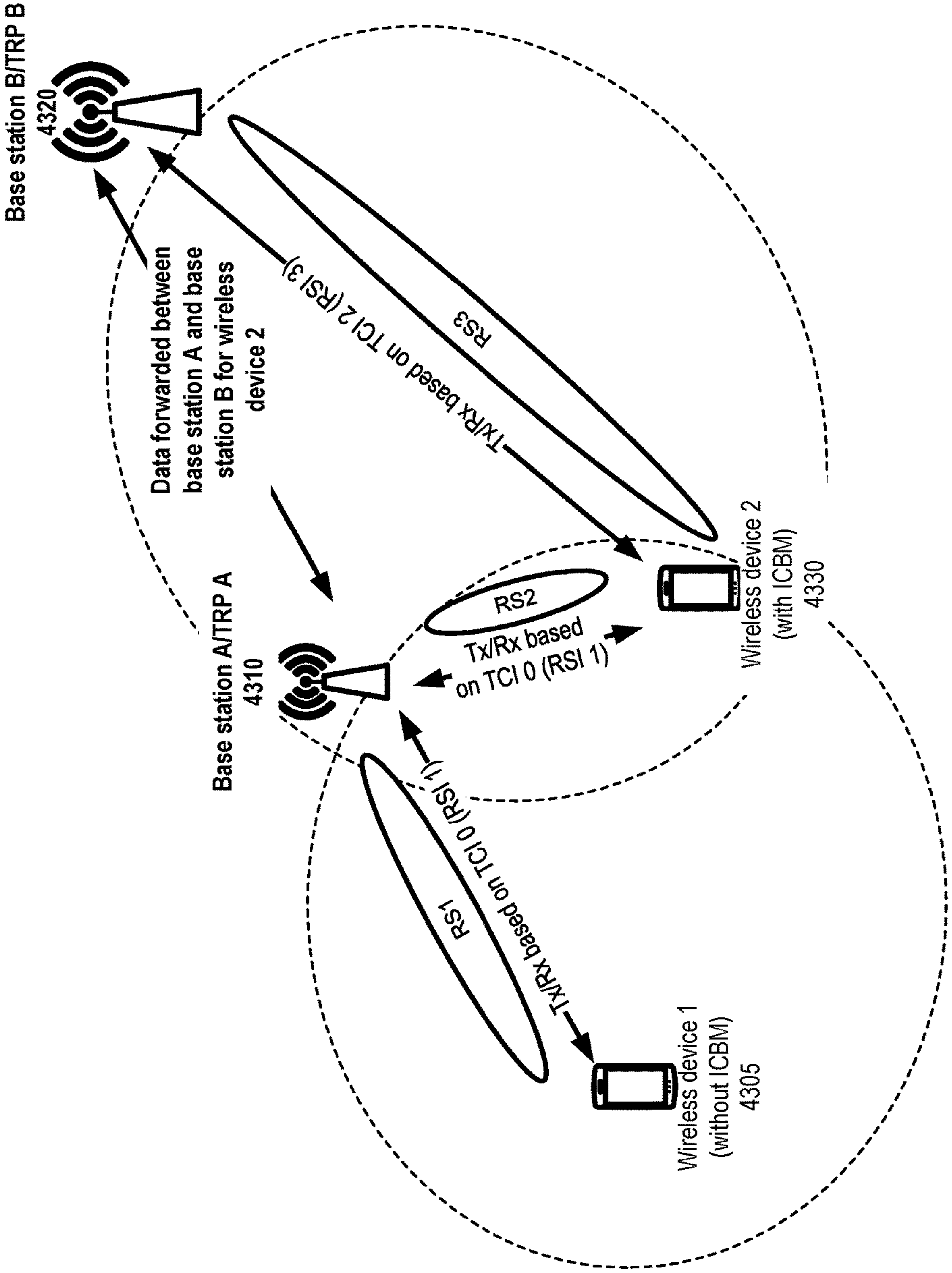
FIG. 43 shows an example of inter-cell beam management (ICBM) procedure for layer 1/2 signaling based HO procedure.

FIG. 43 shows an example of an ICBM procedure. A first wireless device 4305 (e.g., wireless device1) may be in the coverage of Cell 0 deployed under a first node 4310 (e.g., base station A and/or TRP A). The first wireless device 4305 (e.g., wireless device1) may not be in the coverage of Cell 1 deployed under a second node 4320 (e.g., base station B or TRP B). Cell 0 and/or Cell 1 may have different PCIs. The first wireless device 4305 (e.g., wireless device1) may use the RSs (e.g., RS1) sent (e.g., transmitted) from Cell 0 as a reference RS for a TCI state that may be used for beam and/or spatial domain filter determination for downlink reception and/or uplink transmission (e.g., Tx/Rx based TCI state 0 associated with RS1). The first wireless device 4305 (e.g., wireless device1) may not use RSs (e.g., RS2 and/or RS3) sent (e.g., transmitted) from Cell 1 as the reference RS for the TCI state. The first wireless device 4305 (e.g., wireless device1) may be configured with a TCI state, that may be associated with a RS of a serving cell that may have a first PCI and/or may not be associated with a RS of another cell with a second PCI different from the first PCI, and/or may be referred to as a wireless device without ICBM in this specification.

A second wireless device 4330 (e.g., wireless device2) may be in the coverage of Cell 0 deployed under a first node 4310 (e.g., base station A or TRP A). The second wireless device 4330 (e.g., wireless device2) may also be in the coverage of Cell 1 deployed under a second node 4320 (e.g., base station B or TRP B). Cell 0 and Cell 1 may have different PCIs. The second wireless device 4330 (e.g., wireless device2) may use the RSs (e.g., RS2) sent (e.g., transmitted) from Cell 0 as a reference RS for a first TCI state, that may be used for beam and/or spatial domain filter determination for downlink reception and/or uplink transmission via Cell 0 (e.g., Tx/Rx based TCI state 1 associated with RS2). The second wireless device 4330 (e.g., wireless device2) may also use RSs (e.g., RS3) sent (e.g., transmitted) from Cell 1 as the reference RS for a second TCI state that may be used for beam and/or spatial domain filter determination for downlink reception and/or uplink transmission via Cell 1 (e.g., Tx/Rx based TCI state 2 associated with RS3). The second wireless device 4330 (e.g., wireless device2) may be configured with a first TCI state, that may be associated with a RS of a serving cell with a first PCI and that may also be configured with a second TCI state associated with a RS of another cell with a second PCI different from the first PCI, and/or may be referred to as a wireless device with ICBM in this specification.

A base station may forward the uplink signals and/or channels to base station A and/or TRPA 4310 for processing, for example, if base station B and/or TRP B 4320 receives uplink signals and/or channels with a second TCI state. Base station A and/or TRP A 4310 may forward downlink signals and/or channels to base station B or TRP B 4320 to send (e.g., transmit) with the second TCI state to the wireless device.

In an ICBM procedure, Cell 1 may have a second PCI different from a first PCI of Cell 0 and may be considered and/or configured as a part (e.g., a second TRP with a second PCI different from a first PCI of a first TRP) of cell 0 for wireless device2, for example, as described herein in FIG. 37B. PDCCH, PDSCH, PUCCH, and/or PUSCH resources may be shared between Cell 1 and Cell 0 that may be transparent to a second wireless device 4330 (e.g., wireless device2). However, SSBs and/or CSI-RSs of Cell 0 may not share identical resources with SSBs and/or CSI-RSs of Cell 1. SSBs and/or CSI-RSs of Cell 0 may have configuration parameters (e.g., number of beams, periodicity, transmission power, etc.) different than configuration parameters of SSBs and/or CSI-RSs of Cell 1.

Cell 1 with a second PCI different from a first PCI of Cell 0 may be considered and/or configured as a separate cell different from cell 0 for a second wireless device 4330 (e.g., wireless device2), for example, if Cell 1 is configured as a candidate target cell as described herein in FIG. 39 and/or FIG. 41. Cell resources (e.g., SSB, CSI-RS, PDCCH, PDSCH, PUCCH, PUSCH, etc.) may not be shared between Cell 1 and Cell 0. Cell 1 may have configuration parameters, of cell resources, that may be different from and/or independent of configuration parameters of the cell resources of Cell 0.

A network energy saving operation may comprise shutting down some cells or reducing periodicity of SSB/SIB1/SIB2 with or without beam sweeping. The network energy saving operation may be different from the power saving operations, for a wireless device, described herein (e.g., with respect to FIG. 22, FIG. 28, FIG. 31A, FIG. 31B, FIG. 32A, FIG. 32B and/or FIG. 33). Shutting down cells (entirely and/or partially) may cause negative impact on data transmission latency and/or power consumption (e.g., during the access process). Also, or alternatively, an SSB may be modified to carrying no or reduced information, which may be referred to as a light SSB. For example, an original SSB may be modified to remove or abbreviate one or more of a PSS, SSS, or PBCH to be a light SSB, or a light SSB comprise only a portion of the original SSB's PSS, SSS, or PBCH. Use of a light SSB could be combined and/or replaced with other power saving techniques, such as less frequent SSB transmission (e.g., with a periodicity >20 msec), on-demand SSB (e.g., wherein a SSB transmission is triggered by a wireless device via an UL trigger signal). A base station may send a light SSB. A wireless devices may react by transmitting an uplink trigger signal. Upon reception of the uplink trigger signal, the base station may start transmitting the full-blown SSB. A network may adjust the SSB transmission configuration to respond to the wireless device's indication, for example, after receiving the uplink trigger signal.

A base station may perform a network energy saving operation if carrier aggregation (CA) is supported. In CA, a wireless device may be configured with a set of secondary cells (SCells) in addition to a primary cell (PCell). PCell/SCell configurations may be specific to a wireless device (e.g., UE-specific configured). A CC configured as a PCell for a wireless device may be (e.g., separately and/or independently) configured as a SCell for another wireless device. From a network power consumption perspective, it may be beneficial to turn off some CCs and keep a common CC serving as PCell for wireless devices (e.g., UEs) in an RRC_CONNECTED state when the cell load is low. To achieve this goal, a base station may request the wireless device to perform PCell switching when the CC serving as a PCell for the wireless device is not the common CC serving as a PCell for the purpose of network power saving. The base station may cause a first PCell to be deactivated and/or in a dormant state after and/or based on a wireless device switching from the first PCell to a second PCell. In at least some wireless communications, PCell switching is achieved by RRC reconfiguration (e.g., via L3-based handover, such as shown in FIG. 37). However, the RRC reconfiguration may not be fast enough to react to a dynamic arrival load. Dynamic PCell switching based on wireless device-specific DCI or group common DCI may improve network energy saving. To improve network energy saving, dynamic PCell switching based on wireless device-specific DCI or group common DCI may be performed.

Figure 44:
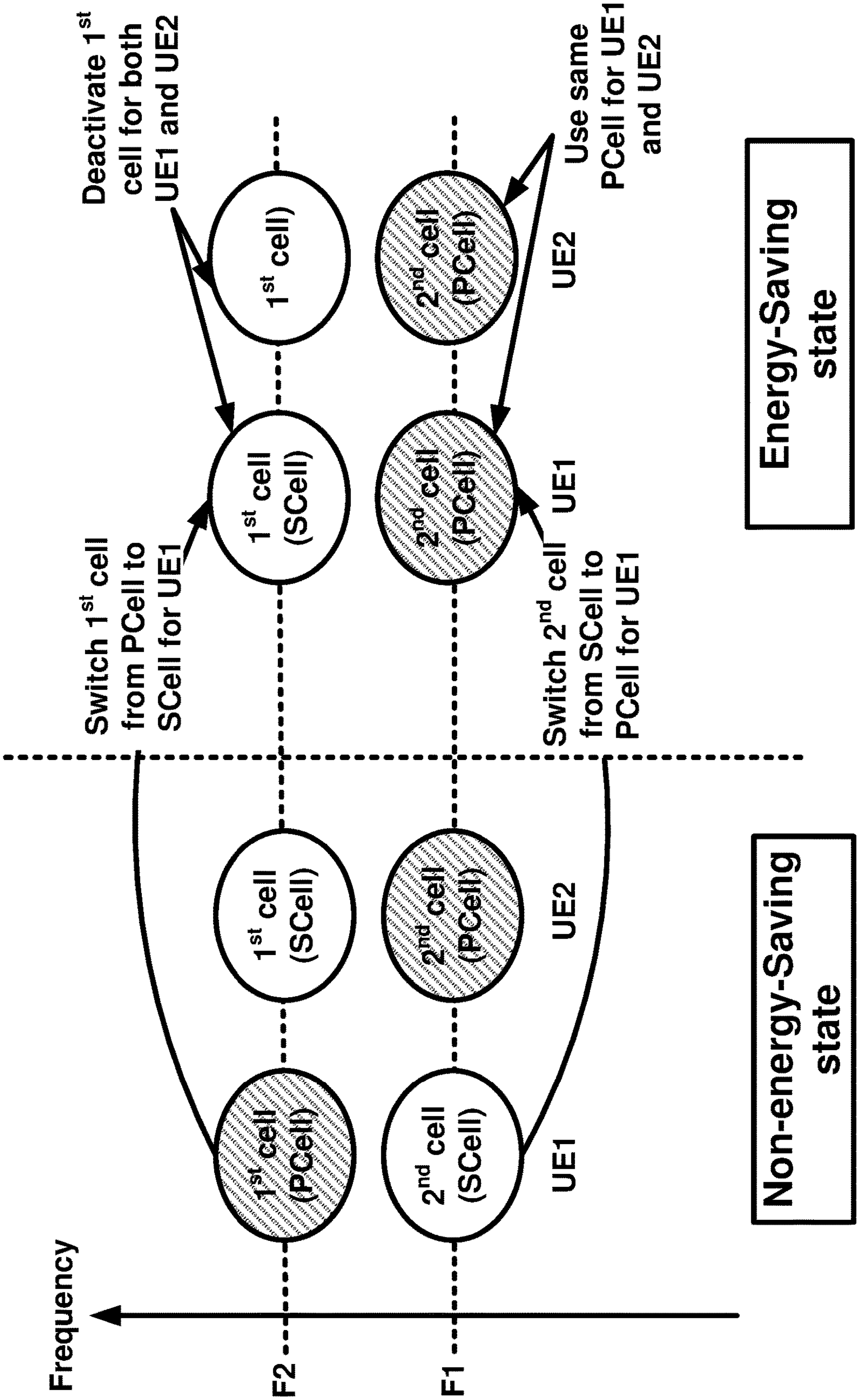
FIG. 44 shows an example of PCell switching for energy saving.

FIG. 44 shows an example of dynamic PCell switching for network energy saving. A first wireless device (e.g., UE1) may be configured with a plurality of cells comprising a PCell (e.g., 1st cell located in frequency point F2) and a SCell (e.g., 2nd cell located in frequency point F1). A second wireless device (e.g., UE2) may be configured with a plurality of cells comprising a PCell (e.g., 2nd cell located in frequency point F1) and a SCell (e.g., 1st cell located in frequency point F2). The PCell of UE1 may be served and/or configured as a SCell for UE2. The PCell of UE2 may be served and/or configured as a SCell for UE1.

A PCell may be a cell by which the base station may send NAS related information (e.g., mobility) and/or security related information to a wireless device. The PCell may also be a cell by which the base station may maintain a RRC connection with the wireless device. The wireless device may establish an initial (RRC) connection establishment and/or initiates re-establishment of a (RRC) connection via the PCell (e.g., not via a SCell).

In a non-energy-saving state (non-ES state), the base station may use the first/1st cell as a PCell and/or use the second/2nd cell as a SCell for communicating with UE1. In the non-energy-saving state, the base station may use the 2nd cell as a PCell and/or use the 1st cell as a SCell for communicating with UE2. Different PCells serving different wireless devices may balance signaling overhead for different cells.

The base station may send physical layer (Li) signaling (e.g., group common DCI and/or wireless device-specific DCI) indicating PCell switching for a first wireless device (e.g., UE1) and/or other wireless devices (e.g., UE2). The L1 signaling may be sent to achieve dynamic PCell switching for network energy saving. The L1 signaling may indicate to UE1, for example, that the PCell should be switched from a 1st cell to a second/2nd cell for UE1 and/or that the SCell should be switched from the 2nd cell to the first/1st cell. In response to and/or after receiving the L1 signaling, UE1 may switch the PCell and the SCell. Based on the switching the PCell and the SCell, UE1 and UE2 may be served with the same cell (e.g., the 2nd cell) as the PCell. The same PCell for UE1 and UE2 may be referred to as a group common PCell. The base station may be able to deactivate and/or turn off the 1st cell without connection lost with UE1 and UE2, since UE1 and UE2 are served with the same PCell. Dynamic PCell switching may thus allow the base station to turn off some cells without losing RRC connection with wireless devices.

A base station may send one or more wireless devices one or more DCI indicating a PCell change. To enable network energy saving, a base station may use a group common DCI indicating, for a plurality of wireless devices, a PCell changing and/or switching to a common PCell, for example, if the base station is medium or heavily loaded (e.g., with more than 5 to 10 wireless devices connected to the base station). Also, to enable the network energy saving, the base station may use a wireless device-specific DCI and/or MAC CE, to each wireless device, that may indicate a PCell changing and/or switching (e.g., as described herein in FIG. 42), for example, if the base station is lightly loaded (e.g., with one or two wireless devices connected to the base station), and the current PCell of each wireless device is not a common PCell of the base station.

Dynamic PCell switching may allow the base station to turn off some cells without RRC connection being lost with wireless devices. A base station may send (e.g., transmit), to a wireless device, L3 signaling (e.g., one or more RRC messages) to indicate a PCell changing and/or switching for HO from a source base station and/or cell to a neighbor base station and/or cell (e.g., as described herein in FIG. 38). Also, or alternatively, a base station may send (e.g., transmit), to a group of wireless devices, group common (GC) DCI to indicate a PCell changing and/or switching from a current PCell to a target PCell and/or a GC PCell for network energy saving. The PCell changing and/or switching may further comprise activating a BWP and/or a group common (GC) energy saving (ES) BWP, that may be configured or preconfigured, of the target PCell as the active BWP of the target PCell to use, for example, if the target PCell comprises multiple BWPs, and if the wireless device completes the PCell switching to the target PCell.

GC DCI, for PCell switching, may be addressed for a group of wireless devices for saving signaling overhead. Before receiving the GC DCI, different wireless devices may be served and/or connected to the base station by different PCells. Different wireless devices may be activated using different BWPs of corresponding PCells. A first wireless device may be on a target PCell and/or a GC PCell but not on an identical configured GC and/or ES BWP of the target PCell before receiving the GC DCI. A second wireless device may be on the same configured GC and/or ES BWP of the target PCell before receiving the GC DCI. A third wireless device may be on a PCell different from the target PCell before receiving the GC DCI, etc. How each wireless device, of the group of wireless devices (e.g., the first wireless device, the second wireless device, the third wireless device, etc.), processes the GC DCI may not be clear, for example, if wireless devices in a group of wireless devices receive the GC DCI. Each wireless device may be configured with a respective current PCell that may or may not be identical to the target PCell indicated by the GC DCI. Each wireless device may be configured with a respective activated resource (e.g., BWP) that may or may not be the same as the GC and/or ES BWP of the target resource (e.g., BWP) indicated by the GC DCI. Behavior of wireless devices may be aligned with the base station, for example, based on receiving the GC DCI indicating PCell switching. Alternatively, misalignment between the wireless device and the base station regarding the wireless device's behavior may increase PCell switching delay and/or power consumption. Moreover, to address how the GC DCI may be to be processed, the PCell a wireless device may be configured to and/or the BWP of the PCell that may be activated may be considered, for example, before the GC DCI is received.

A wireless device may determine to ignore GC DCI for a PCell switching, for example, based on receiving GC DCI indicating a PCell switching from a wireless device-specific PCell to a GC PCell, and on if the wireless device-specific PCell is identical to the GC PCell. The GC DCI may be ignored and/or discarded, for example, if the wireless device-specific PCell matches the GC PCell (e.g., an index and/or ID of the wireless device-specific PCell matches that of the GC PCell).

Also, or alternatively, a wireless device may determine to ignore GC DCI for a PCell switching, for example, based on a current (e.g., wireless device-specific) active BWP of a wireless device-specific PCell being identical to a configured GC and/or ES BWP of a GC PCell, and if the wireless device-specific PCell is same as the GC PCell. The GC DCI may be ignored and/or discarded, for example, if the active BWP of the wireless device-specific PCell is identical to the GC and/or ES BWP of the GC PCell (e.g., an index and/or ID of the BWP of the wireless device-specific PCell matches that of the GC and/or ES BWP of the GC PCell). Alignment between the base station and the wireless device may be improved, regarding a state of one or more cells and/or BWPs for ES state transition of a base station.

Figure 45A:
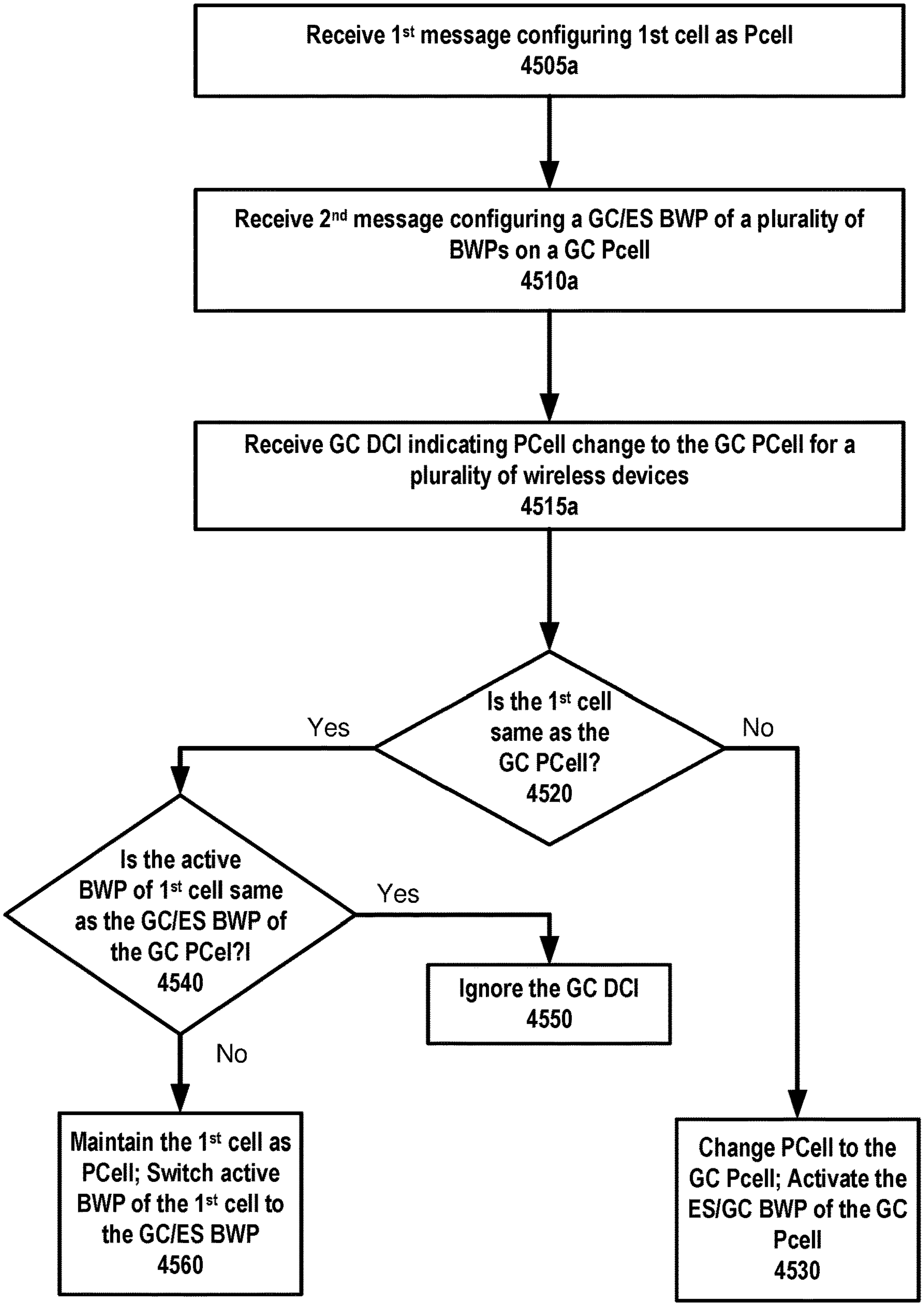
FIG. 45A and FIG. 45B show an example of PCell switching for network energy saving.
Figure 45B:
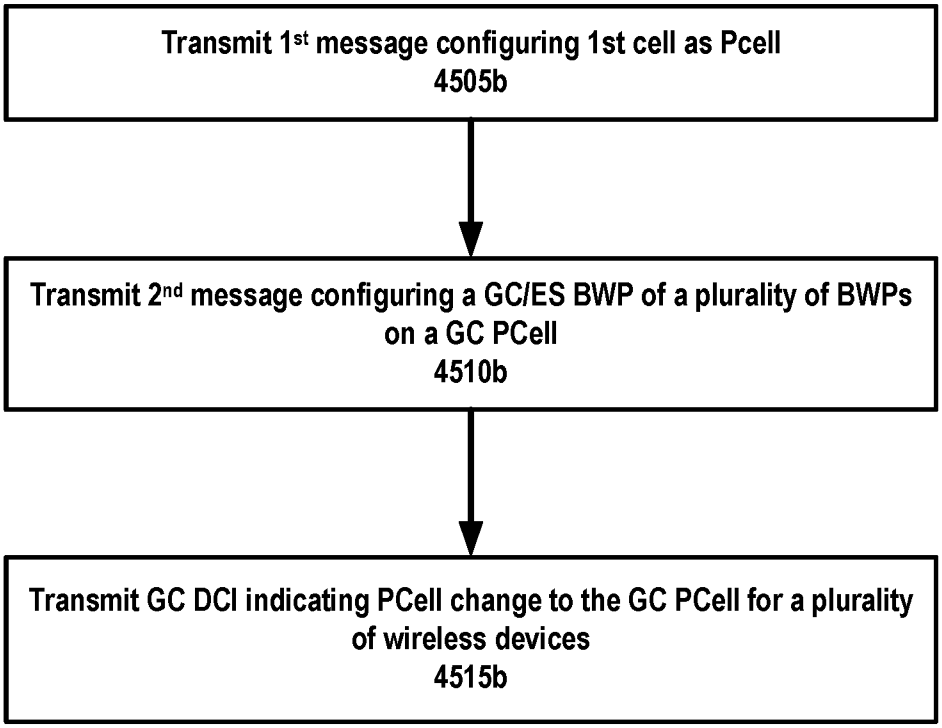

FIG. 45A and/or FIG. 45B show an example embodiment of dynamic PCell switching based network energy saving. A wireless device may receive 4505*a*, and/or a base station may send (e.g., transmit) 4505*b*, one or more RRC messages (e.g., $1^{st}$ message) comprising configuration parameters indicting a $1^{st}$ cell as a PCell for a cell group. A PCell may be a cell, of a cell group, for maintaining RRC connection between the base station and the wireless device.

Using a PCell, rather than a SCell of the cell group, a base station may send (e.g., transmit) NAS (e.g., as described herein in FIG. 1A and/or FIG. 1B) related information (e.g., mobility) and/or security related information to a wireless device. Using the PCell, the base station may maintain a RRC connection with the wireless device. Using the PCell, the wireless device may perform an initial connection (e.g., RRC) establishment procedure and/or initiates a connection (e.g., RRC) re-establishment procedure.

A wireless device may communicate with a base station using a PCell and/or one or more SCells (e.g., activated SCells) of the cell group based on receiving a $1^{st}$ message. Communicating with a base station may comprise the wireless device receiving MIBs, SIBs, CSI-RSs, PDCCHs, and/or PDSCHs and/or transmitting RACHs, PUSCHs, PUCCHs, and/or SRSs.

A base station may determine to enable an energy saving (ES) operation for the base station and configure a group common (GC) PCell and/or a GC target PCell of the cell group and/or another cell group different from the cell group for the ES operation. The base station may send (e.g., transmit) a second RRC message (e.g., $2^{nd}$ message) 4510*b* comprising configuration parameters indicating a second/$2^{nd}$ cell, of the cell group, as the GC PCell for a plurality of wireless devices used in the ES operation, for example, based on enabling the ES operation. The $2^{nd}$ cell may have different configuration parameters (e.g., periodicity and/or power of SSBs and/or CSI-RSs, bandwidth, antenna ports, etc.) from the $1^{st}$ cell. The $2^{nd}$ cell may be a configured SCell of the cell group. The $2^{nd}$ cell may be a neighbor cell and/or a non-serving cell (e.g., as described herein in FIG. 43) that may not belong to the cell group.

A second RRC message 4510*b* may further indicate a GC and/or ES BWP, that may be identical to an initial (e.g., first) active BWP, a default BWP, and/or another BWP that may be different from the initial (e.g., first) active BWP and the default BWP of a plurality of BWPs configured on the GC PCell, for the ES operation. The initial (e.g., first) active BWP and/or the default BWP may be implemented as described herein in FIG. 22. The second RRC message 4510*b* may be a RRC reconfiguration message. The configuration of the $2^{nd}$ cell may be implemented as described herein in FIG. 38, FIG. 39 and/or FIG. 42. The base station, by configuring the second RRC message 4510*b* appropriately for each wireless device, for example, may ensure that wireless devices are configured with the same GC PCell, if triggered by GC DCI, to allow the base station to maintain the GC PCell and/or turn off other SCells for network energy saving.

A wireless device may receive a second RRC message 4510*a*. The wireless device may maintain RRC connection with a first/$1^{st}$ cell as a PCell, that may comprise continuing the communication with a base station via the $1^{st}$ Cell, for example, based on receiving the second RRC message 4510*a* that may indicate a second/2nd cell (e.g., the GC PCell) of the cell group. The wireless device may perform BWP switching on the $1^{st}$ cell comprising multiple BWPs (e.g., as described herein in FIG. 9 and/or FIG. 22).

A first/$1^{st}$ cell of a wireless device may or may not be identical to a GC PCell predefined and/or configured in the cell group. An active BWP of the first/$1^{st}$ cell for the wireless device may or may not be identical to the GC and/or ES BWP predefined and/or configured on the GC PCell.

A base station may send (e.g., transmit) 4515*b* GC DCI. A wireless device may receive 4515*a*, from the base station, the GC DCI that may indicate to switch from a non-ES state (e.g., mode, configuration, period, etc.) to an ES state and/or may indicate to change and/or switch the PCell from the $1^{st}$ cell to the GC PCell.

For a non-ES state, a base station may send (e.g., transmit), and/or the wireless device may receive, MIBs, SSBs, CSI-RSs, TRSs, PDCCHs, and/or PDSCHs that may have a first/$1^{st}$ cell as the PCell and/or may activate one or more SCells of a cell group for each wireless device.

For an ES state, a base station may send (e.g., transmit), and/or a wireless device may receive, MIBs, SSBs, CSI-RSs, PDCCHs, and/or PDSCHs using a GC PCell (e.g., the $2^{nd}$ cell) for all wireless devices and may deactivate (e.g., transition to dormancy or turn off) other cells (e.g., SCells) for all wireless devices. The wireless device may maintain (e.g., without releasing) RRC configuration parameters of the SCells.

A GC DCI, with DCI format (e.g., one of existing DCI formats as described herein in FIG. 23 and/or a new DCI format that may be different from existing DCI formats), may comprise an energy saving indication that may indicate to switch from a non-ES state to an ES state for a base station.

A base station may send (e.g., transmit), via a search space and/or a CORESET of a cell (e.g., the $1^{st}$ cell), GC DCI that may comprise an energy saving indication. The energy saving indication may indicate a transition from a non-ES state to an ES state. A first and/or a second RRC messages may comprise configuration parameters of the search space and/or the CORESET. A search space may be implemented as described herein FIG. 14A, FIG. 14B and/or FIG. 27. A CORESET set may be implemented as described herein in FIG. 14A, FIG. 14B and/or FIG. 26.

A search space for the GC DCI that may indicate energy saving and/or PCell switching may be configured (e.g., dedicatedly) on a first/$1^{st}$ cell, and may not be configured on SCells. The search space for the GC DCI that may comprise the energy saving indication may be a type 0 common search space. The GC DCI that may comprise the energy saving indication may share an identical type 0 common search space with other DCIs (e.g., scheduling SIBx message). The base station may send (e.g., transmit) configuration parameter of the type 0 common search space in a MIB message or a SIB1 message. The base station may transmit the MIB message via a PBCH and/or indicating system information of a base station. The base station may transmit the SIB1 message, scheduled by a group common PDCCH with CRC scrambled by SI-RNTI, that may indicate at least one of: information for evaluating if a wireless device may be allowed to access a cell of the base station, information for scheduling of other system information, radio resource configuration (RRC) information that may be common for all wireless devices, and/or barring information that may be applied to access control.

Also, or alternatively, a search space for the GC DCI that may comprise an energy saving indication may be a type 2 common search space. The GC DCI that may comprise the energy saving indication may share an identical type 2 common search space with other DCIs (e.g., scheduling paging message) with CRC scrambled by P-RNTI.

Also, or alternatively, a search space for the GC DCI that may comprise an energy saving indication may be a type 3 common search space. The GC DCI that may comprise the energy saving indication may share the same type 3 common search space with a plurality of group common DCIs. The plurality of group common DCIs may comprise: DCI format 2_0 indicating slot format based on CRC bits scrambled by SFI-RNTI, DCI format 2_1 that may indicate a downlink pre-emption based on CRC being scrambled by an INT-RNTI, DCI format 2_4 that may indicate an uplink cancellation based on CRC being scrambled by a CI-RNTI, DCI format 2_2/2_3 that may indicate uplink power control based on CRC bits being scrambled with TPC-PUSCH-RNTI, TPC-PUCCH-RNTI, and/or TPC-SRS-RNTI, DCI format 2_6 that may indicate a power saving operation (e.g., wake-up and/or go-to-sleep and/or SCell dormancy), for example, based on CRC bits being scrambled by PS-RNTI, etc.

A GC DCI that may indicate an energy savings may be a legacy DCI format (e.g., DCI format 1_0/1_1/1_2/0_0/0_1/0_2/2_0/2_1/2_2/2_3/2_4/2_5/2_6/2_7, etc. as described herein in FIG. 23). DCI may be a new DCI format, with an identical DCI size as DCI format 2_0/2_1/2_2/2_3/2_4/2_5/2_6/2_7. The GC DCI may be a new DCI format with an identical DCI size as DCI format 1_0/0_0. The GC DCI may be a new DCI format with an identical DCI size as DCI format 1_1/0_1.

GC DCI may be sent (e.g., transmitted) with CRC scrambled by a RNTI for network energy saving (e.g., NES-RNTI, ES-RNTI, etc.). The NES-RNTI may be different from a wireless device-specific RNTI (e.g., C-RNTI, CS-RNTI, MCS-C-RNTI) and/or an existing group common RNTI (e.g., P-RNTI, SI-RNTI, RAR-RNTI, CI-RNTI, SFI-RNTI, INT-RNTI, PS-RNTI, G-RNTI, etc.). The NES-RNTI may be comprised of a $1^{st}$ RRC message and/or a second/2nd RRC message.

Configuration parameters of one or more RRC messages may indicate that a control resource set of a plurality of control resource sets may be associated with a search space for GC DCI that may indicate an energy saving for a base station. The configuration parameters may indicate, for the CORESET, frequency radio resources, time domain resources, CCE-to-REG mapping type, etc.

A wireless device may monitor a search space (e.g., of a CORESET) for receiving GC DCI that may indicate an energy saving for a base station. The wireless device may monitor the search space via the first/$1^{st}$ cell for receiving the GC DCI 4515*a* that may indicate a transitioning from a non-ES state to an ES state and/or that may indicate a PCell switching. A base station may send (e.g., transmit) the GC DCI 4515*b*, using one or more radio resources associated with the search space (e.g., in a CORESET), that may comprise the energy saving indication for the base station.

GC DCI may comprise a bit field for the energy saving indication. The bit field being set to a first value (e.g., 0) may indicate the transition from the non-ES state to the ES state, and/or may indicate changing and/or switching a PCell from corresponding wireless device-specific PCells to the GC PCell, for a plurality of wireless devices. The bit field being set to a second value (e.g., 1) may indicate a transition from the ES state to the non-ES state and/or may indicate changing and/or switching PCell from the GC PCell to corresponding wireless device-specific PCells, for a plurality of wireless devices.

A wireless device may determine that a current PCell (e.g., first/$1^{st}$ cell) may be identical to a GC PCell for changing and/or switching 4520, for example, based on receiving GC DCI that indicates to switch from the non-ES state to the ES state and/or that indicates to change and/or switch the PCell from the $1^{st}$ cell to the GC PCell.

A wireless device may change and/or switch a PCell from the first/$1^{st}$ cell to a GC PCell 4530, for example, based on a current PCell (e.g., first/$1^{st}$ cell) being different from the GC PCell. The changing and/or switching the PCell from the first/$1^{st}$ cell to the GC PCell may comprise downlink synchronization (e.g., SSB, PBCH, and/or SIB monitoring and/or selecting SSB as a reference for DL and/or UL transmission) with the GC PCell, uplink synchronization (e.g., RACH procedure) with the GC PCell, etc. The changing and/or switching the PCell from the first/$1^{st}$ cell to the GC PCell may be identical or similar to PCell changing and/or switching based on layer 3 signaling PUCCH, PUSCH, and/or SRS (e.g., as described herein in FIG. 38 and/or FIG. 40), or based on layer 1/2 signaling based mobility (e.g., as described herein in FIG. 42). The wireless device may further activate the GC and/or ES BWP, on the GC PCell, as the active BWP for the ES operation, for example, if the GC and/or ES BWP is configured on the GC PCell.

Changing and/or switching a PCell from a first/$1^{st}$ cell to a GC PCell may not comprise downlink synchronization (SSB, PBCH, and/or SIB monitoring and/or selecting SSB as a reference for DL and/or UL transmission) and/or uplink synchronization to the GC PCell by a wireless device, for example, if the GC PCell is one of a neighbor and/or non-serving cells used for the ICBM of the $1^{st}$ cell, and if ICBM is configured and/or supported (e.g., as described herein in FIG. 42 and/or FIG. 43).

A wireless device may communicate with a base station via a GC PCell and/or via a GC and/or ES BWP of the GC PCell in an ES state, for example, based on switching the PCell from the first/$1^{st}$ cell to the GC PCell. Communicating with the base station may comprise receiving MIBs, SIBs, CSI-RSs, PDCCH, and/or PDSCH and/or transmitting RACH, PUSCH, PUCCH, and/or SRS.

A wireless device may deactivate and/or transition to dormancy all cells (e.g., a first/$1^{st}$ cell and/or other cells in a cell group) other than a GC PCell and/or may maintain (e.g., may not release) RRC configuration parameters of the first/$1^{st}$ cells and/or the other cells in the cell group for the ES operation, for example, based on switching a PCell from the first/$1^{st}$ cell to the GC PCell. PCell switching latency may be reduced, unlike a HO procedure described herein in FIG. 38 and/or a CHO procedure described herein in FIG. 40, for example, by deactivating SCells and/or maintaining (e.g., by not releasing) the RRC configuration parameters, of the $1^{st}$ cell and/or one or more SCells of the MCG associated with the $1^{st}$ cell, after the PCell switching, if the base station switches back from the ES state to the non-ES state.

A wireless device may release RRC configuration parameters of a first/$1^{st}$ cell and/or a cell group, for example, based on switching the PCell from the $1^{st}$ cell to a GC PCell. Buffer usage and/or power consumption of the wireless device may be reduced, for example, based on releasing the RRC parameters of the first/$1^{st}$ cell after switching the PCell from the first/$1^{st}$ cell to the GC PCell.

A wireless device may determine if a current active BWP of a current PCell (e.g., a first/$1^{st}$ cell) may be identical to a GC and/or ES BWP of a GC PCell 4540, for example, based on the current PCell (e.g., the $1^{st}$ cell) being identical to the GC PCell. The wireless device may ignore GC DCI 4550 for PCell switching, by maintaining the first/$1^{st}$ cell as a PCell for ES operation and/or maintaining the current active BWP of the first/$1^{st}$ cell in the active state (e.g., without BWP switching), for example, based on the current PCell (e.g., first/$1^{st}$ cell) being identical to the GC PCell and the current active BWP of the current PCell (e.g., first/$1^{st}$ cell) being identical to the GC and/or ES BWP of the GC PCell. A transition from a non-ES state to an ES state, for this case, may not comprise PCell switching and/or BWP switching. The wireless device may continue communicating, without an interruption for PCell switching, with a base station via the current active BWP of the first/1$^{st}$ cell in the ES state. Communicating with the base station may comprise receiving MIBs, SIBs, CSI-RSs, PDCCH, and/or PDSCH and/or transmitting RACH, PUSCH, PUCCH, and/or SRS.

A wireless device may further deactivate and/or transition to dormancy all other activated SCells in a cell group except a first/1$^{st}$ cell, for example, based on receiving GC DCI that may indicate to transition a base station from a non-ES state to an ES state. The wireless device may maintain, without releasing, RRC configuration parameters of the SCells.

A wireless device may maintain a first/1$^{st}$ cell as a PCell for ES operation and/or may switch a current active BWP of the 1$^{st}$ cell to a GC and/or ES BWP of a GC PCell (e.g., which may be identical to the first/1$^{st}$ cell) 4560, for example, based on a current PCell (e.g., a first/1$^{st}$ cell) being identical to the GC PCell and the current active BWP of the current PCell (e.g., first/1$^{st}$ cell) being different from the GC and/or ES BWP of the GC PCell. The wireless device may continue communicating (e.g., without PCell switching and after switching the active BWP to the GC and/or ES BWP) with a base station via the GC and/or ES BWP of the first/1$^{st}$ cell in the ES state. The transition from the non-ES state to the ES state in this case may comprise a time gap for the active BWP switching on an identical PCell. Communicating with the base station may comprise receiving MIBs, SIBs, CSI-RSs, PDCCH, and/or PDSCH and/or transmitting RACH, PUSCH, PUCCH, and/or SRS. the wireless device may further deactivate and/or transition to dormancy all other activated SCells in the cell group except the first/1$^{st}$ cell, for example, based on receiving the GC DCI indicating to transition the base station from a non-ES state to an ES state. The wireless device may maintain, without releasing, RRC configuration parameters of the SCells.

A wireless device and a base station may be aligned by an amount of time a wireless device takes to switch from a wireless device-specific PCell to a GC PCell and/or activate the GC and/or ES BWP of the GC PCell for the ES operation after the GC DCI is sent (e.g., transmitted) 4515*b* by the base station and/or received 4515*a* by the wireless device (e.g., as described herein in FIG. 45A and/or FIG. 45B). A wireless device may be aligned with a base station regarding how to proceed with GC DCI in a different scenario, of wireless device-specific PCell configurations, comprising: a first scenario, having a wireless device-specific PCell that may be identical to the GC PCell and a current active BWP of the wireless device-specific PCell that may be different from a configured GC and/or ES BWP of the GC PCell; a second scenario, having a wireless device-specific PCell that may be identical to the GC PCell and the current active BWP of a wireless device-specific PCell that may be identical to a configured GC and/or ES BWP of the GC PCell; and/or a third scenario, having a wireless device-specific PCell that may be different from a GC PCell, etc. Alignment between a base station and a wireless device regarding a state of one or more cells and/or BWPs for ES state transition may be improved.

Latency for an ES state transition may further be reduced. A wireless device, for an ES operation, may maintain a first/1$^{st}$ cell as a GC PCell and may maintain (e.g., without BWP switching) a current active BWP of the first/1$^{st}$ cell in an active state regardless of the current active BWP of the first/1$^{st}$ cell that may be identical to the configured GC and/or ES BWP of the GC PCell, for example, based on a current PCell (e.g., a first/1$^{st}$ cell) being identical to the GC PCell and receiving GC DCI indicating the ES state transition and/or PCell switching. The wireless device may deactivate and/or transition to dormancy other SCells of the cell group except the first/1$^{st}$ cell for the ES operation. The wireless device may maintain, without releasing, RRC configuration parameters of the SCells. Transitional latency for the ES operation may be further improved (e.g., without BWP switching), for example, if the current wireless device specific PCell is same as the GC PCell, and even if the current active BWP is not same as the configured GC and/or ES BWP of the GC PCell.

A wireless device may be configured with a plurality of PCell changing and/or switching (e.g., HO) procedures such as a first HO procedure comprising a layer 3 signaling based HO (e.g., as described herein in FIG. 38 and/or FIG. 39), a second HO procedure comprising a layer 3 signaling and/or event-triggering based CHO (e.g., as described herein in FIG. 40 and/or FIG. 41), a third HO procedure comprising a layer 1/2 signaling (DCI and/or MAC CE) based HO (e.g., as described herein in FIG. 42), and/or a fourth HO and/or PCell changing and/or switching procedure comprising GC DCI based on PCell switching for energy saving (e.g., as described herein in FIG. 45A and/or FIG. 45B). Different HO and/or PCell changing and/or switching procedures may have different trigger conditions. A trigger condition for a first HO may be, for example, a reception of RRC reconfiguration message comprising reconfigurationWithSync IE. A trigger condition for a second HO may be, for example, a measurement event with a condition being met after the reception of the RRC reconfiguration message. A trigger condition for a third HO may be, for example, a reception of the DCI and/or MAC CE. A trigger condition for a fourth HO may be, for example, a reception of the GC DCI, etc.

For a CHO procedure, a wireless device may abort and/or abandon an ongoing CHO procedure, for example, if the wireless device receives a RRC reconfiguration message indicating a non-conditional HO (e.g., as described herein in FIG. 38), for example, if the wireless device is evaluating execution conditions on a candidate target cell. However, layer 1/2 signaling based HO may not be resolved, for example, if there is an ongoing layer 3 signaling based CHO procedure. A wireless device may have difficulty in determining how to proceed with multiple parallel (e.g., layer 3 and/or layer 1/2) ongoing PUCCH, PUSCH, and/or SRS procedures (e.g., power consumption and/or HO latency may be increased). Layer 3 signalling and/or L1/L2 signalling may be improved as described herein.

A wireless device may prioritize a layer 1/2 signaling based PCell switching (e.g., for mobility as described herein in FIG. 42 and/or for network energy savings as described herein in FIG. 45A and/or FIG. 45B) over a layer 3 signaling based CHO (e.g., as described herein in FIG. 40) that may comprise PCell switching. A wireless device may abort and/or abandon layer 3 signaling based CHO after a wireless device completes a layer 1/2 signaling based PCell switching, for example, based on prioritizing the layer 1/2 signaling based PCell switching over layer 3 signaling based CHO. A wireless device may continue and/or resume a layer 3 signaling based CHO, for example, after the wireless device completes a layer 1/2 signaling based PCell switching based on prioritizing the layer 1/2 signaling based PCell switching over layer 3 signaling based CHO.

A wireless device may quickly complete a PCell switching, for example, without having to wait for a CHO execution condition to be met. PCell switching latency and/or power consumption of the wireless device may be improved. Energy consumption of a base station may be reduced, for example, by allowing the base station to quickly (e.g., without waiting for CHO completion) turn off an old PCell after the wireless device completes the PCell switching from the old PCell to a new PCell.

A wireless device may determine to continue the CHO procedure or to perform the GC DCI triggered PCell switching to a GC PCell, for example, based on a current (e.g., source) PCell being identical to the GC PCell and/or an active BWP of the current (e.g., source) PCell being identical to a configured GC and/or ES BWP of the GC PCell. By using the examples, the wireless device may continue the CHO procedure based on the current (e.g., source) PCell being same as the target GC PCell and/or the active BWP of the current PCell being identical to the configured GC and/or ES BWP of the target GC PCell. Latency for handover may be reduced for mobility and allow the base station to turn off SCells for network energy saving for a plurality of wireless devices.

In at least some wireless communications, a base station may send signaling to indicate PCell switching. A wireless device may support multiple types of PCell switching procedures. A layer 3 handover (HO) comprises switching from a source PCell to a target PCell upon receiving a RRC reconfiguration message. A layer 1/2 PCell switching procedure may be triggered, by DCI and/or MAC CE, for energy savings and/or mobility management. For a conditional handover (CHO) procedure, the base station may configure a wireless device with a plurality of candidate target PCells for CHO and conditions for executing the CHO for the wireless device. Unlike other HO and/or switching procedures, the wireless may not perform a CHO to a target PCell upon receiving configuration parameters from a base station.

For a CHO PCell switching procedure, the wireless device may evaluate the plurality of conditions associated with the plurality of candidate target cells. Conditions for the CHO may comprise, for example, a candidate target cell having a higher RSRP than a source PCell. The wireless device may execute the CHO, if the wireless device determines a condition for a CHO has been met. Executing the CHO may comprise applying RRC configuration parameters of candidate target PCell, performing downlink and/or uplink synchronization, and/or releasing RRC configuration parameters of the source PCell.

For at least some wireless devices, conflicts between a CHO PCell switching procedure and other HO and/or switching procedures may occur, for example, if the switching procedures occur in parallel. Conflicts in PCell switching may result in increased latency, poor mobility, and/or a reduction in energy savings. For a conflict involving a layer 1 triggered PCell switching and a layer 3 HO or CHO, for example, the wireless device may prioritize the layer 1 triggered PCell switching.

Also or alternatively, the wireless device may also ignore layer 1 signaling and continue with a RACH procedure, for example, the RACH procedure is enabled. A wireless device may also switch to a 3rd PCell indicated by a layer 1 procedure, and apply any currently configured HO conditions to the new PCell and/or the cell indicated by the HO command.

In at least some wireless communications, a wireless device may receive a GC PCell in GC DCI. The GC DCI may trigger a PCell change, and this triggered PCell change may conflict with a CHO execution. The wireless device may continue a L3 CHO and ignore a GC PCell or ignore the L3 CHO and continue with the GC PCell switch. The wireless device may continue with the L3 CHO and ignore the GC PCell, for example, if the GC PCell is identical to the current PCell of the wireless device. The wireless device may also continue with the L3 CHO and ignore the GC PCell, for example, if a priority associated with the L3 CHO is greater than a priority of the GC DCI.

In at least some wireless communications, a wireless may receive a layer 1/2 based PCell switching that may conflict with CHO PCell switching. The wireless device may switch to a configured BWP of the target PCell and continue with the CHO and/or ignore the layer 1/2 based PCell switching, for example, if an active BWP of the current PCell is not identical to the configured BWP of the target PCell and if the current PCell is the target PCell.

Figure 46:
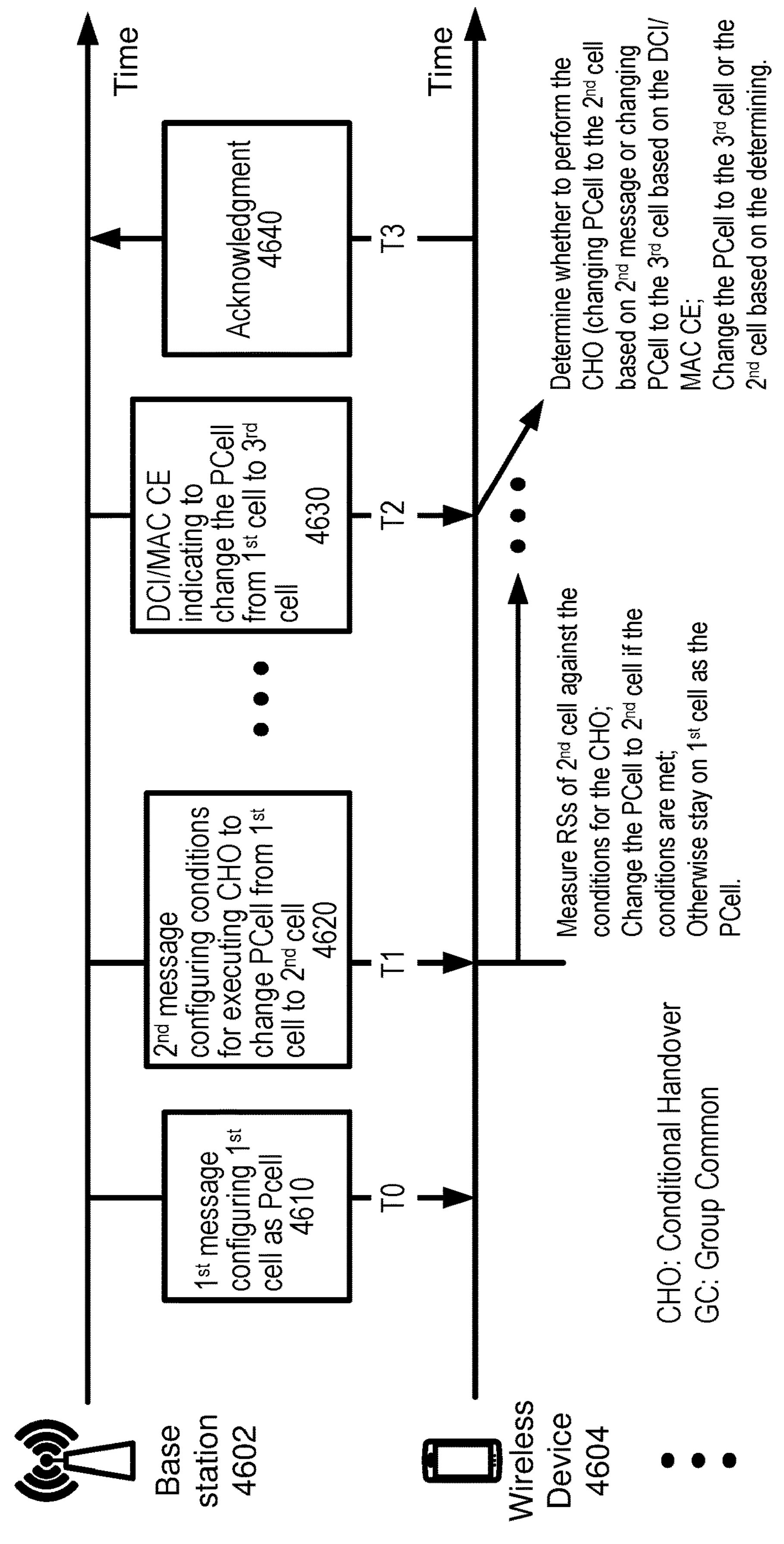
FIG. 46 shows an example of layer 1/2 signaling based HO procedure.

FIG. 46 shows an example embodiment of PCell changing. A base station 4602 may send (e.g., transmit), and/or a wireless device 4604 may receive, one or more first RRC messages 4610 (e.g., 1$^{st}$ message) comprising configuration parameters of a first cell (e.g., 1$^{st}$ cell) configured as a PCell. The one or more first RRC messages 4610 may comprise configuration parameters of one or more SCells. The one or more first RRC messages 4610 may be as described herein in FIG. 38, FIG. 39, FIG. 40, FIG. 41, FIG. 42, FIG. 45A, and/or FIG. 45B.

A wireless device 4604 may communicate with a base station 4602 via the PCell (e.g., a 1$^{st}$ cell) and one or more SCells, for example, based on receiving the one or more first RRC messages 4610 (e.g., at TO), and if activated. Communicating with the base station 4602 via the PCell may be implemented as described herein in FIG. 45A and/or FIG. 45B.

A base station 4602 may send and a wireless device 4604 may receive, at T1, a second RRC message (e.g., 2$^{nd}$ message) 4620 comprising configuration conditions for executing CHO procedures. The second RRC message 4620 may indicate a plurality of candidate target cells, wherein each candidate target cell may be associated with a corresponding condition and a RRC reconfiguration. The plurality of candidate target cells may comprise a second cell (e.g., 2$^{nd}$ cell). The second RRC message 4620 and a CHO procedure may be implemented as described herein in FIG. 40 and/or FIG. 41. The wireless device 4604 may begin (e.g., at T1) to evaluate the conditions for the plurality of candidate target cells and the evaluation may comprise measuring RSs of the 2$^{nd}$ cell, for example, based on receiving the second RRC message 4620. The wireless device 4604 may execute a conditional reconfiguration to the 2$^{nd}$ cell and/or another cell, for example, based on a condition being satisfied and/or met (e.g., as described herein in FIG. 40) and if the condition of the 2$^{nd}$ cell and/or any cell of the plurality of candidate target cells is satisfied and/or met. The wireless device 4604 may remain on the first/1$^{st}$ cell as the PCell and may continue to evaluate the conditions (e.g., until a HO timer expiring or receiving a 3$^{rd}$ RRC message releasing, aborting, and/or abandoning the CHO procedure), for example, if the condition of a second/2$^{nd}$ cell and/or any cell of the plurality of candidate target cells is not met.

A base station 4602 may send and a wireless device 4604 may receive, at T2, DCI and/or MAC CE 4630 that may indicate to change and/or switch a PCell from a 1$^{st}$ cell to a 3$^{rd}$ cell. The 3$^{rd}$ cell may be different from any cell of the plurality of candidate target cells. Alternatively, the 3$^{rd}$ cell may be one of the plurality of candidate target cells.

DCI and/or MAC CE 4630 may be a wireless device 4604 specific DCI and/or a MAC CE same as the 2$^{nd}$ DCI and/or MAC CE of FIG. 42. The 3$^{rd}$ cell may be a target cell for L1/2 signaling based HO according to example embodiments described above with respect to FIG. 42. The 3$^{rd}$ cell may be one of cells used for ICBM as described in FIG. 42 and/or FIG. 43.

DCI and/or MAC CE 4630 may be GC DCI identical to GC DCI as described herein in FIG. 45A and/or FIG. 45B. The GC DCI may be sent (e.g., transmitted) to a plurality of wireless devices comprising the wireless device 4604. The 3$^{rd}$ cell may be a GC PCell used for network energy saving based on example embodiments described above with respect to FIG. 45A and/or FIG. 45B. DCI and/or MAC CE 4630 may be wireless device specific DCI and/or a MAC CE that may indicate to change a PCell from the 1$^{st}$ cell to the GC PCell.

A time interval (e.g., T2) for receiving DCI and/or MAC CE 4630 may begin after receiving a second/2$^{nd}$ message and end before the wireless device 4604 starts to execute the conditional RRC reconfiguration procedure, and may comprise changing a PCell to the 2$^{nd}$ cell upon the execution condition is met for the 2$^{nd}$ cell. The time interval (e.g., T2) for receiving the DCI and/or MAC CE 4630 may be within a time period in which the wireless device 4604 may still be evaluating the execution conditions (e.g., measuring RSs) for a plurality of candidate target cells and/or none of the plurality of candidate target cells has the execution conditions been met.

A wireless device 4604 may determine to continue to perform a CHO procedure (e.g., by continuing to evaluate conditions for executing the CHO procedure) according to a 2$^{nd}$ message and/or to change the PCell from a first/1$^{st}$ cell to a third/3$^{rd}$ cell, for example, based on receiving the DCI and/or MAC CE 4630, and based on the DCI and/or MAC CE 4630.

A wireless device 4604 may determine to abort, abandon, and/or suspend an ongoing CHO procedure, for example, based on receiving DCI and/or MAC CE 4630 that may indicate a PCell changing and/or switching. The aborting, abandoning, and/or suspending the ongoing CHO procedure may comprise stopping the ongoing evaluation of the conditions for executing the CHO procedure, and/or releasing and/or removing (from the variables stored in the memory of the wireless device 4604) RRC parameters of the plurality of candidate target cells.

A wireless device 4604 may abort, abandon, and/or suspend an ongoing CHO procedure and start to change and/or switch a PCell from a first/1$^{st}$ cell to a third/3$^{rd}$ cell, for example, based on receiving a DCI and/or MAC CE. Changing and/or switching the PCell from the 1$^{st}$ cell to the 3$^{rd}$ cell may be implemented as described herein in FIG. 42 and/or FIG. 45A and/or FIG. 45B.

A wireless device 4604 may start to change and/or switch a PCell from a 1$^{st}$ cell to a 3$^{rd}$ cell and continue and/or resume an ongoing CHO procedure (e.g., evaluating the CHO execution conditions), for example, after the wireless device 4604 completes the PCell changing and/or switching to the 3$^{rd}$ cell, and based on receiving the DCI and/or MAC CE. Changing and/or switching the PCell from the 1$^{st}$ cell to the 3$^{rd}$ cell may be implemented as described herein in FIG. 42, FIG. 45A, and/or FIG. 45B. A wireless device 4604 may be execute and/or resume a CHO procedure, for example, if an execution condition is met after the wireless device 4604 switches PCell for network energy saving. RRC connection reliability may be improved, for example, if the wireless device 4604 is moving away from a base station 4602 that is configured with network energy saving.

A third/3$^{rd}$ cell may be one of a plurality of candidate target cells for an ongoing CHO procedure. The 3$^{rd}$ cell may be associated with a CHO execution condition as described herein in FIG. 41. The CHO execution condition for the 3$^{rd}$ cell may not be met or satisfied for executing the CHO, for example, after receiving the DCI and/or MAC CE 4630. The wireless device 4604 may abort, abandon, and/or suspend the ongoing CHO procedure and may start to change and/or switch a PCell from a first/1$^{st}$ cell to the third/3$^{rd}$ cell (e.g., by ignoring the CHO execution condition for the 3$^{rd}$ cell), for example, based on receiving the DCI and/or MAC CE, and even if the CHO execution condition for the 3$^{rd}$ cell is not met or satisfied for executing the CHO.

A wireless device 4604 may prioritize layer 1/2 signaling based PCell switching (e.g., for mobility as described herein in FIG. 42 and/or for network energy saving as described herein in FIG. 45A and/or FIG. 45B) over the layer 3 signaling based CHO (e.g., as described herein in FIG. 40) comprising PCell switching. The wireless device 4604 may quickly complete the PCell switching without waiting for CHO execution condition being met. PCell switching latency and/or power consumption of the wireless device 4604 may be improved. The energy consumption of the base station 4602 may be reduced by allowing the base station 4602 to quickly (e.g., without waiting for CHO completion) turn off the old PCell, for example, after the wireless device 4604 completes the PCell switching from the old PCell to a new PCell.

A third/3$^{rd}$ cell may be one of a plurality of candidate target cells configured for a CHO. A wireless device 4604 may abort and/or abandon an ongoing CHO procedure (e.g., by stopping CHO condition evaluation on the plurality of candidate target cells) and start to change and/or switch a PCell from a first/1$^{st}$ cell to the 3$^{rd}$ cell based on DCI and/or MAC CE 4630 that may indicate to change a PCell to the 3$^{rd}$ cell, and the CHO execution condition for the 3$^{rd}$ cell being met and/or satisfied. The CHO execution condition for the 3$^{rd}$ cell may comprise at least one of: one or more measurement events (e.g., as described herein in FIG. 41) and/or a layer 1/2 trigger.

A 3$^{rd}$ cell may be one of a plurality of candidate target cells configured for a CHO. A wireless device 4604 may continue an ongoing CHO procedure (e.g., by continuing CHO condition evaluation on a plurality of candidate target cells) and ignore DCI and/or MAC CE 4630 by maintaining a first/1$^{st}$ cell as a PCell, for example, based on the DCI and/or MAC CE 4630 that indicates to change the PCell to a third/3$^{rd}$ cell and a CHO execution condition for the 3$^{rd}$ cell not being met and/or satisfied. The CHO execution condition for the 3$^{rd}$ cell may comprise one or more measurement events (e.g., as described herein in FIG. 41).

A wireless device 4604 may send (e.g., transmit) and a base station may receive 4602, at a time T3, an acknowledgement 4640 to inform the base station 4602 of reception of DCI and/or MAC CE 4630 for the reliability requirement, for example, based on receiving at T2 the DCI and/or MAC CE 4630 that may indicate a PCell changing and/or switching from a 1$^{st}$ cell to a 3$^{rd}$ cell for mobility management and/or network energy saving. The wireless device 4604 may start to execute the PCell changing and/or switching from the 1$^{st}$ cell to the 3$^{rd}$ cell, for example, based on transmitting the acknowledgement 4640 of the DCI and/or MAC CE 4630. The wireless device 4604 may maintain the first cell as a current PCell, for example, if transmitting the acknowledgement. A CHO execution condition for changing PCell to the 2$^{nd}$ cell may be met and/or satisfied in a time interval between T2 and T3, wherein T2 may be a time interval for receiving the DCI and/or MAC CE 4630 and T3 may be a time interval for transmitting the acknowledgement of the DCI and/or MAC CE 4630, for example, if the CHO execution conditions of the plurality of candidate target cells comprising the $2^{nd}$ cell are being evaluated. The wireless device 4604 may determine to change the PCell from the $1^{st}$ cell to the $2^{nd}$ cell, or alternatively, the wireless device may determine to change the PCell from the $1^{st}$ cell to the 3rd cell, for example, based on one or more criteria, that may be configured by the base station 4602 in RRC messages and/or that may be predefined.

One or more criteria may comprise DCI and/or MAC CE 4630 that may have a higher priority than a CHO execution condition being met. The wireless device 4604 may determine to change and/or switch the PCell from a first/$1^{st}$ cell to a third/$3^{rd}$ cell, for example, based on the DCI and/or MAC CE 4630 having higher priority than the CHO execution condition being met. The wireless device 4604 may skip executing the condition reconfiguration for the $2^{nd}$ cell according to the CHO procedure. The wireless device 4604 may send (e.g., transmit) the acknowledgement 4640 corresponding to the DCI and/or MAC CE 4630 and start to change and/or switch the PCell from the $1^{st}$ cell to the $3^{rd}$ cell. Executing the PCell changing and/or switching may allow the base station 4602 to flexibly control the cell the wireless device 4604 shall change the PCell to, for example, based on receiving DCI and/or MAC CE 4630 and not executing the PCell switching if a CHO execution condition is met, and if both PCell changing and/or switching are triggered in parallel. Handover latency and/or a load balance of different cells may be improved.

One or more criteria may comprise selecting, for a PCell switching, a cell, from a second/$2^{nd}$ cell and a third/$3^{rd}$ cell, with a higher beam and/or CSI measurement. The one or more criteria may comprise selecting, for the PCell switching, a cell, from the $2^{nd}$ cell and the $3^{rd}$ cell, with downlink having been synchronized, and/or uplink having been synchronized, etc.

FIG. 45A/45B and FIG. 46 may be combined to further improve latency and network energy consumption. A wireless device 4604 may determine to perform a PCell switching or alternatively, to continue a CHO execution condition evaluation, for example, based on a first/$1^{st}$ cell that is identical to the GC PCell and/or an active BWP of the $1^{st}$ cell is identical to a configured GC and/or ES BWP of the GC PCell, and based on receiving DCI and/or MAC CE 4630 that indicates the PCell switching from the $1^{st}$ cell to a third/$3^{rd}$ cell (e.g., a GC PCell as described herein in FIG. 45A and/or FIG. 45B).

A wireless device 4604 may perform PCell switching from a first/$1^{st}$ cell to a GC PCell and abort and/or abandon an ongoing CHO procedure and/or continue the ongoing CHO procedure, for example, if the wireless device 4604 completes the PCell switching to the GC PCell based on the $1^{st}$ cell being different from the GC PCell (e.g., as described herein in FIG. 45A and/or FIG. 45B).

A wireless device 4604 may ignore GC DCI for a PCell switching and continue an ongoing CHO procedure, for example, based on a first/$1^{st}$ cell being identical to the GC PCell (e.g., if GC and/or ES BWP is not configured on the GC PCell), or based on the $1^{st}$ cell being identical to the GC PCell and an active BWP of the $1^{st}$ cell being identical to GC and/or ES BWP of the GC PCell (e.g., if the GC and/or ES BWP is configured on the GC PCell as described herein in FIG. 45A and/or FIG. 45B). The wireless device 4604 may further deactivate and/or transition to dormancy, and maintain the RRC configuration parameters of, one or more SCells (e.g., activated SCells) for network energy saving according to the GC DCI. Continuing the ongoing CHO procedure may comprise continuing to evaluate a CHO execution condition of a plurality of candidate target cells and executing the CHO procedure, for example, if the CHO execution condition is met on a target cell (e.g., as described herein in FIG. 40). Continuing the ongoing CHO procedure may avoid RRC disconnection, for example, if the wireless device 4604 is moving away from the source base station 4602 on the $1^{st}$ cell.

A wireless device 4604 may maintain a first/$1^{st}$ cell as a PCell and/or switch an active BWP of the $1^{st}$ cell to the GC and/or ES BWP, for example, based on the $1^{st}$ cell being identical to the GC PCell and an active BWP of the $1^{st}$ cell being different from the GC and/or ES BWP of the GC PCell (e.g., if the GC and/or ES BWP is configured on the GC PCell). The wireless device 4604 may further deactivate and/or transition to dormancy, and maintain the RRC configuration parameters of, one or more SCells (e.g., activated SCells) for network energy saving according to GC DCI.

A wireless device 4604 may continue an ongoing CHO procedure, for example, based on switching to a GC and/or ES BWP. Continuing the ongoing CHO procedure may avoid RRC disconnection, for example, if the wireless device 4604 is moving away from the source base station 4602 on a first/$1^{st}$ cell.

A wireless device 4604 may determine to change and/or switch the PCell from a first/$1^{st}$ cell to a second/$2^{nd}$ cell and/or a GC PCell, for example, based on the $2^{nd}$ cell being identical to the GC PCell, and based on either the reception of the GC DCI or the CHO execution condition for the $2^{nd}$ cell being met. The wireless device 4604 may further deactivate or transition to dormancy, and maintain the RRC configuration parameters of, one or more SCells (e.g., activated SCells) for network energy saving according to the GC DCI.

A wireless device 4604 may determine to continue a CHO procedure or alternatively, to perform GC DCI triggered PCell switching to a GC PCell, for example, based on a current and/or target PCell being identical to the GC PCell and/or an active BWP of the current PCell being identical to a configured GC and/or ES BWP of the GC PCell. A wireless device 4604 may continue the CHO procedure, for example, based on the current PCell being identical to the target GC PCell and/or the active BWP of the current PCell being identical to the configured GC and/or ES BWP of the target GC PCell. Latency of handover for mobility may be reduced, and a base station 4602 may turn off SCells for network energy saving for a plurality of wireless devices.

A wireless device 4604 may send (e.g., transmit) an acknowledgement 4640 to inform a base station 4602 of reception of DCI and/or MAC CE 4630 to meet the reliability requirement, for example, based on receiving the DCI and/or MAC CE 4630 that indicates a PCell changing and/or switching from a first cell to a second cell for mobility management. The wireless device 4604 may execute the PCell changing and/or switching, for example, based on sending (e.g., transmitting) the acknowledgement 4640 corresponds to the DCI and/or MAC CE 4630. Alternatively, the wireless device 4604 may maintain the first cell as the current PCell, for example, if the wireless device sends (e.g., transmits) the acknowledgement 4640.

A wireless device 4604 may receive GC DCI that may indicate PCell changing and/or switching from a first cell to a third cell (e.g., GC PCell), for example, based on receiving DCI and/or MAC CE 4630 and before sending (e.g., transmitting) the acknowledgement for the DCI and/or MAC CE 4630. The wireless device 4604 may have difficulty in determining how to proceed with the PCell switching to the second cell, for example, based on the DCI and/or MAC CE 4630 and the PCell switching to the third cell, and based on the GC DCI. The GC DCI (e.g., for PCell switching) may not be considered for processing of a previous DCI and/or MAC CE 4630 for PCell switching and may cause misalignment between a base station 4602 and the wireless device 4604 regarding which cell may be the target PCell for PCell switching. Layer 1/2 signaling based PCell changing and/or switching may be improved.

A wireless device 4604 may prioritize DCI and/or MAC CE 4630 based PCell switching (e.g., for mobility as described herein in FIG. 42) or the GC DCI based PCell switching (e.g., for network energy saving as described herein in FIG. 45A and/or FIG. 45B), for example, based on one or more criteria defined and/or configured to be known by both a base station 4602 and a wireless device 4604. Ambiguity of PCell switching between the base station 4602 and the wireless device 4604 may be reduced, for example, if multiple PCell switching indications are received. PCell switching latency may be improved and/or power consumption of the wireless device 4604 may be reduced. Energy consumption of the base station 4602 may be reduced by allowing the base station 4602 to quickly turn off the old PCell, for example, if the wireless device 4604 completes the PCell switching from the old PCell to a new PCell.

A wireless device 4604 may determine to perform a wireless device-specific DCI and/or MAC CE 4630 triggered PCell switching or alternatively, to perform GC DCI triggered PCell switching to a GC PCell, and/or may determine to ignore the wireless device-specific DCI and/or MAC CE 4630 or alternatively, to ignore the GC DCI, for example, based on a target PCell that is indicated by a wireless device-specific DCI and/or MAC CE 4630 being identical to the GC PCell. Latency for handover for mobility may be reduced, redundant PCell switching may be reduce, and the base station 4602 may turn off SCells for network energy saving for a plurality of wireless devices.

A wireless device 4604 may determine to proceed with GC DCI after receiving the DCI and/or MAC CE 4630, for example, based on a time gap between a first time of the reception of the DCI and/or MAC CE 4630 and/or the sending (e.g., transmitting) of the acknowledgement 4640 for the DCI and/or MAC CE 4630 and a second time of the reception of the GC DCI.

A wireless device 4604 may complete a PCell switching to a target PCell based on the DCI and/or MAC CE 4630 and continue the PCell switching to a GC PCell based on the GC DCI, for example, based on the time gap being greater than and/or equal to a configured, defined, and/or predefined time threshold (e.g., as may be configured in RRC messages). The wireless device 4604 may complete the PCell switching to a target PCell based on the DCI and/or MAC CE 4630 and ignore the GC DCI indicating the PCell switching to a GC PCell, for example, based on the time gap being less than a configured, defined, and/or predefined time threshold. Defining, configuring, and/or preconfiguring a time gap for receptions of multiple PCell switching indications (e.g., DCI and/or MAC CE, GC DCI, etc.) may avoid frequent PCell switching and reduce implementation complexity of the wireless device 4604.

A base station 4602 may avoid sending (e.g., transmitting) two contiguous PCell switching indications (e.g., a first DCI and/or MAC CE indicating PCell switching to a first cell, a second DCI and/or MAC CE indicating PCell switching to a second cell, etc.) within a time gap that may be configured and/or preconfigured based on a capability of a wireless device 4604 and/or the base station 4602. The capability of the wireless device 4604 regarding the time gap may be sent (e.g., transmitted) from the wireless device 4604 in a first RRC message comprising capability information of the wireless device 4604 (e.g., as a response to a second RRC message 4620 received from the base station 4602 requesting the capability information of the wireless device 4604).

Figure 47:
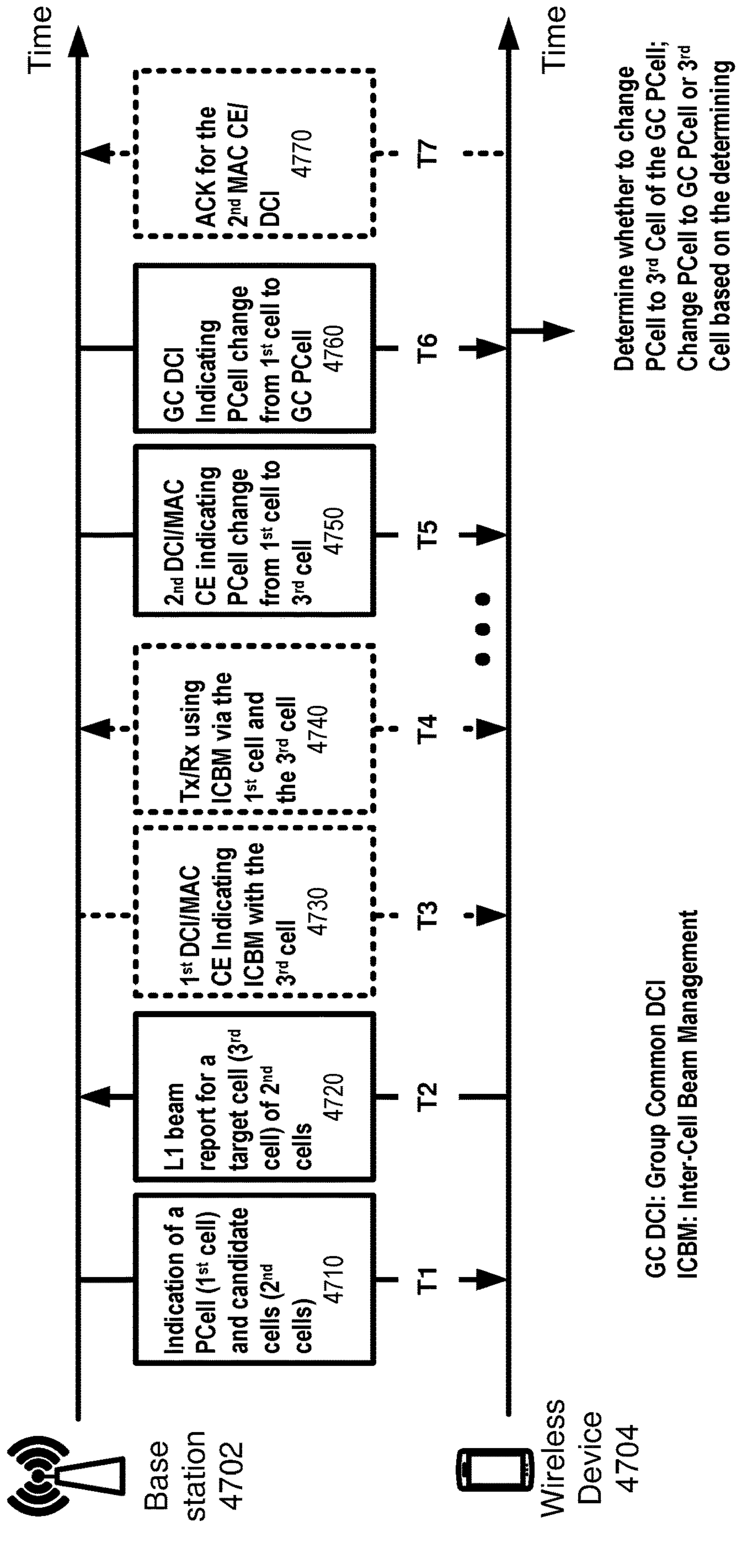
FIG. 47 shows an example of layer 1/2 signaling based HO procedure.

FIG. 47 shows an example embodiment of PCell changing. A base station 4702 may send (e.g., transmit), and/or a wireless device 4704 may receive, at T1, one or more RRC messages comprising configuration parameters comprising indication of a first cell (e.g., $1^{st}$ cell) as a PCell and a plurality of candidate target cells (e.g., $2^{nd}$ cells) 4710 (e.g., as described herein in FIG. 42). The plurality of candidate target cells may be used for layer 1/2 signaling based HO (e.g., PCell switching), with or without ICBM (e.g., as described herein in FIG. 42 and/or FIG. 43). A candidate target cell may be a configured serving cell or may be a neighbor and/or a non-serving cell (e.g., as described herein in FIG. 42 and/or FIG. 43).

A wireless device 4704 may send (e.g., transmit), at T2, a L1 beam and/or CSI report for one or more candidate target cells (e.g., $3^{rd}$ cell) of the plurality of candidate target cells ($2^{nd}$ cells) 4720, for example, based on a L1 beam and/or CSI report configuration. The wireless device 4704 may send (e.g., transmit) Li beam and/or CSI report for the $3^{rd}$ cell 4720, for example, based on the beam and/or CSI measurement of RSs (e.g., SSBs and/or CSI-RSs) of the $3^{rd}$ cell being greater than a reporting threshold, and/or the beam and/or CSI measurement of the RSs of the $3^{rd}$ cell being an offset greater than a beam and/or CSI measurement of the $1^{st}$ cell, etc.

A base station 4702 may send (e.g., transmit), at T3, a first command (e.g., $1^{st}$ DCI and/or MAC CE) 4730 that may indicate, enable, and/or activate an ICBM operation with a third/$3^{rd}$ cell for a first/$1^{st}$ cell, for example, based on receiving the L1 beam and/or CSI report for the $3^{rd}$ cell. The $1^{st}$ DCI and/or MAC CE may activate a first TCI state associated with a first RS sent (e.g., transmitted) from the $1^{st}$ cell and activate a second TCI state associated with a second RS sent (e.g., transmitted) from the $3^{rd}$ cell (e.g., as described herein in FIG. 37B).

A wireless device 4704 may apply an ICBM operation 4740 with a third/$3^{rd}$ cell for a first/$1^{st}$ cell (e.g., as described herein in FIG. 42 and/or FIG. 43). The wireless device 4704, starting from T4, may receive first downlink signal and/or channels with the first TCI state associated with the first RS sent (e.g., transmitted) from the $1^{st}$ cell and receive second downlink signals and/or channels with the second TCI state associated with the second RS sent (e.g., transmitted) from the $3^{rd}$ cell, for example, based on the ICBM operation 4740 on the $1^{st}$ cell and the $3^{rd}$ cell. The wireless device 4704, based on the ICBM operation 4740 on the $1^{st}$ cell and the $3^{rd}$ cell, starting from T4, may send (e.g., transmit) first uplink signal and/or channels with the first TCI state associated with the first RS sent (e.g., transmitted) from the $1^{st}$ cell and send (e.g., transmit) second uplink signals and/or channels with the second TCI state associated with the second RS sent (e.g., transmitted) from the $3^{rd}$ cell. The wireless device 4704 may maintains a first cell as a current PCell and determine the $3^{rd}$ cell as a neighbor and/or a non-serving cell, or as a part (e.g., a second TRP with a second PCI different from a first PCI of a first TRP) of the current PCell (e.g., as described herein in FIG. 42 and/or FIG. 43), for example, based on the ICBM operation 4740 being applied.

A base station 4702 may change, for example, by sending another DCI and/or MAC CE (not shown in FIG. 47), the $3^{rd}$ cell to a fourth/$4^{th}$ cell and/or a fifth/$5^{th}$ cell of the one or more candidate target cells (e.g., with periodical L1 beam and/or CSI reporting starting from T2) of the plurality of candidate target cells (e.g., $2^{nd}$ cells) for the ICBM operation for the $1^{st}$ cell.

An ICBM operation may not be configured, activated, and/or enabled, for example, if a base station 4702 and/or a wireless device 4704 do not support the ICBM operation. The actions and/or commands described for T3 and T4 may be absent.

A wireless device 4704 may receive, at T5, a second/$2^{nd}$ DCI and/or MAC CE 4750 indicating to change and/or switch a PCell from a first/$1^{st}$ cell to a third/$3^{rd}$ cell and/or one of one or more cells used in the ICBM operation starting from T4. The $2^{nd}$ DCI and/or MAC CE 4750 may be implemented as described herein in FIG. 42. The $3^{rd}$ cell may be different from any cell of the plurality of candidate target cells. The $3^{rd}$ cell may be one of the plurality of candidate target cells. The $3^{rd}$ cell may be one of the cells used in an ICMB operation (e.g., for the $1^{st}$ cell as the source and/or current PCell) starting from T3.

A wireless device 4704 may send (e.g., transmit), at T7, an acknowledgement 4770 to inform a base station 4702 of the reception of a 2nd DCI and/or MAC CE 4750 for a reliability requirement, for example, based on receiving, at T5, the 2nd DCI and/or MAC CE 4750 that may indicate a PCell changing and/or switching from a first/$1^{st}$ cell to a third/$3^{rd}$ cell (e.g., for mobility management). The wireless device 4704 may start to execute the PCell changing and/or switching from the $1^{st}$ cell to the $3^{rd}$ cell, for example, based on sending (e.g., transmitting) the acknowledgement 4771 corresponding to the 2nd DCI and/or MAC CE 4750. The wireless device 4704 may maintain the $1^{st}$ cell as the current PCell and may determine the $3^{rd}$ cell as a neighbor and/or non-serving cell, or as a part of the current PCell (e.g., as described herein in FIG. 42 and/or FIG. 43), for example, before sending (e.g., transmitting) the acknowledgement 4770.

A wireless device 4704 may receive GC DCI 4760 at T6, between T5 and T7, that may indicate a PCell changing and/or switching from a first/$1^{st}$ cell to a GC PCell (e.g., as described herein in FIG. 45A and/or FIG. 45B). The wireless device 4704 may determine to perform the PCell changing and/or switching from the $1^{st}$ cell to a third/$3^{rd}$ cell based on the 2nd DCI and/or MAC CE 4750 or to perform the PCell changing and/or switching from the $1^{st}$ cell to the GC PCell based on the GC DCI 4760, for example, based on receiving the GC DCI 4760 at T6.

A wireless device 4704 may determine to ignore a 2nd DCI and/or MAC CE 4750 and may proceed with GC DCI 4760, for example, based on receiving both the 2nd DCI and/or MAC CE 4750 and the GC DCI 4760, and based on the GC DCI 4760 being received after the reception of the 2nd DCI and/or MAC CE 4750 but before the transmission of the acknowledgement 4770 for the 2nd DCI and/or MAC CE, based on the GC DCI 4760 having a higher priority than the 2nd DCI and/or MAC CE 4750, and/or based on the GC DCI 4760 further indicating a network energy saving. Ignoring the 2nd DCI and/or MAC CE 4750 may comprise aborting a prepared PCell switching to a $3^{rd}$ cell, stopping preparation (e.g., loading RRC parameters of the $3^{rd}$ cell) of PCell changing and/or switching to the $3^{rd}$ cell, stopping, releasing and/or removing (e.g., from the variables stored in the memory of the wireless device 4704) RRC parameters of a plurality of candidate target cells, skipping sending (e.g., transmitting) the acknowledgement 4770 for the 2nd DCI and/or MAC CE, etc. Proceeding with the GC DCI 4760 may comprise starting to change and/or switch the PCell from the $1^{st}$ cell to the GC PCell. The changing and/or switching the PCell from the $1^{st}$ cell to the GC PCell may be as described herein in FIG. 45A and/or FIG. 45B.

A wireless device 4704 may determine to ignore GC DCI 4760 and may proceed with a 2nd DCI and/or MAC CE 4750, for example, based on receiving both the 2nd DCI and/or MAC CE 4750 and the GC DCI 4760, and based on the 2nd DCI and/or MAC CE 4750 having a higher priority than the GC DCI 4760 due to the 2nd DCI and/or MAC CE 4750 being dedicatedly sent (e.g., transmitted) to the wireless device 4704 rather than the GC DCI 4760 being sent (e.g., transmitted) to a plurality of wireless devices and not specifically to the wireless device 4704. Ignoring the GC DCI 4760 may comprise aborting a PCell switching to the GC PCell, and/or not deactivating one or more SCells belonging to an MCG associated with the $1^{st}$ cell, etc. The proceeding with the 2nd DCI and/or MAC CE 4750 may comprise sending (e.g., transmitting) the acknowledgement 4770 for the 2nd DCI and/or MAC CE and starting to change and/or switch the PCell from the $1^{st}$ cell to the $3^{rd}$ cell. Changing and/or switching the PCell from the $1^{st}$ cell to the $3^{rd}$ cell may be implemented as described herein in FIG. 42.

A wireless device 4704 may prioritize DCI and/or MAC CE based PCell switching (e.g., for mobility as described herein in FIG. 42) or GC DCI 4760 based PCell switching (e.g., for network energy as described herein in FIG. 45A and/or FIG. 45B), for example, based on one or more criteria defined and/or configured to be known by both the base station 4702 and the wireless device 4704. Ambiguity of PCell switching between a base station 4702 and a wireless device 4704 may be reduced, for example, if multiple PCell switching indications are received. PCell switching latency may be improved and/or power consumption of the wireless device 4704 reduced. Energy consumption of the base station 4702 may be reduced, for example, by allowing the base station 4702 to quickly turn off the old PCell, if the wireless device 4704 completes the PCell switching from the old PCell to a new PCell.

FIG. 45A/45B and FIG. 47 may be combined to further improve latency and network energy consumption. A wireless device 4704 may determine to perform a PCell switching from a first/$1^{st}$ cell to a third/$3^{rd}$ cell or to perform the PCell switching from the $1^{st}$ cell to a GC PCell, for example, based on receiving 2nd DCI and/or MAC CE 4750 indicating the PCell switching from the $1^{st}$ cell to the $3^{rd}$ cell and receiving GC DCI 4760 indicating the PCell switching to the GC PCell, and based on the $3^{rd}$ cell and/or the $1^{st}$ cell being identical to the GC PCell.

A wireless device 4704 may perform PCell switching from a first/$1^{st}$ cell to a third/$3^{rd}$ cell, based on 2nd DCI and/or MAC CE 4750 and the wireless device 4704 may ignore GC DCI 4760 for example, based on the $3^{rd}$ cell being same as the GC PCell. The PCell switching from the $1^{st}$ cell to the $3^{rd}$ cell may be as described herein in FIG. 42.

A wireless device 4704 may perform PCell switching from a first/$1^{st}$ cell to a GC PCell based on GC DCI 4760 and may ignore 2nd DCI and/or MAC CE 4750, for example, based on a third/$3^{rd}$ cell being different from the GC PCell. The PCell switching from the $1^{st}$ cell to the GC PCell may be as described herein in FIG. 45A and/or FIG. 45B.

A wireless device 4704 may perform PCell switching from a first/$1^{st}$ cell to a third/$3^{rd}$ cell based on $2^{nd}$ DCI and/or MAC CE 4750 and ignore GC DCI 4760, for example, based on the $3^{rd}$ cell being different from the GC PCell. The PCell switching from the $1^{st}$ cell to the $3^{rd}$ cell may be as described herein in FIG. 42.

Alternatively, a wireless device 4704 may perform PCell switching from a first/$1^{st}$ cell to a third/$3^{rd}$ cell based on 2nd DCI and/or MAC CE 4750 and ignore GC DCI 4760, for example, based on the 1st cell being identical to a GC PCell and the 3rd cell being different from the GC PCell. The PCell switching from the 1st cell to the 3rd cell may be as described herein in FIG. 42.

By implementing examples as described herein in FIG. 45A and/or FIG. 45B and FIG. 47, a wireless device 4704 may determine to perform wireless device-specific DCI and/or MAC CE triggered PCell switching or to perform GC DCI 4760 triggered PCell switching to a GC PCell, and/or the wireless device 4704 may determine to ignore the wireless device-specific DCI and/or MAC CE or ignore the GC DCI 4760, for example, based on whether a target PCell indicated by the wireless device-specific DCI and/or MAC CE is identical to the GC PCell and/or the current (e.g., source) PCell is identical to the GC PCell. Latency of handover for mobility may be reduced, redundant PCell switching may be reduced, and a base station 4702 may turn off SCells and maintain a GC PCell for network energy saving for a plurality of wireless devices.

A wireless device 4704 may determine to proceed with GC DCI 4760 after receiving DCI and/or MAC CE, for example, based on a time gap between a first time of the reception of the DCI and/or MAC CE and a second time of the reception of the GC DCI 4760, or based on a time gap between a first time of a transmission of the acknowledgement for the DCI and/or MAC CE and a second time of the reception of the GC DCI 4760 (e.g., if the second time occurs after the first time).

A wireless device 4704 may complete PCell switching to a target PCell based on DCI and/or MAC CE and the wireless device 4704 may continue the PCell switching to a GC PCell based on the GC DCI 4760, for example, based on a time gap being greater than and/or equal to a configured, defined, and/or predefined time threshold (e.g., configured in the RRC messages). A wireless device 4704 may complete the PCell switching to a target PCell based on the DCI and/or MAC CE and ignore the GC DCI 4760 indicating the PCell switching to a GC PCell, for example, based on the time gap being less than a configured, defined, and/or predefined time threshold. The time threshold for processing PCell switching indication may be configured and/or preconfigured based on a capability of a wireless device 4704 and/or the base station 4702. The capability of the wireless device 4704 regarding the time threshold may be sent (e.g., transmitted) from the wireless device 4704 in a first RRC message comprising capability information of the wireless device 4704 (e.g., as a response to a second RRC message received from the base station 4702 requesting the capability information of the wireless device 4704). Defining, configuring, and/or preconfiguring a time threshold for processing PCell switching may avoid frequent PCell switching and reduce implementation complexity of the wireless device 4704, for example, if receiving multiple PCell switching indications (e.g., DCI and/or MAC CE, GC DCI, etc.).

A base station 4702 may avoid sending (e.g., transmitting) two, contiguous, PCell switching indications (e.g., a first DCI and/or MAC CE indicating PCell switching to a first cell, a second DCI and/or MAC CE indicating PCell switching to a second cell, etc.) within a time gap and/or threshold which may be configured and/or preconfigured based on a capability of a wireless device 4704 and/or the base station 4702. The wireless device 4704 may not expect the base station 4702 to send (e.g., transmit) two, contiguous, PCell switching indications within the time gap and/or threshold. The capability of the wireless device 4704 regarding the time gap and/or threshold may be sent (e.g., transmitted) from the wireless device 4704 in a first RRC message comprising capability information of the wireless device 4704 (e.g., as a response to a second RRC message received from the base station 4702 requesting the capability information of the wireless device 4704).

A wireless device 4704 may receive a first RRC message comprising configuration parameters of a first cell as a PCell. The wireless device 4704 may receive a second RRC message comprising: configuration parameters of a second cell as a candidate cell for a CHO procedure, and a condition for executing the CHO procedure that may comprise changing the PCell from the first cell to the second cell. The wireless device 4704 may evaluate the condition of the second cell for executing the CHO procedure. The wireless device 4704 may receive GC DCI 4760 that may indicate to change the PCell from the first cell to a GC PCell for a plurality of wireless devices that may comprise the wireless device 4704. The wireless device 4704 may determine to change the PCell from the first cell to the GC PCell or continue evaluating the condition of the second cell for executing the CHO procedure changing the PCell from the first cell to the second cell, for example, based on receiving the GC DCI 4760.

A wireless device may receive GC DCI before a condition may be satisfied on a second cell. A wireless device may receive GC DCI before a wireless device executes a CHO procedure comprising changing a PCell from a first cell to a second cell based on a condition being satisfied on the second cell based on the evaluating.

A wireless device may determine, based on a first priority of changing a PCell to a GC PCell and a second priority of changing the PCell to a second cell, to change the PCell from a first cell to the GC PCell or continue evaluating the condition of the second cell. A wireless device may change a PCell from a first cell to a GC PCell based on receiving GC DCI. The wireless device may change the PCell from the first cell to the GC PCell based on a first priority being higher than a second priority.

Changing a PCell to a GC PCell may comprise at least one of: applying configuration parameters of the GC PCell, receiving downlink signals and/or channels from the GC PCell, skipping performing a RA procedure to the GC PCell and/or sending (e.g., transmitting) uplink signals and/or channels via the GC PCell. Changing a PCell to a GC PCell may comprise releasing configuration parameters of a first cell. Changing a PCell to a GC PCell may comprise changing a first cell as a secondary cell. Changing a PCell to a GC PCell may comprise deactivating a first cell as a secondary cell in a deactivated state. Changing a PCell to a GC PCell may comprise transitioning a first cell as a secondary cell in a dormancy.

A wireless device may, based on changing a PCell from a first cell to a GC PCell, stop evaluating a condition of a second cell for executing a CHO procedure. A wireless device may, based on changing a PCell from a first cell to a GC PCell, release configuration parameters of a second cell for a CHO procedure. A wireless device may continue evaluating a condition of a second cell based on completing a changing a PCell from a first cell to a GC PCell.

A wireless device may maintain configuration parameters of a second cell for a CHO. A wireless device may change a PCell from a GC PCell to a second cell based on a condition being met on the second cell. Changing a PCell to a second cell may comprise at least one of: applying configuration parameters of the second cell, performing downlink synchronization to the second cell, receiving system information from the second cell, and/or performing random access procedure via the second cell.

A wireless device may determine, based on a first cell that may be identical to a GC PCell, to change a PCell from the first cell to the GC PCell or continue evaluating a condition of a second cell. The wireless device may continue evaluating the condition of the second cell and ignore the GC DCI based on the first cell being identical to the GC PCell. The wireless device may change the PCell from the first cell to the GC PCell based on receiving the GC DCI, and based on the first cell being different from the GC PCell. The wireless device may stop, based on changing the PCell to the GC PCell, evaluating the condition of the second cell.

A wireless device may determine, to change a PCell from a first cell to a GC PCell or continue evaluating a condition of a second cell, based on the first cell being identical to the GC PCell and/or an active BWP of the first cell being identical to a first active BWP of the GC PCell. The wireless device may continue evaluating the condition of the second cell and ignore GC DCI based on the first cell being identical to the GC PCell and the active BWP of the first cell being identical to the first active BWP of the GC PCell. The wireless device may continue evaluating the condition of the second cell, may maintain the first cell as the PCell and/or may switch the active BWP of the first cell to the first active BWP on the first cell based on the first cell being identical to the GC PCell and the active BWP of the first cell being different from the first active BWP of the GC PCell.

A second message may indicate a condition for executing CHO on a second cell as a threshold. The threshold may comprise at least one of a first value of RSRP and a value of RSRQ. The condition being satisfied for executing the CHO may comprise at least one of: a RSRP value obtained on reference signals of the second cell being greater than the first value and a RSRQ value obtained on the reference signals of the second cell being greater than the second value.

A wireless device may receive the GC DCI if a second condition of a third cell may be satisfied, wherein a second message may further comprise: a second configuration parameter of the third cell as a second candidate cell for the CHO; and the second condition for executing the CHO on the third cell. A wireless device may select a GC PCell from the GC PCell and a third cell for the PCell changing based on a second condition of the third cell being satisfied and receiving GC DCI. The wireless device may change the PCell to the GC PCell based on the selecting the GC PCell for the PCell changing. A wireless device may select a third cell from a GC PCell and a third cell for a PCell changing and/or ignore GC DCI based on: a second condition of the third cell being satisfied and receiving the GC DCI. The wireless device may change the PCell to the third cell based on the selecting the third cell for the PCell changing.

A wireless device may receive a first RRC message comprising configuration parameters of a first cell as a PCell. The wireless device may receive a second RRC message comprising and/or indicating configuration parameters of a second cell as a candidate cell for a CHO procedure and a condition for executing the CHO that may comprise changing the PCell from the first cell to the second cell. The wireless device may evaluate the condition of the second cell for executing the CHO procedure changing the PCell from the first cell to the second cell. The wireless device may receive a MAC CE that may indicate to change the PCell from the first cell to a third cell. The wireless device may determine, based on receiving the MAC CE, to change the PCell from the first cell to the third cell or continue evaluating the condition of the second cell. A wireless device may receive a MAC CE before a condition may be satisfied on a second cell.

A wireless device may change a PCell from a first cell to a third cell and abort a CHO procedure, that may comprise evaluating the condition of the second cell based on receiving the MAC CE. A wireless device may change a PCell from a first cell to a second cell and ignore a MAC CE based on a condition being satisfied on the second cell.

A wireless device may receive a first RRC message comprising configuration parameters of a first cell as a PCell. The wireless device may receive a second RRC message comprising and/or indicating configuration parameters of a second cell as a candidate cell for a CHO procedure and a condition for executing the CHO that may comprise changing the PCell from the first cell to the second cell. The wireless device may evaluate the condition of the second cell for the CHO. The wireless device may receive, before the conditions are satisfied, DCI that may indicate to change the PCell from the first cell to a third cell. The wireless device may determine, based on receiving the DCI, to change the PCell from the first cell to the third cell or continue evaluating the condition of the second cell.

DCI may be a wireless device specific DCI addressed to the wireless device and with CRC scrambled by a C-RNTI identifying the wireless device. A wireless device may change the PCell from a first cell to a third cell and abort a CHO procedure, that may comprise evaluating the condition of the second cell, based on receiving DCI. A wireless device may change a PCell from a first cell to a second cell and ignore a DCI based on a condition being satisfied on the second cell.

A wireless device may receive a first RRC message comprising configuration parameters of a first cell as a PCell. The wireless device may receive a second RRC message that may indicate configuration parameters of a second cell as a GC PCell. The wireless device may receive GC DCI that may indicate to change the PCell from the first cell to the GC PCell for a plurality of wireless devices comprising the wireless device. The wireless device may determine to ignore the GC DCI based on the second cell being identical to the first cell.

A wireless device may change a PCell to a GC PCell based on a second cell being different from a first cell. The wireless device may activate a first active BWP of the GC PCell based on changing the PCell to the GC PCell. A wireless device may ignore GC DCI by maintaining a first cell as a PCell based on a second cell being same as the first cell. A wireless device may further determine to ignore GC DCI based on: a first cell being identical to a GC PCell and an active BWP of the first cell being identical to a first active BWP of the GC PCell.

A wireless device may maintain a first cell as a PCell and switch from an active BWP of the first cell to a first active BWP based on: the first cell being identical to the GC PCell and the active BWP of the first cell being different from the first active BWP of the GC PCell. A wireless device may ignore GC DCI by maintaining a first cell as a PCell and may maintain an active BWP of the first cell based on the first cell being identical to a GC PCell and the active BWP of the first cell being identical to a first active BWP of the GC PCell.

A wireless device may receive a RRC message that may comprise configuration parameters of a first cell as a PCell and a second cell as a candidate target cell. The wireless device may receive a first command indicating to change the PCell from the first cell to the second cell. The wireless device may receive, before sending (e.g., transmitting) an acknowledge corresponding to the first command, GC DCI that may indicate to change the PCell from the first cell to a group common PCell for a plurality of wireless devices comprising the wireless device. The wireless device may determine, based on receiving the GC DCI, to change the PCell from the first cell to the GC PCell or change the PCell from the first cell to the second cell. A first cell may be identified by a first PCI and a second cell may be identified by a second PCI, wherein the second PCI may be different from the first PCI.

A second cell may be configured as a non-serving cell, before receiving a first command. A wireless device may not receive downlink signals and/or channels comprising reference signals configured in the configuration parameters of the second cell based on the second cell being the non-serving cell. A second cell may be configured as a secondary cell, before receiving a first command. A wireless device may receive downlink signals and/or channels via the second cell and/or send (e.g., transmit) uplink signals and/or channels via the second cell, based on the second cell being the secondary cell. A first command may comprise wireless device specific DCI addressed to the wireless device and/or a MAC CE.

A wireless device may send (e.g., transmit) a layer 1 channel state information (CSI) report comprising: indications of one or more SSBs and/or CSI-RSs of the second cell and layer 1 RSRP values, of the one or more SSBs and/or CSI-RSs, that may be greater than a RSRP threshold. A wireless device may receive a second command indicating and/or activating an inter-cell beam management (ICBM) with a second cell. The wireless device may receive downlink signals and/or channels from a first cell and/or may send (e.g., transmit) uplink signals and/or channels via the first cell based on at least one of a first TCI state associated with a first RS of the first cell and a second TCI state associated with a second RS of the second cell, based on the ICBM being indicated and/or activated with the second cell.

A wireless device may determine, based on a first priority of a change to a GC PCell and a second priority of a change to a second cell, to change a PCell from a first cell to the GC PCell or change the PCell from the first cell to the second cell. A wireless device may change a PCell from a first cell to a GC PCell and may abort changing the PCell from the first cell to a second cell based on receiving GC DCI. The wireless device may change the PCell from the first cell to the GC PCell and may abort changing the PCell from the first cell to the second cell based on the first priority being greater (e.g., higher) than the second priority. A wireless device may drop sending (e.g., transmitting) an acknowledgement corresponding to a first command based on changing a PCell from a first cell to a GC PCell.

A wireless device may ignore GC DCI by aborting changing a PCell from a first cell to a GC PCell. The wireless device may ignore the GC DCI based on a first priority being lower (e.g., less) than a second priority. The wireless device may send (e.g., transmit) the acknowledgement corresponding to the first command. The wireless device may change, after sending (e.g., transmitting) the acknowledgement, the PCell from the first cell to the second cell.

A wireless device may perform a method comprising multiple operations. The wireless device may receive a first message comprising at least one configuration parameter of a first cell as a primary cell (PCell). The wireless device may receive a second message comprising: at least one configuration parameter of a second cell, as a candidate cell, for a conditional handover (CHO); and a condition for the CHO. The wireless device may receive a layer 1 or layer 2 signaling comprising an indication to switch the PCell from the first cell to a third cell. The wireless device may determine, based on the condition for the CHO and based on the receiving the layer 1 or layer 2 signaling, whether to switch the PCell from the first cell to the third cell. The wireless device may, for example, based on the determining whether to switch the PCell from the first cell to the third cell, perform one of: switching the PCell from the first cell to the third cell, if the condition for the CHO indicates a priority for the CHO that may be less than a priority for switching to the third cell; or switching the PCell from the first cell to the second cell, if the condition for the CHO indicates a priority for the CHO that may be greater than a priority for switching to the third cell. The determining whether to switch the PCell from the first cell to the third cell may be further based on the first cell being the same as the third cell. The wireless device may perform at least one of: switching the PCell from the first cell to the third cell; or determining not to perform a handover indicated by the layer 1 or layer 2 signaling. The layer 1 or layer 2 signaling may comprise a MAC CE indicating a layer 1 or layer 2 triggered handover. The condition for the CHO may be based on at least one of: a value of reference signal received power (RSRP); or a value of reference signal received quality (RSRQ). The wireless device may switch the PCell, from the first cell to the second cell, based on at least one of: the first cell being the same as the second cell; or an active bandwidth part (BWP) of the first cell being the same as an active BWP of the second cell. The wireless device may switch the PCell from the first cell to the third cell. The wireless device may release the at least one configuration parameter of the first cell. The wireless device may release the at least one configuration parameter of the second cell. The wireless device may switch the PCell from the first cell to the third cell. The wireless device may stop an evaluation of the second cell for the CHO. The second message may further comprise a first priority value associated with the CHO, and the receiving the layer 1 or layer 2 signaling may be based on the first priority value being less than a threshold value. The determining whether to switch the PCell from the first cell to the third cell may be further based on at least one of: the first cell being different from the third cell; or an active bandwidth part (BWP) of the first cell being different from an active BWP of the third cell. The wireless device may switch the PCell from the first cell to the second cell. The wireless device may release the at least one configuration parameter of the first cell. The wireless device may switch the PCell from the first cell to the second cell. The wireless device may stop an evaluation of the third cell for a handover. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

A wireless device may perform a method comprising multiple operations. The wireless device may receive a first message comprising at least one configuration parameter of a first cell as a primary cell (PCell). The wireless device may receive a second message comprising: at least one configuration parameter of a second cell, as a candidate cell, for a conditional handover (CHO); and a first priority value associated with the CHO. The wireless device may receive a layer 1 or layer 2 signaling comprising: an indication to switch the PCell from the first cell to a third cell; and a second priority value associated with the layer 1 or layer 2 signaling. The wireless device may switch the PCell from the first cell to the third cell. The switching may be based on the second priority value being greater than the first priority value. The wireless device may release the at least one configuration parameter of the first cell and/or may release the at least one configuration parameter of the second cell, based on the switching the PCell from the first cell to the third cell. The wireless device may stop, based on the switching the PCell from the first cell to the third cell, an evaluation of the second cell for the CHO. The wireless device may determine, based on the switching the PCell from the first cell to the third cell, not to perform the CHO. The receiving the layer 1 or layer 2 signaling may be based on the first priority value being less than a threshold value. The second message may comprise a condition for the CHO, and the condition may be based on at least one of: a value of reference signal received power (RSRP); or a value of reference signal received quality (RSRQ). The switching the PCell from the first cell to the third cell may be further based on at least one of: the first cell being different from the third cell; or an active bandwidth part (BWP) of the first cell being different from an active BWP of the third cell. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

A wireless device may perform a method comprising multiple operations. The wireless device may receive a first message comprising at least one configuration parameter of a first cell as a primary cell (PCell). The wireless device may receive a second message comprising: at least one configuration parameter of a second cell, as a candidate cell, for a conditional handover (CHO); and a first priority value associated with the CHO. The wireless device may receive a layer 1 or layer 2 signaling comprising: an indication to change the PCell from the first cell to a third cell; and a second priority value associated with the layer 1 or layer 2 signaling. The wireless device may switch the PCell from the first cell to the second cell, and the switching may be based on the first priority value being greater than the second priority value. The wireless device may release the at least one configuration parameter of the first cell based on the switching the PCell from the first cell to the second cell. The wireless device may stop, based on the switching the PCell from the first cell to the second cell, an evaluation of the third cell for a handover. The wireless device may determine, based on the switching the PCell from the first cell to the second cell, not to perform a handover indicated by the layer 1 or layer 2 signaling. The receiving the layer 1 or layer 2 signaling may be based on the first priority value being less than a threshold value. The second message may comprise a condition for the CHO, and the condition may be based on at least one of: a value of reference signal received power (RSRP); or a value of reference signal received quality (RSRQ). The switching the PCell from the first cell to the second cell may be further based on at least one of: the first cell being the same as the second cell; or an active bandwidth part (BWP) of the first cell being the same as an active BWP of the second cell. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

A wireless device may perform a method comprising multiple operations. The wireless device may receive a first message comprising configuration parameters of a first cell as a primary cell (PCell). The wireless device may receive a second message indicating: configuration parameters of a second cell as a candidate cell for conditional handover (CHO); and a condition for executing the CHO comprising changing the PCell from the first cell to the second cell. The wireless device may evaluate the condition on the second cell for executing the CHO. The wireless device may receive a group common (GC) downlink control information (DCI) indicating to change the PCell from the first cell to a GC PCell for a plurality of wireless devices comprising the wireless device. The wireless device may change the PCell from the first cell to the GC PCell, based on the receiving the GC DCI having a higher priority than the evaluating the condition for executing the CHO. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

A wireless device may perform a method comprising multiple operations. The wireless device may receive a first message comprising configuration parameters of a first cell as a primary cell (PCell). The wireless device may receive a second message indicating: configuration parameters of a second cell as a candidate cell for conditional handover (CHO); and a condition for executing the CHO comprising changing the PCell from the first cell to the second cell. The wireless device may evaluate the condition on the second cell for executing the CHO. The wireless device may receive a group common (GC) downlink control information (DCI) indicating to change the PCell from the first cell to a GC PCell for a plurality of wireless devices comprising the wireless device. The wireless device may determine, for example, based on (e.g., in response to) receiving the GC DCI, whether to change the PCell from the first cell to the GC PCell or continue evaluating the condition on the second cell. The wireless device may receive the GC DCI before the condition may be satisfied. The wireless device may determine, based on a first priority of changing the PCell to the GC PCell and a second priority of changing the PCell to the second cell, whether to change the PCell from the first cell to the GC PCell or continue evaluating the condition on the second cell. The wireless device may change the PCell from the first cell to the GC PCell, for example, based on (e.g., in response to) the first priority being higher than the second priority. The changing the PCell to the GC PCell may comprise at least one of: applying the configuration parameters of the GC PCell; receiving downlink signals from the GC PCell; skipping performing a random access procedure to the GC PCell; and/or transmitting uplink signals via the GC PCell. The wireless device may release configuration parameters of the first cell. The wireless device may change the first cell as a secondary cell. The wireless device may deactivate the first cell as a secondary cell in a deactivated state. The wireless device may transition the first cell as a secondary cell in a dormancy. The wireless device may stop evaluating the condition on the second cell. The wireless device may release the configuration parameters of the second cell for the CHO. The wireless device may continue the evaluating the condition on the second cell after completing the changing the PCell from the first cell to the GC PCell. The wireless device may maintain the configuration parameters of the second cell for the CHO. The wireless device may change the PCell from the GC PCell to the second cell, for example, based on (e.g., in response to) the condition being met on the second cell. The changing the PCell to the second cell may comprise at least one of: applying the configuration parameters of the second cell; performing downlink synchronization to the second cell; receiving system information from the second cell; and/or performing random access procedure via the second cell. The wireless device may determine, based on whether the first cell may be same as the GC PCell, whether to change the PCell from the first cell to the GC PCell or continue evaluating the condition on the second cell. The wireless device may continue evaluating the condition on the second cell and ignoring the GC DCI, for example, based on (e.g., in response to) the first cell being same as the GC PCell. The wireless device may change the PCell from the first cell to the GC PCell, for example, based on (e.g., in response to) the first cell being different from the GC PCell. The wireless device may stop evaluating the condition on the second cell. The wireless device may determine, whether to change the PCell from the first cell to the GC PCell or continue evaluating the condition on the second cell, based on: whether the first cell may be same as the GC PCell; and whether an active bandwidth part (BWP) of the first cell may be same as a first active BWP of the GC PCell. The wireless device may continue evaluating the condition on the second cell and ignoring the GC DCI based on (e.g., in response to): the first cell being same as the GC PCell; and the active BWP of the first cell being same as the first active BWP of the GC PCell. The wireless device may continue evaluating the condition on the second cell, maintaining the first cell as the PCell and switching the active BWP of the first cell to the first active BWP on the first cell based on (e.g., in response to) the first cell being same as the GC PCell; and the active BWP of the first cell being different from the first active BWP of the GC PCell. The second message may indicate the condition for executing CHO on the second cell as a threshold. The threshold may comprise at least one of: a first value of reference signal received power (RSRP); and a value of reference signal received quality (RSRQ). The condition being satisfied for executing the CHO may comprise at least one of: a RSRP value obtained on reference signals of the second cell being greater than the first value; and a RSRQ value obtained on the reference signals of the second cell being greater than the second value. The wireless device may receive the GC DCI, for example, when a second condition of a third cell may be met. The second message may further comprise: second configuration parameter of the third cell as a second candidate cell for the CHO; and the second condition for executing the CHO on the third cell. The wireless device may select the GC PCell from the GC PCell and the third cell for the PCell changing, based on (e.g., in response to): the second condition of the third cell being satisfied; and receiving the GC DCI. The wireless device may change the PCell to the GC PCell based on the selecting the GC PCell for the PCell changing. The wireless device may select the third cell from the GC PCell and the third cell for the PCell changing based on (e.g., in response to): the second condition of the third cell being satisfied; and receiving the GC DCI. The wireless device may change the PCell to the third cell based on the selecting the third cell for the PCell changing. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

A wireless device may perform a method comprising multiple operations. The wireless device may receive a first message comprising configuration parameters of a first cell as a primary cell (PCell). The wireless device may receive a second message indicating: configuration parameters of a second cell as a candidate cell for conditional handover (CHO); and a condition for executing the CHO comprising changing the PCell from the first cell to the second cell. The wireless device may evaluate the condition on the second cell for the CHO. The wireless device may receive, before the condition are satisfied, a medium access control control element (MAC CE) indicating to change the PCell from the first cell to a third cell. The wireless device may determine, for example, based on (e.g., in response to) receiving the MAC CE, whether to change the PCell from the first cell to the third cell or continue evaluating the condition on the second cell. A wireless device may receive a first message comprising configuration parameters of a first cell as a primary cell (PCell). The wireless device may receive a second message indicating: configuration parameters of a second cell as a candidate cell for conditional handover (CHO); and a condition for executing the CHO comprising changing the PCell from the first cell to the second cell. The wireless device may evaluate the condition on the second cell for the CHO. The wireless device may receive, before the condition are satisfied, a downlink control information indicating to change the PCell from the first cell to a third cell. The wireless device may determine, for example, based on (e.g., in response to) receiving the downlink control information, whether to change the PCell from the first cell to the third cell or continue evaluating the condition on the second cell. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

A wireless device may perform a method comprising multiple operations. The wireless device may receive a first message comprising configuration parameters of a first cell as a primary cell (PCell). The wireless device may receive a second message indicating configuration parameters of a second cell as a group common (GC) PCell. The wireless device may receive a GC downlink control information (DCI) indicating to change the PCell from the first cell to the GC PCell for a plurality of wireless devices comprising the wireless device. The wireless device may determine whether to ignore the GC DCI based on whether the second cell may be same as the first cell. The wireless device may change the PCell to the GC PCell, for example, based on (e.g., in response to) the second cell being different from the first cell. The wireless device may activate a first active BWP of the GC PCell based on changing the PCell to the GC PCell. The wireless device may ignore the GC DCI by maintaining the first cell as the PCell, for example, based on (e.g., in response to) the second cell being same as the first cell. The wireless device may further determine whether to ignore the GC DCI based on: whether the first cell may be same as the GC PCell; and whether an active BWP of the first cell may be same as a first active BWP of the GC PCell. The wireless device may maintain the first cell as the PCell and may switch from the active BWP of the first cell to the first active BWP, for example, based on (e.g., in response to): the first cell being same as the GC PCell; and the active BWP of the first cell being different from the first active BWP of the GC PCell. The wireless device may ignore the GC DCI by maintaining the first cell as the PCell and maintaining the active BWP of the first cell, for example, based on (e.g., in response to): the first cell being same as the GC PCell; and the active BWP of the first cell being same as the first active BWP of the GC PCell. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

A wireless device may perform a method comprising multiple operations. The wireless device may receive a message comprising configuration parameters of a first cell as a primary cell (PCell) and a second cell as a candidate target cell. The wireless device may receive, a first command indicating to change the PCell from the first cell to the second cell. The wireless device may receive, before transmitting an acknowledge corresponding to the first command, a group common downlink control information (DCI) indicating to change the PCell from the first cell to the group common PCell for a plurality of wireless devices comprising the wireless device. The wireless device may determine, for example, based on (e.g., in response to) receiving the group common DCI, whether to change the PCell from the first cell to the GC PCell or change the PCell from the first cell to the second cell. The first cell may be identified by a first physical cell index (PCI) and the second cell may be identified by a second PCI. The second PCI may be different from the first PCI. The second cell may be a non-serving cell, before receiving the first command. The wireless device may not receive downlink signals or channels expect reference signals configured in the configuration parameters of the second cell, based on the second cell being the non-serving cell. The second cell may be a secondary cell, before receiving the first command. The wireless device may receive downlink signals or channels via the second cell and/or transmits uplink signals or channel via the second cell, based on the second cell being the secondary cell. The first command may comprise at least one of: a wireless device specific DCI addressed to the wireless device; and a medium access control control element (MAC CE). The transmitting layer 1 channel state information (CSI) report may comprise: indications of one or more reference signals of the second cell; and layer 1 reference signal received power (RSRP) values, of the one or more reference signals, being greater than a RSRP threshold. The wireless device may receive a second command indicating/activating an inter-cell beam management (ICBM) with the second cell. The wireless device may, for example, based on the ICBM being indicated/activated with the second cell, receive downlink signals from the first cell and/or transmitting uplink signals via the first cell based on at least one of: a first transmission configuration indication (TCI) state associated with a first RS of the first cell; and a second TCI state associated with a second RS of the second cell. The wireless device may determine, based on a first priority of the change to the GC PCell and a second priority of the change to the second cell, whether to change the PCell from the first cell to the GC PCell or change the PCell from the first cell to the second cell. The wireless device may change the PCell from the first cell to the GC PCell and may abort the changing the PCell from the first cell to the second cell, for example, based on (e.g., in response to) the first priority being higher than the second priority. The wireless device may drop the transmitting the acknowledgement corresponding to the first command, for example, based on (e.g., in response to) changing the PCell from the first cell to the GC PCell. The wireless device may ignore the GC DCI by aborting the changing the PCell from the first cell to the GC PCell, for example, based on (e.g., in response to) the first priority being lower than the second priority. The wireless device may transmit the acknowledgement corresponding to the first command. The wireless device may change, after transmitting the acknowledgement, the PCell from the first cell to the second cell. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with one or more wireless devices. A computer-readable medium may store instructions that, when executed, cause performance of the described method, additional operations, and/or include additional elements. A base station may perform a corresponding method comprising multiple operations.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:

receiving, by a wireless device, a first configuration parameter of a first cell as a primary cell (PCell);

receiving a second configuration parameter of a conditional handover (CHO) execution condition for executing a CHO procedure for switching to a second cell;

receiving a medium access control control element (MAC CE) comprising an indication to switch the PCell from the first cell to a third cell; and based on receiving the MAC CE and before the CHO execution condition is satisfied, switching the PCell from the first cell to the third cell.

2. The method of claim 1, wherein the MAC CE indicates a layer 2 triggered handover.

3. The method of claim 1, wherein the CHO execution condition is based on at least one of:

a value of reference signal received power (RSRP); or a value of reference signal received quality (RSRQ).

4. The method of claim 1, further comprising:

stopping an evaluation of the second cell for the CHO.

5. The method of claim 1, further comprising:

receiving third configuration parameters of the third cell of a layer 1 or 2 triggered mobility.

6. The method of claim 1, further comprising:

performing conditional reconfiguration evaluation for executing the CHO procedure for the second cell.

7. The method of claim 1, wherein the receiving the first configuration parameter and the receiving the second configuration parameter comprises receiving a radio resource configuration (RRC) message comprising the first parameter and the second parameter.

8. A wireless device, comprising:

one or more processors; and memory storing instructions that, when executed by the one or more processors, configure the wireless device to:

receive a first configuration parameter of a first cell as a primary cell (PCell);

receive a second configuration parameter of a conditional handover (CHO) execution condition for executing a CHO procedure for switching to a second cell;

receive a medium access control control element (MAC CE) comprising an indication to switch the PCell from the first cell to a third cell; and based on receiving the MAC CE and before the CHO execution condition is satisfied, switch the PCell from the first cell to the third cell.

9. The wireless device of claim 8, wherein the MAC CE indicates a layer 2 triggered handover.

10. The wireless device of claim 8, wherein the CHO execution condition is based on at least one of:

a value of reference signal received power (RSRP); or a value of reference signal received quality (RSRQ).

11. The wireless device of claim 8, wherein the instructions, when executed by the one or more processors, further configure the wireless device to stop an evaluation of the second cell for the CHO.

12. The wireless device of claim 8, wherein the instructions, when executed by the one or more processors, further configure the wireless device to receive third configuration parameters of the third cell of a layer 1 or 2 triggered mobility.

13. The wireless device of claim 8, wherein the instructions, when executed by the one or more processors, further configure the wireless device to perform conditional reconfiguration evaluation for executing the CHO procedure for the second cell.

14. The wireless device of claim 8, wherein the instructions, when executed by the one or more processors, further configure the wireless device to receive the first configuration parameter and receive the second configuration parameter by receiving a radio resource configuration (RRC) message comprising the first parameter and the second parameter.

15. One or more non-transitory computer-readable media storing instructions that, when executed, configure a wireless device to:

receive a first configuration parameter of a first cell as a primary cell (PCell);

receive a second configuration parameter of a conditional handover (CHO) execution condition for executing a CHO procedure for switching to a second cell;

receive a medium access control control element (MAC CE) comprising an indication to switch the PCell from the first cell to a third cell; and based on receiving the MAC CE and before the CHO execution condition is satisfied, switch the PCell from the first cell to the third cell.

16. The one or more non-transitory computer-readable media of claim 15, wherein the MAC CE indicates a layer 2 triggered handover.

17. The one or more non-transitory computer-readable media of claim 15, wherein the CHO execution condition is based on at least one of:

a value of reference signal received power (RSRP); or a value of reference signal received quality (RSRQ).

18. The one or more non-transitory computer-readable media of claim 15, wherein the instructions, when executed, further configure the wireless device to stop an evaluation of the second cell for the CHO.

19. The one or more non-transitory computer-readable media of claim 15, wherein the instructions, when executed, further configure the wireless device to receive third configuration parameters of the third cell of a layer 1 or 2 triggered mobility.

20. The one or more non-transitory computer-readable media of claim 15, wherein the instructions, when executed, further configure the wireless device to perform conditional reconfiguration evaluation for executing the CHO procedure for the second cell.

21. The one or more non-transitory computer-readable media of claim 15, wherein the instructions, when executed, further configure the wireless device to receive the first configuration parameter and receive the second configuration parameter by receiving a radio resource configuration (RRC) message comprising the first parameter and the second parameter.

* * * * *